United States Patent
Yang et al.

(10) Patent No.: US 11,560,505 B2
(45) Date of Patent: *Jan. 24, 2023

(54) HEAT TRANSFER FLUIDS CONTAINING SYNERGISTIC BLENDS OF CORROSION INHIBITOR FORMULATIONS

(71) Applicant: PRESTONE PRODUCTS CORPORATION, Danbury, CT (US)

(72) Inventors: Bo Yang, Ridgefield, CT (US); Peter M. Woyciesjes, Woodbury, CT (US)

(73) Assignee: PRESTONE PRODUCTS CORPORATION, Danbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/422,455

(22) Filed: May 24, 2019

(65) Prior Publication Data

US 2020/0040244 A1 Feb. 6, 2020

Related U.S. Application Data

(60) Provisional application No. 62/714,403, filed on Aug. 3, 2018, provisional application No. 62/713,866, filed on Aug. 2, 2018.

(51) Int. Cl.
*C09K 5/10* (2006.01)
*C23F 11/167* (2006.01)

(52) U.S. Cl.
CPC ............ *C09K 5/10* (2013.01); *C23F 11/1676* (2013.01)

(58) Field of Classification Search
CPC ...... C09K 5/10; C23F 11/1676; C23F 11/149; C23F 11/126; C23F 11/10; C23F 11/08; C23F 11/124; C23F 11/18
See application file for complete search history.

(56) References Cited

U.S. PATENT DOCUMENTS

| | | | | |
|---|---|---|---|---|
| 3,015,622 A * | 1/1962 | Shen | .......... | C11D 3/28 252/391 |
| 4,134,959 A * | 1/1979 | Menke | .......... | C23F 11/08 422/16 |
| 4,390,439 A * | 6/1983 | Schwartz | .......... | C23F 11/126 252/73 |
| 4,657,689 A | 4/1987 | Darden | | |
| 4,851,145 A * | 7/1989 | Van Neste | .......... | C09K 5/20 252/75 |
| 5,013,482 A * | 5/1991 | O'Neil | .......... | C07C 59/125 252/395 |
| 5,366,651 A * | 11/1994 | Maes | .......... | C09K 5/20 252/390 |
| 5,741,436 A * | 4/1998 | Gershun | .......... | C09K 5/20 252/76 |
| 6,398,984 B1 * | 6/2002 | Maes | .......... | C23F 11/08 252/387 |
| 8,613,866 B1 * | 12/2013 | Yang | .......... | C09K 5/10 252/73 |
| 8,617,416 B1 * | 12/2013 | Yang | .......... | C23F 11/184 252/73 |
| 9,145,613 B2 * | 9/2015 | Yang | .......... | C23F 11/184 |
| 9,567,507 B2 * | 2/2017 | Yang | .......... | C23F 11/08 |
| 2004/0075077 A1 | 4/2004 | Maes | | |
| 2007/0120094 A1 * | 5/2007 | Yang | .......... | C23F 11/10 252/389.2 |
| 2007/0131898 A1 * | 6/2007 | Yoo | .......... | C09K 5/20 252/73 |
| 2010/0093568 A1 * | 4/2010 | Tagawa | .......... | C10M 169/04 508/133 |
| 2014/0010134 A1 * | 1/2014 | Hokao | .......... | H04W 76/27 370/311 |
| 2014/0070135 A1 * | 3/2014 | Yang | .......... | C09K 5/20 252/75 |
| 2014/0119883 A1 * | 5/2014 | Kempf | .......... | F04D 29/526 415/1 |
| 2014/0223930 A1 * | 8/2014 | Park | .......... | C23F 11/10 62/77 |
| 2014/0224193 A1 * | 8/2014 | Dietl | .......... | C23F 11/124 123/41.42 |
| 2016/0017200 A1 * | 1/2016 | Yang | .......... | C23F 11/08 422/7 |
| 2017/0009120 A1 * | 1/2017 | Yang | .......... | C23F 11/08 |
| 2019/0225855 A1 * | 7/2019 | Yang | .......... | C23F 11/08 |

* cited by examiner

FOREIGN PATENT DOCUMENTS

| | | | | |
|---|---|---|---|---|
| CA | 1174451 A | * | 9/1984 | ............. C23F 11/08 |
| RU | 2290425 | | 12/2006 | |
| RU | 2290425 C1 | * | 12/2006 | |
| WO | WO 2018/013630 | | 1/2018 | |

OTHER PUBLICATIONS

Search Report & Written Opinion issued in Int'l App. No. PCT/US2019/044185 (2019).
Extended Search Report issued in Appl. No. EP 19844267.5 (dated Feb. 11, 2022).
Examination Report issued in Indian Appl. No. 202117001459 (dated Aug. 5, 2022).

*Primary Examiner* — Pamela H Weiss
(74) *Attorney, Agent, or Firm* — Barnes & Thornburg LLP; G. Peter Nichols

(57) ABSTRACT

Corrosion inhibitor formulations for use in heat transfer fluids include: (a) an optionally substituted benzoic acid or a salt thereof; (b) at least a first n-alkyl monocarboxylic acid or a salt thereof and a second n-alkyl monocarboxylic acid or a salt thereof, the first n-alkyl monocarboxylic acid and the second n-alkyl monocarboxylic acid being different; and (c) an azole compound. A ratio of weight percent of the first n-alkyl monocarboxylic acid or the salt thereof to weight percent of the second n-alkyl monocarboxylic acid or the salt thereof ranges from about 1:0.75 to about 1:2.00. A ratio of weight percent of the benzoic acid or the salt thereof to combined weight percent of the first n-alkyl monocarboxylic acid or the salt thereof and the second n-alkyl monocarboxylic acid or the salt thereof ranges from about 1:0.30 to about 1:2.25.

33 Claims, No Drawings

HEAT TRANSFER FLUIDS CONTAINING SYNERGISTIC BLENDS OF CORROSION INHIBITOR FORMULATIONS

RELATED APPLICATIONS

This application claims the benefit of U.S. Provisional Application No. 62/713,866, filed Aug. 2, 2018, and U.S. Provisional Application No. 62/714,403, filed Aug. 3, 2018. The entire contents of both of these documents are incorporated herein by reference, except that in the event of any inconsistent disclosure or definition from the present specification, the disclosure or definition herein shall be deemed to prevail.

TECHNICAL FIELD

The present teachings relate generally to heat transfer fluids and, in some embodiments, to heat transfer fluids for inhibiting corrosion in heat transfer systems.

BACKGROUND

Modern vehicle engines generally require a heat transfer fluid (liquid coolant) to provide long-lasting, year-round protection of their cooling systems. The primary requirements of heat transfer fluids are that they provide efficient heat transfer to control and maintain engine temperature for efficient fuel economy and lubrication, and prevent engine failures due to freeze-up, boiling-over, or over-heating. An additional key requirement of a heat transfer fluid is that it provides corrosion protection of all cooling system metals over a wide range of temperature and operating conditions. Aluminum corrosion protection for engine block, cylinder head, water pump, heat exchangers and other components made from aluminum or aluminum alloys is particularly important. Beyond metal protection, corrosion protection helps the heat transfer fluid to fulfill its primary function of transferring excess heat from the engine to the radiator for dissipation.

Common corrosion-related problems that may arise in automotive cooling systems include: (1) cavitation corrosion and rusting of cylinder heads and cylinder blocks; (2) seal leakage, bellows seal failure, and cavitation corrosion in water pumps; (3) solder bloom, scale and deposit formation, and pitting in radiators and heater cores; (4) thermostat sticking; and/or (5) crevice corrosion at hose necks. In addition, erosion-corrosion, galvanic corrosion, under-deposit corrosion, and/or stray-current corrosion may occur at susceptible locations in a cooling system depending on conditions.

Different kinds of metals may be used to fabricate the various parts of a cooling system. By way of example, cast iron and cast aluminum alloys may be used for cylinder blocks, cylinder heads, intake manifolds, coolant pumps, and power electronic device enclosures; wrought aluminum and copper alloys may be used for radiators and heater cores; solders may be used to join the components of brass or copper radiators or heater cores; steel may be used for cylinder head gaskets and for small components such as freeze plugs, coolant pump housing enclosures, and coolant pump impellers; and copper alloys may be used in thermostats and oil coolers.

Compacted graphite iron (CGI) is a material that is commonly used nowadays in modern engines (e.g., diesel engines) for cylinder blocks and heads. In contrast to conventional gray cast iron, CGI has a different metallographic microstructure that provides it with increased tensile strength, increased stiffness, and increased fatigue strength. In addition, CGI is more fatigue resistant than aluminum at elevated temperature. A study published in 1973 showed that at room temperature, the corrosion rate of CGI in 5% sulfuric acid is nearly half that of grey cast iron (e.g., flake graphite iron). While the mechanical and tribological properties of CGI have been widely studied for engine applications, corrosion of CGI in engine applications has not been reported.

Studies show that the interaction between coolant formulations and potassium fluoroaluminate flux residue, which is introduced in the process of controlled atmosphere brazing (CAB) commonly used in the manufacture of aluminum automotive heat exchangers, may leach out highly corrosive fluoride and aluminum ions into the coolant solutions in the engine cooling systems. This interaction may negatively impact coolant corrosion protection performance and may even pose a challenge to heat transfer and coolant flow, as well as to the normal operation of the engine cooling system.

The corrosion protection performance of coolants for use in cooling systems containing heat exchangers produced by the CAB process, and corrosion protection at high temperature (e.g., in cooling systems for vehicles equipped with exhaust gas recirculation or hot spots in engine cooling systems, such as cylinder heads and engine blocks) has room for improvement. There is a need for new inhibited coolant that will provide improved corrosion protection of all the metals and metallic components currently in use in automotive cooling systems. In particular, an inhibitor formulation for use in engine coolants that simultaneously provides effective corrosion protection for both compacted graphite iron and aluminum alloys is needed.

SUMMARY

The scope of the present invention is defined solely by the appended claims, and is not affected to any degree by the statements within this summary.

By way of introduction, a first corrosion inhibitor formulation in accordance with the present teachings for use in a heat transfer fluid includes: (a) an optionally substituted benzoic acid or a salt thereof; (b) at least a first n-alkyl monocarboxylic acid or a salt thereof and a second n-alkyl monocarboxylic acid or a salt thereof, wherein the first n-alkyl monocarboxylic acid and the second n-alkyl monocarboxylic acid are different; and (c) an azole compound. A ratio of weight percent of the first n-alkyl monocarboxylic acid or the salt thereof to weight percent of the second n-alkyl monocarboxylic acid or the salt thereof ranges from about 1:0.75 to about 1:2.00. A ratio of weight percent of the benzoic acid or the salt thereof to combined weight percent of the first n-alkyl monocarboxylic acid or the salt thereof and the second n-alkyl monocarboxylic acid or the salt thereof ranges from about 1:0.30 to about 1:2.25.

A second corrosion inhibitor formulation in accordance with the present teachings for use in a heat transfer fluid includes: (a) benzoic acid or an alkali metal salt thereof; (b) at least a first n-alkyl monocarboxylic acid or an alkali metal salt thereof and a second n-alkyl monocarboxylic acid or an alkali metal salt thereof, wherein the first n-alkyl monocarboxylic acid and the second n-alkyl monocarboxylic acid are different and wherein the first n-alkyl monocarboxylic acid and the second n-alkyl monocarboxylic acid are each independently selected from the group consisting of heptanoic acid, octanoic acid, nonanoic acid, decanoic acid, and a combination thereof; (c) an azole compound selected from the group consisting of benzotriazole, tolyltriazole, mercaptobenzothiazole, tetrahydro tolyltriazole, and a combination thereof; and (d) a molybdate salt comprising sodium molybdate, potassium molybdate, or a combination thereof. A ratio of weight percent of the first n-alkyl monocarboxylic acid or the salt thereof to weight percent of the second n-alkyl monocarboxylic acid or the salt thereof ranges from about 1:1.00 to about 1:1.75. A ratio of weight percent of the benzoic acid or the salt thereof to combined weight percent of the first n-alkyl monocarboxylic acid or the salt thereof and the second n-alkyl monocarboxylic acid or the salt thereof ranges from about 1:0.50 to about 1:2.00.

A heat transfer fluid in accordance with the present teachings for use in a heat transfer system includes a freezing point depressant in an amount ranging from about 1 wt. % to about 99 wt. % based on a total weight of the heat transfer fluid, water in an amount ranging from about 1 wt. % to about 99 wt. % based on a total weight of the heat transfer fluid, and a corrosion inhibitor formulation of a type described above.

A method in accordance with the present teachings for preventing corrosion in a heat transfer system includes contacting at least a portion of the heat transfer system with a heat transfer fluid of a type described above.

DETAILED DESCRIPTION

To ensure long service life and to fulfill design functions, metal components used in automotive cooling systems have to be protected from corrosion by an engine coolant. In addition, an engine coolant should be compatible with non-metals (such as hoses, gaskets and plastics) used in cooling systems. Excessive corrosion or degradation of material used in cooling systems may lead to a substantial reduction in the strength of a material or component, loss of coolant from the system, and subsequent malfunction of one or more of the cooling system components. All of these events may result in engine failure. Furthermore, even relatively mild corrosion may result in formation of corrosion products that may form scales or deposits on heat transfer surfaces. These scales or deposits may greatly reduce heat transfer rate. The thermal conductivity for a nonporous scale is about 1.04 to 3.46 W/mK at 25° C. and that of deposit or porous scale may be about 0.35 W/mK at 25° C. These values are much lower than the thermal conductivities of various metals used in cooling systems (e.g., 401 W/mK at 25° C. for copper; 250 W/mK at 25° C. for aluminum, 156 W/mK at 25° C. for magnesium, 109 W/mK at 25° C. for admiralty brass, 55 W/mK at 25° C. for cast iron, or 16 W/mK @ 25° C. for stainless steel). In short, the thermal conductivity of scales and deposits are in the range of a fireclay brick which is used as heat insulation material at 500° C. (1.4 W/mK). Excessive scale or corrosion product deposition may also lead to restriction of coolant flow in the radiator and heater core tubes, even plugging the heater core and/or radiator. Substantial heat transfer rate reduction and flow restriction of the coolant may lead to overheating of the engine.

In addition to providing reliable corrosion protection for various metallic components in the cooling systems, an engine coolant should also have the following properties to fulfill its requirements for use as a year-round functional fluid for a vehicle: high thermal conductivity; high heat capacity or high specific heat; good fluidity within the temperature range of use; high boiling point; low freeze point; low viscosity; low toxicity and safety of use; cost effectiveness and adequacy of supply; chemically stable over the temperature and conditions of use; low foaming tendency; and good material compatibility (i.e., does not corrode, erode, or degrade system materials—including both metallic and nonmetallic materials). The corrosion inhibitor formulations described herein below may be used to provide one or more of the above-described properties.

In accordance with the present teachings, corrosion inhibitor formulations and heat transfer fluids containing corrosion inhibitor formulations exhibit a synergistic effect between the components of the formulation with respect to corrosion inhibition. As further described below, the synergistic corrosion inhibitor formulations and heat transfer fluids containing such formulations include an optionally substituted benzoic acid or a salt thereof and at least two n-alkyl monocarboxylic acids or salts thereof in specific ratios.

Throughout this description and in the appended claims, the following definitions are to be understood:

The phrase "optionally substituted benzoic acid or a salt thereof" includes unsubstituted benzoic acid, one or more salts of unsubstituted benzoic acid, benzoic acid substituted with one or more substituents, one or more salts of benzoic acid substituted with one or more substituents, and any combination thereof.

The term "heteroatom" refers to any atom other than carbon and hydrogen. Representative examples of heteroatoms in accordance with the present teachings include but are not limited to nitrogen, oxygen, sulfur, and the like.

The term "alkyl" refers to a substituted or unsubstituted, straight, branched or cyclic hydrocarbon chain containing, in some embodiments, from 1 to 24 carbon atoms. Representative examples of unsubstituted alkyl groups in accordance with the present teachings include but are not limited to methyl, ethyl, propyl, iso-propyl, cyclopropyl, butyl, iso-butyl, tert-butyl, sec-butyl, cyclobutyl, pentyl, cyclopentyl, hexyl, cyclohexyl, and the like.

The term "alkenyl" refers to a substituted or unsubstituted, straight, branched or cyclic, unsaturated hydrocarbon chain that contains at least one double bond and, in some embodiments, from 2 to 24 carbon atoms. Representative unsubstituted alkenyl groups in accordance with the present teachings include but are not limited to ethenyl or vinyl (—CH═CH$_2$), 1-propenyl, 2-propenyl or allyl (—CH$_2$—CH═CH$_2$), 1,3-butadienyl (—CH═CHCH═CH$_2$), 1-butenyl (—CH═CHCH$_2$CH$_3$), hexenyl, pentenyl, 1, 3, 5-hexatrienyl, and the like. In some embodiments, cycloalkenyl groups have from five to eight carbon atoms and at least one double bond. Representative cycloalkenyl groups in accordance with the present teachings include but are not limited to cyclohexadienyl, cyclohexenyl, cyclopentenyl, cycloheptenyl, cyclooctenyl, cyclohexadienyl, cycloheptadienyl, cyclooctatrienyl, and the like.

The term "alkoxy" refers to a substituted or unsubstituted —O-alkyl group. Representative unsubstituted alkoxy groups in accordance with the present teachings include but are not limited to methoxy, ethoxy, n-propoxy, iso-propoxy, n-butoxy, tert-butoxy, and the like.

The terms "siloxy" and "silyloxy" refer to silicon substituted oxygen groups. The silicon-containing portion of the siloxy group may be substituted or unsubstituted. Representative siloxy groups in accordance with the present teachings include but are not limited to trimethylsilyloxy (—OSi(CH$_3$)$_3$), triethylsilyloxy (—OSi(CH$_2$CH$_3$)$_3$), triisopropylsiloxy (—OSi(i-Pr)$_3$), tert-butyldimethylsilyloxy (—OSi(tert-Bu)(CH$_3$)$_2$), and the like.

The term "alkynyl" refers to a substituted or unsubstituted, straight, branched or cyclic unsaturated hydrocarbon chain containing at least one triple bond and, in some embodiments, from 2 to 20 carbon atoms.

The term "aryl" refers to a substituted or unsubstituted mono-, bi-, or polycyclic aromatic ring system of 4-20 carbon atoms. Representative aryl groups in accordance with the present teachings include but are not limited to benzene, substituted benzene (e.g., toluene, xylenes, styrene), naphthalene, anthracene, biphenyl, and the like.

The term "amino" refers to an unsubstituted or substituted amino ($-NH_2$) group. The amine may be primary ($-NH_2$), secondary ($-NHR^a$) or tertiary ($-NR^aR^b$, wherein $R^a$ and $R^b$ are the same or different). Representative substituted amino groups in accordance with the present teachings include but are not limited to methylamino, dimethylamino, ethylamino, diethylamino, 2-propylamino, 1-propylamino, di(n-propyl)amino, di(iso-propyl)amino, methyl-n-propylamino, tert-butylamino, and the like.

The term "halogen" refers to fluorine, chlorine, iodine or bromine.

The term "heterocyclic" refers to a saturated, partially unsaturated, or aromatic ring system containing from 3 to 24 carbon atoms (in some embodiments, 4 to 22 carbon atoms; in other embodiments 6 to 20 carbon atoms) and at least one heteroatom (in some embodiments 1 to 3 heteroatoms). The ring may optionally be substituted with one or more substituents. Moreover, the ring may be mono-, bi- or polycyclic. As used herein, the term "heterocyclic" subsumes the term "heteroaryl." Representative heteroatoms for inclusion in the ring include but are not limited to nitrogen, oxygen, and sulfur. Representative heterocyclic groups in accordance with the present teachings include but are not limited to aziridine, azirine, oxirane, oxirene, thiirane, thiirene, diazirine, oxaziridine, dioxirane, azetidine, azete, oxetane, oxete, thietane, thiete, diazetidine, dioxetane, dioxete, dithietane, dithiete, pyrrolidine, tetrahydrofuran, thiolane, imidazolidine, pyrazolidene, oxazolidine, isooxazolidine, thiazolidine, isothiazolidene, dioxolane, dithiolane, furazan, oxadiazole, dithiazole, tetrazole, piperidine, oxane, pyran, thiane, thiopyran, piperazine, diazines, morpholine, oxazine, thiomorpholine, thiazine, dioxane, dioxine, dithiane, dithiine, trioxane, trithiane, tetrazine, azepane, azepine, oxepane, oxepine, thiepane, thiepine, homopiperazine, diazepine, thiazepine, azocane, azocine, acridine, benzathiazoline, benzimidazole, benzofuran, benzothiapene, benzthiazole, benzothiophenyl, carbazole, cinnoline, furan, imidazole, 1H-indazole, indole, isoindole, isoquinoline, isothiazole, oxazole, isoxazole, oxadiazoles (e.g., 1,2,3-oxadiazole), phenazine, phenothiazine, phenoxazine, phthalazine, pteridine, purine, pyrazine, pyrazole, pyridazine, pyridine, pyrimidine, pyrrole, quinazoline, quinoline, quinoxaline, thiazole, thiadiazoles (e.g., 1,3,4-thiadiazole), thiophene, triazine (e.g., 1,3,5-triazine), triazoles (e.g., 1,2,3-triazole), and the like.

The term "substituted" refers to the optional attachment of one or more substituents onto a backbone structure (e.g., an alkyl backbone, an alkenyl backbone, a heterocyclic backbone, etc.). Representative substituents for use in accordance with the present teachings include but are not limited to hydroxyl, amino ($-NH_2$, $-NHR^a$, $-NR^aR^b$), oxy ($-O-$), carbonyl ($-CO-$), thiol, alkyl, alkenyl, alkynyl, alkoxy, halo, nitrile, nitro, aryl and heterocyclyl groups. These substituents may optionally be further substituted with 1-3 substituents. Examples of substituted substituents include but are not limited to carboxamide, alkylmercapto, alkylsulphonyl, alkylamino, dialkylamino, carboxylate, alkoxycarbonyl, alkylaryl, aralkyl, alkylheterocyclyl, heterocyclylaryl, haloalkyl, and the like. The substituent should not substantially interfere chemically with the reaction of the invention (e.g., cross react with reactants, terminate the reaction or the like).

It is to be understood that elements and features of the various representative embodiments described below may be combined in different ways to produce new embodiments that likewise fall within the scope of the present teachings.

By way of general introduction, a corrosion inhibitor formulation in accordance with the present teachings comprises—or, in some embodiments, consists of—the following elements: (a) an optionally substituted benzoic acid and/or a salt thereof (i.e., unsubstituted benzoic acid, one or more salts of unsubstituted benzoic acid, a benzoic acid substituted with one or more substituents, one or more salts of a benzoic acid substituted with one or more substituents, or any combination thereof); (b) two or more n-alkyl monocarboxylic acids and/or salts thereof; and (c) an azole compound. In some embodiments, a corrosion inhibitor formulation in accordance with the present teachings further comprises a molybdate compound (including but not limited to sodium molybdate, potassium molybdate, or a combination thereof).

It has been discovered that corrosion inhibitor formulations in accordance with the present teachings are highly synergistic and, as demonstrated in the Examples below, surprisingly and unexpectedly good results are obtained when (1) a ratio of weight percent of the first n-alkyl monocarboxylic acid (and/or a salt thereof) to weight percent of the second n-alkyl monocarboxylic acid (and/or a salt thereof) ranges from about 1:0.75 to about 1:2.00 (in some embodiments, from about 1:1.00 to about 1:2.00 and in other embodiments from about 1:1.00 to about 1:1.50), and (2) a ratio of weight percent of the benzoic acid or the salt thereof to combined weight percent of the first n-alkyl monocarboxylic acid or the salt thereof and the second n-alkyl monocarboxylic acid or the salt thereof ranges from about 1:0.30 to about 1:2.25 (in some embodiments from about 1:0.50 to about 1:2.25 and in other embodiments from about 1:0.75 to about 1:2.00). In some embodiments, the weight percent ratio of the two n-alkyl carboxylic acids (or n-alkyl carboxylates) is 1:1 or within the range of 1:1.35 in the corrosion inhibitor formulations. In some embodiments, the weight percent ratio of benzoic acid (or alkali metal benzoate) and the combined weight percent of the least two n-alkyl carboxylic acid (or alkali metal salts of n-alkyl carboxylic acids) is within the range of 1:2 to 1:1.

The ratio of weight percent of the first n-alkyl monocarboxylic acid (and/or a salt thereof) to weight percent of the second n-alkyl monocarboxylic acid (and/or a salt thereof) in accordance with the present teachings is not restricted, and may be varied based on desired end use, as will be appreciated by one of ordinary skill. In illustrative embodiments, the ratio of weight percent of the first n-alkyl monocarboxylic acid (and/or a salt thereof) to weight percent of the second n-alkyl monocarboxylic acid (and/or a salt thereof) is about 1:0.75, 1:0.80, 1:0.85, 1:0.90, 1:0.95, 1:1.00, 1:1.10, 1:1.15, 1:1.20, 1:1.25, 1:1.30, 1:1.35, 1:1.40, 1:1.45, or 1:1.50. The ratio of weight percent of the first n-alkyl monocarboxylic acid (and/or a salt thereof) to weight percent of the second n-alkyl monocarboxylic acid (and/or a salt thereof) in accordance with the present teachings may be one of several different ratios or fall within one of several different ranges of ratios. For example, it is within the scope of the present disclosure to select an amount of the first n-alkyl monocarboxylic acid (and/or a salt thereof) and an amount of the second n-alkyl monocarboxylic acid (and/or a salt thereof), such that the ratio of weight percent of the first n-alkyl monocarboxylic acid (and/or a salt thereof) to weight percent of the second n-alkyl monocarboxylic acid (and/or a salt thereof) is one of the following ratios: about 1:0.75, 1:0.76, 1:0.77, 1:0.78, 1:0.79, 1:0.80, 1:0.81, 1:0.82, 1:0.83, 1:0.84, 1:0.85, 1:0.86, 1:0.87, 1:0.88, 1:0.89, 1:0.90, 1:0.91, 1:0.92, 1:0.93, 1:0.94, 1:0.95, 1:0.96, 1:0.97, 1:0.98, 1:0.99, 1:1.00, 1:1.01, 1:1.02, 1:1.03, 1:1.04, 1:1.05, 1:1.06, 1:1.07, 1:1.08, 1:1.09, 1:1.10, 1:1.11, 1:1.12, 1:1.13, 1:1.14, 1:1.15, 1:1.16, 1:1.17, 1:1.18, 1:1.19, 1:1.20, 1:1.21, 1:1.22, 1:1.23, 1:1.24, 1:1.25, 1:1.26, 1:1.27, 1:1.28, 1:1.29, 1:1.30, 1:1.31, 1:1.32, 1:1.33, 1:1.34, 1:1.35, 1:1.36, 1:1.37, 1:1.38, 1:1.39, 1:1.40, 1:1.41, 1:1.42, 1:1.43, 1:1.44, 1:1.45, 1:1.46, 1:1.47, 1:1.48, 1:1.49, 1:1.50, 1:1.51, 1:1.52, 1:1.53, 1:1.54, 1:1.55, 1:1.56, 1:1.57, 1:1.58, 1:1.59, 1:1.60, 1:1.61, 1:1.62, 1:1.63, 1:1.64, 1:1.65, 1:1.66, 1:1.67, 1:1.68, 1:1.69, 1:1.70, 1:1.71, 1:1.72, 1:1.73, 1:1.74, 1:1.75, 1:1.76, 1:1.77, 1:1.78, 1:1.79, 1:1.80, 1:1.81, 1:1.82, 1:1.83, 1:1.84, 1:1.85, 1:1.86, 1:1.87, 1:1.88, 1:1.89, 1:1.90, 1:1.91, 1:1.92, 1:1.93, 1:1.94, 1:1.95, 1:1.96, 1:1.97, 1:1.98, 1:1.99, or 1:2.00.

It is likewise within the scope of the present disclosure for the ratio of weight percent of the first n-alkyl monocarboxylic acid (and/or a salt thereof) to weight percent of the second n-alkyl monocarboxylic acid (and/or a salt thereof) to fall within one of many different ranges. In a first set of ranges, the range of the ratios is one of the following ranges: about 1:0.75 to 1:2.00, 1:0.76 to 1:1.99, 1:0.77 to 1:1.98, 1:0.78 to 1:1.97, 1:0.79 to 1:1.96, 1:0.80 to 1:1.95, 1:0.81 to 1:1.94, 1:0.82 to 1:1.93, 1:0.83 to 1:1.92, 1:0.84 to 1:1.91, 1:0.85 to 1:1.90, 1:0.86 to 1:1.89, 1:0.87 to 1:1.88, 1:0.88 to 1:1.87, 1:0.89 to 1:1.86, 1:0.90 to 1:1.85, 1:0.91 to 1:1.84, 1:0.92 to 1:1.83, 1:0.93 to 1:1.82, 1:0.94 to 1:1.81, 1:0.95 to 1:1.80, 1:0.96 to 1:1.79, 1:0.97 to 1:1.78, 1:0.98 to 1:1.77, 1:0.99 to 1:1.76, 1:1.00 to 1:1.75, 1:1.01 to 1:1.74, 1:1.02 to 1:1.73, 1:1.03 to 1:1.72, 1:1.04 to 1:1.71, 1:1.05 to 1:1.70, 1:1.06 to 1:1.69, 1:1.07 to 1:1.68, 1:1.08 to 1:1.67, 1:1.09 to 1:1.66, 1:1.10 to 1:1.65, 1:1.11 to 1:1.64, 1:1.12 to 1:1.63, 1:1.13 to 1:1.62, 1:1.14 to 1:1.61, 1:1.15 to 1:1.60, 1:1.16 to 1:1.59, 1:1.17 to 1:1.58, 1:1.18 to 1:1.57, 1:1.19 to 1:1.56, 1:1.20 to 1:1.55, 1:1.21 to 1:1.54, 1:1.22 to 1:1.53, 1:1.23 to 1:1.52, 1:1.24 to 1:1.51, 1:1.25 to 1:1.50, 1:1.26 to 1:1.49, 1:1.27 to 1:1.48, 1:1.28 to 1:1.47, 1:1.29 to 1:1.46, 1:1.30 to 1:1.45, 1:1.31 to 1:1.44, 1:1.32 to 1:1.43, 1:1.33 to 1:1.42, 1:1.34 to 1:1.41, 1:1.35 to 1:1.40, 1:1.36 to 1:1.39, or 1:1.37 to 1:1.38.

In a second set of ranges, the range of the ratios of weight percent of the first n-alkyl monocarboxylic acid (and/or a salt thereof) to weight percent of the second n-alkyl monocarboxylic acid (and/or a salt thereof) is one of the following ranges: about 1:0.75 to 1:2.00, 1:0.75 to 1:1.99, 1:0.75 to 1:1.98, 1:0.75 to 1:1.97, 1:0.75 to 1:1.96, 1:0.75 to 1:1.95, 1:0.75 to 1:1.94, 1:0.75 to 1:1.93, 1:0.75 to 1:1.92, 1:0.75 to 1:1.91, 1:0.75 to 1:1.90, 1:0.75 to 1:1.89, 1:0.75 to 1:1.88, 1:0.75 to 1:1.87, 1:0.75 to 1:1.86, 1:0.75 to 1:1.85, 1:0.75 to 1:1.84, 1:0.75 to 1:1.83, 1:0.75 to 1:1.82, 1:0.75 to 1:1.81, 1:0.75 to 1:1.80, 1:0.75 to 1:1.79, 1:0.75 to 1:1.78, 1:0.75 to 1:1.77, 1:0.75 to 1:1.76, 1:0.75 to 1:1.75, 1:0.75 to 1:1.74, 1:0.75 to 1:1.73, 1:0.75 to 1:1.72, 1:0.75 to 1:1.71, 1:0.75 to 1:1.70, 1:0.75 to 1:1.69, 1:0.75 to 1:1.68, 1:0.75 to 1:1.67, 1:0.75 to 1:1.66, 1:0.75 to 1:1.65, 1:0.75 to 1:1.64, 1:0.75 to 1:1.63, 1:0.75 to 1:1.62, 1:0.75 to 1:1.61, 1:0.75 to 1:1.60, 1:0.75 to 1:1.59, 1:0.75 to 1:1.58, 1:0.75 to 1:1.57, 1:0.75 to 1:1.56, 1:0.75 to 1:1.55, 1:0.75 to 1:1.54, 1:0.75 to 1:1.53, 1:0.75 to 1:1.52, or 1:0.75 to 1:1.51. 1:0.75 to 1:1.50, 1:0.75 to 1:1.49, 1:0.75 to 1:1.48, 1:0.75 to 1:1.47, 1:0.75 to 1:1.46, 1:0.75 to 1:1.45, 1:0.75 to 1:1.44, 1:0.75 to 1:1.43, 1:0.75 to 1:1.42, 1:0.75 to 1:1.41, 1:0.75 to 1:1.40, 1:0.75 to 1:1.39, 1:0.75 to 1:1.38, 1:0.75 to 1:1.37, 1:0.75 to 1:1.36, 1:0.75 to 1:1.35, 1:0.75 to 1:1.34, 1:0.75 to 1:1.33, 1:0.75 to 1:1.32, 1:0.75 to 1:1.31, 1:0.75 to 1:1.30, 1:0.75 to 1:1.29, 1:0.75 to 1:1.28, 1:0.75 to 1:1.27, 1:0.75 to 1:1.26, 1:0.75 to 1:1.25, 1:0.75 to 1:1.24, 1:0.75 to 1:1.23, 1:0.75 to 1:1.22, 1:0.75 to 1:1.21, 1:0.75 to 1:1.20, 1:0.75 to 1:1.19, 1:0.75 to 1:1.18, 1:0.75 to 1:1.17, 1:0.75 to 1:1.16, 1:0.75 to 1:1.15, 1:0.75 to 1:1.14, 1:0.75 to 1:1.13, 1:0.75 to 1:1.12, 1:0.75 to 1:1.11, 1:0.75 to 1:1.10, 1:0.75 to 1:1.09, 1:0.75 to 1:1.08, 1:0.75 to 1:1.07, 1:0.75 to 1:1.06, 1:0.75 to 1:1.05, 1:0.75 to 1:1.04, 1:0.75 to 1:1.03, 1:0.75 to 1:1.02, or 1:0.75 to 1:1.01, 1:0.75 to 1:1.00, 1:0.75 to 1:0.99, 1:0.75 to 1:0.98, 1:0.75 to 1:0.99, 1:0.75 to 1:0.98, 1:0.75 to 1:0.97, 1:0.75 to 1:0.96, 1:0.75 to 1:0.95, 1:0.75 to 1:0.94, 1:0.75 to 1:0.93, 1:0.75 to 1:0.92, 1:0.75 to 1:0.91, 1:0.75 to 1:0.90, 1:0.75 to 1:0.89, 1:0.75 to 1:0.88, 1:0.75 to 1:0.87, 1:0.75 to 1:0.86, 1:0.75 to 1:0.85, 1:0.75 to 1:0.84, 1:0.75 to 1:0.83, 1:0.75 to 1:0.82, 1:0.75 to 1:0.81, 1:0.75 to 1:0.80, 1:0.75 to 1:0.79, 1:0.75 to 1:0.78, 1:0.75 to 1:0.77, or 1:0.75 to 1:0.76.

In a third set of ranges, the range of the ratios of weight percent of the first n-alkyl monocarboxylic acid (and/or a salt thereof) to weight percent of the second n-alkyl monocarboxylic acid (and/or a salt thereof) is one of the following ranges: about 1:0.76 to 1:2.00, 1:0.77 to 1:2.00, 1:0.78 to 1:2.00, 1:0.79 to 1:2.00, 1:0.80 to 1:2.00, 1:0.81 to 1:2.00, 1:0.82 to 1:2.00, 1:0.83 to 1:2.00, 1:0.84 to 1:2.00, 1:0.85 to 1:2.00, 1:0.86 to 1:2.00, 1:0.87 to 1:2.00, 1:0.88 to 1:2.00, 1:0.89 to 1:2.00, 1:0.90 to 1:2.00, 1:0.91 to 1:2.00, 1:0.92 to 1:2.00, 1:0.93 to 1:2.00, 1:0.94 to 1:2.00, 1:0.95 to 1:2.00, 1:0.96 to 1:2.00, 1:0.97 to 1:2.00, 1:0.98 to 1:2.00, 1:0.99 to 1:2.00, 1:1.00 to 1:2.00, 1:1.01 to 1:2.00, 1:1.02 to 1:2.00, 1:1.03 to 1:2.00, 1:1.04 to 1:2.00, 1:1.05 to 1:2.00, 1:1.06 to 1:2.00, 1:1.07 to 1:2.00, 1:1.08 to 1:2.00, 1:1.09 to 1:2.00, 1:1.10 to 1:2.00, 1:1.11 to 1:2.00, 1:1.12 to 1:2.00, 1:1.13 to 1:2.00, 1:1.14 to 1:2.00, 1:1.15 to 1:2.00, 1:1.16 to 1:2.00, 1:1.17 to 1:2.00, 1:1.18 to 1:2.00, 1:1.19 to 1:2.00, 1:1.20 to 1:2.00, 1:1.21 to 1:2.00, 1:1.22 to 1:2.00, 1:1.23 to 1:2.00, 1:1.24 to 1:2.00, 1:1.25 to 1:2.00, 1:1.26 to 1:2.00, 1:1.27 to 1:2.00, 1:1.28 to 1:2.00, 1:1.29 to 1:2.00, 1:1.30 to 1:2.00, 1:1.31 to 1:2.00, 1:1.32 to 1:2.00, 1:1.33 to 1:2.00, 1:1.34 to 1:2.00, 1:1.35 to 1:2.00, 1:1.36 to 1:2.00, 1:1.37 to 1:2.00, 1:1.38 to 1:2.00, 1:1.39 to 1:2.00, or 1:1.40 to 1:2.00.

The ratio of weight percent of the optionally substituted benzoic acid or salt thereof (i.e., unsubstituted benzoic acid, one or more salts of unsubstituted benzoic acid, benzoic acid substituted with one or more substituents, one or more salts of benzoic acid substituted with one or more substituents, or any combination thereof) to combined weight percent of the first n-alkyl monocarboxylic acid (or salt thereof) and the second n-alkyl monocarboxylic acid (or salt thereof)—in some embodiments, the ratio of weight percent of the optionally substituted benzoic acid (or salt thereof) to the combined weight percent of the first n-alkyl monocarboxylic acid (or salt thereof), the second n-alkyl monocarboxylic acid (or salt thereof), and any one or more optionally present additional n-alkyl monocarboxylic acids (or salts thereof)—in accordance with the present teachings is not restricted, and may be varied based on desired end use, as will be appreciated by one of ordinary skill. In illustrative embodiments, the ratio of weight percent of the optionally substituted benzoic acid (or salt thereof) to combined weight percent of the first n-alkyl monocarboxylic acid (or salt thereof) and the second n-alkyl monocarboxylic acid (or salt thereof)—in some embodiments, the ratio of weight percent of the optionally substituted benzoic acid (or salt thereof) to the combined weight percent of the first n-alkyl monocarboxylic acid (or salt thereof), the second n-alkyl monocarboxylic acid (or salt thereof), and any one or more optionally present additional n-alkyl monocarboxylic acids (or salts thereof)—is about 1:0.30, 1:0.35, 1:0.40, 1:0.45, 1:0.50, 1:0.55, 1:0.60, 1:0.65, 1:0.70, 1:0.75, 1:0.80, 1:0.85, 1:0.90, 1:0.95, 1:1.00, 1:1.05, 1:10, 1:1.15, 1:1.20, 1:1.25, 1:1.30, 1:1.35, 1:1.40, 1:1.45, 1:1.50, 1:1.55, 1:1.60, 1:1.65, 1:1.70, 1:1.75, 1:1.80, 1:1.85, 1:1.90, 1:1.95, 1:2.00, 1:2.05, 1:2.10, 1:2.15, or 1:2.20. The ratio of weight percent of the optionally substituted benzoic acid (or salt thereof) to combined weight percent of the first n-alkyl monocarboxylic acid (or salt thereof) and the second n-alkyl monocarboxylic acid (or salt thereof)—in some embodiments, the ratio of weight percent of the optionally substituted benzoic acid (or salt thereof) to the combined weight percent of the first n-alkyl monocarboxylic acid (or salt thereof), the second n-alkyl monocarboxylic acid (or salt thereof), and any one or more optionally present additional n-alkyl monocarboxylic acids (or salts thereof)—in accordance with the present teachings may be one of several different ratios or fall within one of several different ranges of ratios. For example, it is within the scope of the present disclosure to select an amount of the optionally substituted benzoic acid (and/or a salt thereof), an amount of the first n-alkyl monocarboxylic acid (and/or a salt thereof), an amount of the second n-alkyl monocarboxylic acid (and/or a salt thereof), and—if more than two n-alkyl monocarboxylic acids (and/or salts thereof) are present—an amount of any additional n-alkyl monocarboxylic acids (and/or salts thereof) that are optionally present, such that the ratio of weight percent of the optionally substituted benzoic acid (or salt thereof) to the combined weight percent of the first n-alkyl monocarboxylic acid (or salt thereof), the second n-alkyl monocarboxylic acid (or salt thereof), and any one or more optionally present additional n-alkyl monocarboxylic acids (or salts thereof) is one of the following ratios: about 1:0.30, 1:0.31, 1:0.32, 1:0.33, 1:0.34, 1:0.35, 1:0.36, 1:0.37, 1:0.38, 1:0.39, 1:0.40, 1:0.41, 1:0.42, 1:0.43, 1:0.44, 1:0.45, 1:0.46, 1:0.47, 1:0.48, 1:0.49, 1:0.50, 1:0.51, 1:0.52, 1:0.53, 1:0.54, 1:0.55, 1:0.56, 1:0.57, 1:0.58, 1:0.59, 1:0.60, 1:0.61, 1:0.62, 1:0.63, 1:0.64, 1:0.65, 1:0.66, 1:0.67, 1:0.68, 1:0.69, 1:0.70, 1:0.71, 1:0.72, 1:0.73, 1:0.74, 1:0.75, 1:0.76, 1:0.77, 1:0.78, 1:0.79, 1:0.80, 1:0.81, 1:0.82, 1:0.83, 1:0.84, 1:0.85, 1:0.86, 1:0.87, 1:0.88, 1:0.89, 1:0.90, 1:0.91, 1:0.92, 1:0.93, 1:0.94, 1:0.95, 1:0.96, 1:0.97, 1:0.98, 1:0.99, 1:1.00, 1:1.01, 1:1.02, 1:1.03, 1:1.04, 1:1.05, 1:1.06, 1:1.07, 1:1.08, 1:1.09, 1:1.10, 1:1.11, 1:1.12, 1:1.13, 1:1.14, 1:1.15, 1:1.16, 1:1.17, 1:1.18, 1:1.19, 1:1.20, 1:1.21, 1:1.22, 1:1.23, 1:1.24, 1:1.25, 1:1.26, 1:1.27, 1:1.28, 1:1.29, 1:1.30, 1:1.31, 1:1.32, 1:1.33, 1:1.34, 1:1.35, 1:1.36, 1:1.37, 1:1.38, 1:1.39, 1:1.40, 1:1.41, 1:1.42, 1:1.43, 1:1.44, 1:1.45, 1:1.46, 1:1.47, 1:1.48, 1:1.49, 1:1.50, 1:1.51, 1:1.52, 1:1.53, 1:1.54, 1:1.55, 1:1.56, 1:1.57, 1:1.58, 1:1.59, 1:1.60, 1:1.61, 1:1.62, 1:1.63, 1:1.64, 1:1.65, 1:1.66, 1:1.67, 1:1.68, 1:1.69, 1:1.70, 1:1.71, 1:1.72, 1:1.73, 1:1.74, 1:1.75, 1:1.76, 1:1.77, 1:1.78, 1:1.79, 1:1.80, 1:1.81, 1:1.82, 1:1.83, 1:1.84, 1:1.85, 1:1.86, 1:1.87, 1:1.88, 1:1.89, 1:1.90, 1:1.91, 1:1.92, 1:1.93, 1:1.94, 1:1.95, 1:1.96, 1:1.97, 1:1.98, 1:1.99, 1:2.00, 1:2.01, 1:2.02, 1:2.03, 1:2.04, 1:2.05, 1:2.06, 1:2.07, 1:2.08 1:2.09, 1:2.10, 1:2.11, 1:2.12, 1:2.13, 1:2.14, 1:2.15, 1:2.16, 1:2.17, 1:2.18, 1:2.19, 1:2.20, 1:2.21, 1:2.22, 1:2.23, 1:2.24, or 1:2.25.

It is likewise within the scope of the present disclosure for the ratio of weight percent of the optionally substituted benzoic acid (or salt thereof) to combined weight percent of the first n-alkyl monocarboxylic acid (or salt thereof) and the second n-alkyl monocarboxylic acid (or salt thereof)—in some embodiments, the ratio of weight percent of the optionally substituted benzoic acid (or salt thereof) to the combined weight percent of the first n-alkyl monocarboxylic acid (or salt thereof), the second n-alkyl monocarboxylic acid (or salt thereof), and any one or more optionally present additional n-alkyl monocarboxylic acids (or salts thereof)—to fall within one of many different ranges. In a first set of ranges, the range of the ratios is one of the following ranges: about 1:0.36 to 1:2.25, 1:0.37 to 1:2.25, 1:0.38 to 1:2.24, 1:0.39 to 1:2.23, 1:0.40 to 1:2.22, 1:0.41 to 1:2.21, 1:0.42 to 1:2.20, 1:0.43 to 1:2.19, 1:0.44 to 1:2.18, 1:0.45 to 1:2.17, 1:0.46 to 1:2.16, 1:0.47 to 1:2.15, 1:0.48 to 1:2.14, 1:0.49 to 1:2.13, 1:0.50 to 1:2.12, 1:0.51 to 1:2.11, 1:0.52 to 1:2.10, 1:0.53 to 1:2.09, 1:0.54 to 1:2.08, 1:0.55 to 1:2.07, 1:0.56 to 1:2.06, 1:0.57 to 1:2.05, 1:0.58 to 1:2.04, 1:0.59 to 1:2.03, 1:0.60 to 1:2.02, 1:0.61 to 1:2.01, 1:0.62 to 1:2.00, 1:0.63 to 1:1.99, 1:0.64 to 1:1.98, 1:0.65 to 1:1.97, 1:0.66 to 1:1.96, 1:0.67 to 1:1.95, 1:0.68 to 1:1.94, 1:0.69 to 1:1.93, 1:0.70 to 1:1.92, 1:0.71 to 1:1.91, 1:0.72 to 1:1.90, 1:0.73 to 1:1.89, 1:0.74 to 1:1.88, 1:0.75 to 1:1.87, 1:0.76 to 1:1.86, 1:0.77 to 1:1.85, 1:0.78 to 1:1.84, 1:0.79 to 1:1.83, 1:0.80 to 1:1.82, 1:0.81 to 1:1.81, 1:0.82 to 1:1.80, 1:0.83 to 1:1.79, 1:0.84 to 1:1.78, 1:0.85 to 1:1.77, 1:0.86 to 1:1.76, 1:0.87 to 1:1.75, 1:0.88 to 1:1.74, 1:0.89 to 1:1.73, 1:0.90 to 1:1.72, 1:0.91 to 1:1.71, 1:0.92 to 1:1.70, 1:0.93 to 1:1.69, 1:0.94 to 1:1.68, 1:0.95 to 1:1.67, 1:0.96 to 1:1.66, 1:0.97 to 1:1.65, 1:0.98 to 1:1.64, 1:0.99 to 1:1.63, 1:1.00 to 1:1.62, 1:1.01 to 1:1.61, 1:1.02 to 1:1.60, 1:1.03 to 1:1.59, 1:1.04 to 1:1.58, 1:1.05 to 1:1.57, 1:1.06 to 1:1.56, 1:1.07 to 1:1.55, 1:1.08 to 1:1.54, 1:1.09 to 1:1.53, 1:1.10 to 1:1.52, 1:1.11 to 1:1.51, 1:1.12 to 1:1.50, 1:1.13 to 1:1.49, 1:1.14 to 1:1.48, 1:1.15 to 1:1.47, 1:1.16 to 1:1.46, 1:1.17 to 1:1.45, 1:1.18 to 1:1.44, 1:1.19 to 1:1.43, 1:1.20 to 1:1.42, 1:1.21 to 1:1.41, 1:1.22 to 1:1.40, 1:1.23 to 1:1.39, 1:1.24 to 1:1.38, 1:1.25 to 1:1.37, 1:1.26 to 1:1.36, 1:1.27 to 1:1.35, 1:1.28 to 1:1.34, 1:1.29 to 1:1.33, or 1:1.30 to 1:1.32.

In a second set of ranges, the range of the ratios of weight percent of the optionally substituted benzoic acid (or salt thereof) to combined weight percent of the first n-alkyl monocarboxylic acid (or salt thereof) and the second n-alkyl monocarboxylic acid (or salt thereof)—in some embodiments, the ratio of weight percent of the optionally substituted benzoic acid (or salt thereof) to the combined weight percent of the first n-alkyl monocarboxylic acid (or salt thereof), the second n-alkyl monocarboxylic acid (or salt thereof), and any one or more optionally present additional n-alkyl monocarboxylic acids (or salts thereof)—is one of the following ranges: about 1:0.30 to 1:2.24, 1:0.30 to 1:2.23, 1:0.30 to 1:2.22, 1:0.30 to 1:2.21, 1:0.30 to 1:2.20, 1:0.30 to 1:2.19, 1:0.30 to 1:2.18, 1:0.30 to 1:2.17, 1:0.30 to 1:2.16, 1:0.30 to 1:2.15, 1:0.30 to 1:2.14, 1:0.30 to 1:2.13, 1:0.30 to 1:2.12, 1:0.30 to 1:2.11, 1:0.30 to 1:2.10, 1:0.30 to 1:2.09, 1:0.30 to 1:2.08, 1:0.30 to 1:2.07, 1:0.30 to 1:2.06, 1:0.30 to 1:2.05, 1:0.30 to 1:2.04, 1:0.30 to 1:2.03, 1:0.30 to 1:2.02, 1:0.30 to 1:2.01, 1:0.30 to 1:2.00, 1:0.30 to 1:1.99, 1:0.30 to 1:1.98, 1:0.30 to 1:1.97, 1:0.30 to 1:1.96, 1:0.30 to 1:1.95, 1:0.30 to 1:1.94, 1:0.30 to 1:1.93, 1:0.30 to 1:1.92, 1:0.30 to 1:1.91, 1:0.30 to 1:1.90, 1:0.30 to 1:1.89, 1:0.30 to 1:1.88, 1:0.30 to 1:1.87, 1:0.30 to 1:1.86, 1:0.30 to 1:1.85, 1:0.30 to 1:1.84, 1:0.30 to 1:1.83, 1:0.30 to 1:1.82, 1:0.30 to 1:1.81, 1:0.30 to 1:1.80, 1:0.30 to 1:1.79, 1:0.30 to 1:1.78, 1:0.30 to 1:1.77, 1:0.30 to 1:1.76, 1:0.30 to 1:1.75, 1:0.30 to 1:1.74, 1:0.30 to 1:1.73, 1:0.30 to 1:1.72, 1:0.30 to 1:1.71, 1:0.30 to 1:1.70, 1:0.30 to 1:1.69, 1:0.30 to 1:1.68, 1:0.30 to 1:1.67, 1:0.30 to 1:1.66, 1:0.30 to 1:1.65, 1:0.30 to 1:1.64, 1:0.30 to 1:1.63, 1:0.30 to 1:1.62, 1:0.30 to 1:1.61, 1:0.30 to 1:1.60, 1:0.30 to 1:1.59, 1:0.30 to 1:1.58, 1:0.30 to 1:1.57, 1:0.30 to 1:1.56, 1:0.30 to 1:1.55, 1:0.30 to 1:1.54, 1:0.30 to 1:1.53, 1:0.30 to 1:1.52, 1:0.30 to 1:1.51, 1:0.30 to 1:1.50, 1:0.30 to 1:1.49, 1:0.30 to 1:1.48, 1:0.30 to 1:1.47, 1:0.30 to 1:1.46, 1:0.30 to 1:1.45, 1:0.30 to 1:1.44, 1:0.30 to 1:1.43, 1:0.30 to 1:1.42, 1:0.30 to 1:1.41, 1:0.30 to 1:1.40, 1:0.30 to 1:1.39, 1:0.30 to 1:1.38, 1:0.30 to 1:1.37, 1:0.30 to 1:1.36, 1:0.30 to 1:1.35, 1:0.30 to 1:1.34, 1:0.30 to 1:1.33, 1:0.30 to 1:1.32, 1:0.30 to 1:1.31, 1:0.30 to 1:1.30, 1:0.30 to 1:1.29, 1:0.30 to 1:1.28, 1:0.30 to 1:1.27, 1:0.30 to 1:1.26, 1:0.30 to 1:1.25, 1:0.30 to 1:1.24, 1:0.30 to 1:1.23, 1:0.30 to 1:1.22, 1:0.30 to 1:1.21, 1:0.30 to 1:1.20, 1:0.30 to 1:1.19, 1:0.30 to 1:1.18, 1:0.30 to 1:1.17, 1:0.30 to 1:1.16, 1:0.30 to 1:1.15, 1:0.30 to 1:1.14, 1:0.30 to 1:1.13, 1:0.30 to 1:1.12, 1:0.30 to 1:1.11, 1:0.30 to 1:1.10, 1:0.30 to 1:1.09, 1:0.30 to 1:1.08, 1:0.30 to 1:1.07, 1:0.30 to 1:1.06, 1:0.30 to 1:1.05, 1:0.30 to 1:1.04, 1:0.30 to 1:1.03, 1:0.30 to 1:1.02, 1:0.30 to 1:1.01, 1:0.30 to 1:1.00, 1:0.30 to 1:0.99, 1:0.30 to 1:0.98, 1:0.30 to 1:0.97, 1:0.30 to 1:0.96, 1:0.30 to 1:0.95, 1:0.30 to 1:0.94, 1:0.30 to 1:0.93, 1:0.30 to 1:0.92, 1:0.30 to 1:0.91, 1:0.30 to 1:0.90, 1:0.30 to 1:0.89, 1:0.30 to 1:0.88, 1:0.30 to 1:0.87, 1:0.30 to 1:0.86, 1:0.30 to 1:0.85, 1:0.30 to 1:0.84, 1:0.30 to 1:0.83, 1:0.30 to 1:0.82, 1:0.30 to 1:0.81, 1:0.30 to 1:0.80, 1:0.30 to 1:0.79, 1:0.30 to 1:0.78, 1:0.30 to 1:0.77, 1:0.30 to 1:0.76, 1:0.30 to 1:0.75, 1:0.30 to 1:0.74, 1:0.30 to 1:0.73, 1:0.30 to 1:0.72, 1:0.30 to 1:0.71, 1:0.30 to 1:0.70, 1:0.30 to 1:0.69, 1:0.30 to 1:0.68, 1:0.30 to 1:0.67, 1:0.30 to 1:0.66, 1:0.30 to 1:0.65, 1:0.30 to 1:0.64, 1:0.30 to 1:0.63, 1:0.30 to 1:0.62, 1:0.30 to 1:0.61, 1:0.30 to 1:0.60, 1:0.30 to 1:0.59, 1:0.30 to 1:0.58, 1:0.30 to 1:0.57, 1:0.30 to 1:0.56, 1:0.30 to 1:0.55, 1:0.30 to 1:0.54, 1:0.30 to 1:0.53, 1:0.30 to 1:0.52, 1:0.30 to 1:0.51, 1:0.30 to 1:0.50, 1:0.30 to 1:0.49, 1:0.30 to 1:0.48, 1:0.30 to 1:0.47, 1:0.30 to 1:0.46, 1:0.30 to 1:0.45, 1:0.30 to 1:0.44, 1:0.30 to 1:0.43, 1:0.30 to 1:0.42, 1:0.30 to 1:0.41, 1:0.30 to 1:0.40, 1:0.30 to 1:0.39, 1:0.30 to 1:0.38, 1:0.30 to 1:0.37, 1:0.30 to 1:0.36, 1:0.30 to 1:0.35, 1:0.30 to 1:0.34, 1:0.30 to 1:0.33, 1:0.30 to 1:0.32, or 1:0.30 to 1:0.31.

In a third set of ranges, the range of the ratios of weight percent of the optionally substituted benzoic acid (or salt thereof) to combined weight percent of the first n-alkyl monocarboxylic acid (or salt thereof) and the second n-alkyl monocarboxylic acid (or salt thereof)—in some embodiments, the ratio of weight percent of the optionally substituted benzoic acid (or salt thereof) to the combined weight percent of the first n-alkyl monocarboxylic acid (or salt thereof), the second n-alkyl monocarboxylic acid (or salt thereof), and any one or more optionally present additional n-alkyl monocarboxylic acids (or salts thereof)—is one of the following ranges: about 1:0.36 to 1:2.25, 1:0.37 to 1:2.25, 1:0.38 to 1:2.25, 1:0.39 to 1:2.25, 1:0.40 to 1:2.25, 1:0.41 to 1:2.25, 1:0.42 to 1:2.25, 1:0.43 to 1:2.25, 1:0.44 to 1:2.25, 1:0.45 to 1:2.25, 1:0.46 to 1:2.25, 1:0.47 to 1:2.25, 1:0.48 to 1:2.25, 1:0.49 to 1:2.25, 1:0.50 to 1:2.25, 1:0.51 to 1:2.25, 1:0.52 to 1:2.25, 1:0.53 to 1:2.25, 1:0.54 to 1:2.25, 1:0.55 to 1:2.25, 1:0.56 to 1:2.25, 1:0.57 to 1:2.25, 1:0.58 to 1:2.25, 1:0.59 to 1:2.25, 1:0.60 to 1:2.25, 1:0.61 to 1:2.25, 1:0.62 to 1:2.25, 1:0.63 to 1:2.25, 1:0.64 to 1:2.25, 1:0.65 to 1:2.25, 1:0.66 to 1:2.25, 1:0.67 to 1:2.25, 1:0.68 to 1:2.25, 1:0.69 to 1:2.25, 1:0.70 to 1:2.25, 1:0.71 to 1:2.25, 1:0.72 to 1:2.25, 1:0.73 to 1:2.25, 1:0.74 to 1:2.25, 1:0.75 to 1:2.25, 1:0.76 to 1:2.25, 1:0.77 to 1:2.25, 1:0.78 to 1:2.25, 1:0.79 to 1:2.25, 1:0.80 to 1:2.25, 1:0.81 to 1:2.25, 1:0.82 to 1:2.25, 1:0.83 to 1:2.25, 1:0.84 to 1:2.25, 1:0.85 to 1:2.25, 1:0.86 to 1:2.25, 1:0.87 to 1:2.25, 1:0.88 to 1:2.25, 1:0.89 to 1:2.25, 1:0.90 to 1:2.25, 1:0.91 to 1:2.25, 1:0.92 to 1:2.25, 1:0.93 to 1:2.25, 1:0.94 to 1:2.25, 1:0.95 to 1:2.25, 1:0.96 to 1:2.25, 1:0.97 to 1:2.25, 1:0.98 to 1:2.25, 1:0.99 to 1:2.25, 1:1.00 to 1:2.25, 1:1.01 to 1:2.25, 1:1.02 to 1:2.25, 1:1.03 to 1:2.25, 1:1.04 to 1:2.25, 1:1.05 to 1:2.25, 1:1.06 to 1:2.25, 1:1.07 to 1:2.25, 1:1.08 to 1:2.25, 1:1.09 to 1:2.25, 1:1.10 to 1:2.25, 1:1.11 to 1:2.25, 1:1.12 to 1:2.25, 1:1.13 to 1:2.25, 1:1.14 to 1:2.25, 1:1.15 to 1:2.25, 1:1.16 to 1:2.25, 1:1.17 to 1:2.25, 1:1.18 to 1:2.25, 1:1.19 to 1:2.25, 1:1.20 to 1:2.25, 1:1.21 to 1:2.25, 1:1.22 to 1:2.25, 1:1.23 to 1:2.25, 1:1.24 to 1:2.25, 1:1.25 to 1:2.25, 1:1.26 to 1:2.25, 1:1.27 to 1:2.25, 1:1.28 to 1:2.25, 1:1.29 to 1:2.25, 1:1.30 to 1:2.25, 1:1.31 to 1:2.25, 1:1.32 to 1:2.25, 1:1.33 to 1:2.25, 1:1.34 to 1:2.25, 1:1.35 to 1:2.25, 1:1.36 to 1:2.25, 1:1.37 to 1:2.25, 1:1.38 to 1:2.25, 1:1.39 to 1:2.25, 1:1.40 to 1:2.25, 1:1.41 to 1:2.25, 1:1.42 to 1:2.25, 1:1.43 to 1:2.25, 1:1.44 to 1:2.25, 1:1.45 to 1:2.25, 1:1.46 to 1:2.25, 1:1.47 to 1:2.25, 1:1.48 to 1:2.25, 1:1.49 to 1:2.25, or 1:1.50 to 1:2.25.

Corrosion inhibitor formulations in accordance with the present teachings include an optionally substituted benzoic acid and/or a salt thereof. In some embodiments, the salt is an alkali metal salt. In some embodiments, the optionally substituted benzoic acid (or a metal benzoate derived therefrom) comprises para-toluic acid, tert-butyl benzoic acid, an alkoxybenzoic acid, 1,3,5-benzene tricarboxylic acid, 1,2,4-benzene tricaboxylic acid, 1,2,3-benzene tricarboxylic acid, or a combination thereof. In other embodiments, the benzoic acid is unsubstituted.

Corrosion inhibitor formulations in accordance with the present teachings include at least two n-alkyl monocarboxylic acids and/or salts thereof. In other embodiments, corrosion inhibitor formulations in accordance with the present teachings include more than two n-alkyl monocarboxylic acids and/or salts thereof. In some embodiments, the salts independently comprise an alkali metal. In some embodiments, the at least two n-alkyl monocarboxylic acids are each independently selected from the groups consisting of heptanoic acid, octanoic acid, nonanoic acid, decanoic acid, and a combination thereof. In some embodiments, the at least two n-alkyl monocarboxylic acids are heptanoic acid and nonanoic acid. In other embodiments, the at least two n-alkyl monocarboxylic acids are octanoic acid and decanoic acid. In some embodiments, the two n-alkyl monocarboxylic acids are heptanoic acid and nonanoic acid or alkali metal salts thereof. In some embodiments, the weight percent ratio of the two n-alkyl carboxylic acids (or n-alkyl carboxylates) selected is 1:1 or within the range of 1:1.35 in the inhibitor formulations. In some embodiments, the weight percent ratio of benzoic acid (or alkali metal benzoate) and the combined weight percent of the least two n-alkyl monocarboxylic acid (or alkali metal salts of the n-alkyl monocarboxylic acids) is within the range of 1:2 to 1:1.

Corrosion inhibitor formulations in accordance with the present teachings include one or a plurality of azole compounds. Representative azole compounds that may be used in accordance with the present teachings include but are not limited to benzotriazole, tolyltriazole, methyl benzotriazole (e.g., 4-methyl benzotriazole, 5-methyl benzotriazole), butyl benzotriazole, other alkyl benzotriazoles (e.g., alkyl group containing from 2 to 20 carbon atoms), mercaptobenzothiazole, thiazole, imidazole, benzimidazole, indazole, tetrazole, tetrahydrotolyltriazole, tetrahydrogenated benzotriazoles (e.g., 4,5,6,7-tetrahydro-benzotriazole),4-methyl-1H-benzotriazole, 5-methyl-1H-benzotriazole, tetrahydrobenzotriazole, and/or the like, and combinations thereof. In some embodiments, the azole compound used in a corrosion inhibitor formulation in accordance with the present teachings includes a benzotriazole, a tolyltriazole, a mercaptobenzothiazole, a tetrahydro tolyltriazole, or a combination thereof.

Azole compounds used in accordance with the present teachings may be substituted or unsubstituted. Representative substituted azole compounds include but are not limited to substituted thiazoles, substituted imidazoles, substituted indazoles, substituted tetrazoles, and/or the like, and combinations thereof.

The concentration of azole compound may vary depending on the application. In some embodiments, the amount of the azole compound ranges from about 0.01 wt. % to about 10 wt. % based on the total weight of the corrosion inhibitor formulation. Within this range, the azole compound may be present in an amount greater than or equal to about 0.05 wt. % and, in some embodiments, greater than or equal to about 0.1 wt. %. Also within this range, the azole compound may be present in an amount less than or equal to about 5 wt. %, in some embodiments less than or equal to about 2 wt. %, and in some embodiments, less than or equal to about 1 wt. %.

Corrosion inhibitor formulations in accordance with the present teachings may optionally include one or a combination of more than one components selected from the following list: a water-soluble molybdate salt (e.g., potassium molybdate and/or sodium molybdate); an inorganic phosphate; an organophosphate; an alkaline earth metal salt (e.g., calcium, magnesium, strontium, etc.) which, in some embodiments, is water soluble; an alkaline earth metal oxide; an alkaline earth metal hydroxide; a lithium salt which, in some embodiments, is water soluble; a lithium oxide; a lithium hydroxide; a zinc salt which, in some embodiments, is water soluble; a nitrite and/or a nitrate (e.g., if at least one or more inorganic or organic phosphates is also present in the formulation); a silicate; a silicate stabilizer; an acrylate-based polymer; a phosphonate; a phosphinate; a dye or a colorant; a biocide; an antifoam or a defoamer; a surfactant; an additional corrosion or scale inhibitor (e.g., a carboxylate; a copper and copper alloy corrosion inhibitor); a dispersant; and other coolant additives. In some embodiments, a corrosion inhibitor formulation in accordance with the present teachings may specifically exclude any one or more of the aforementioned components (e.g., be substantially "free" of any one or more of the aforementioned components). In some embodiments, a corrosion inhibitor formulation in accordance with the present teachings may specifically exclude silicate. In other embodiments, a corrosion inhibitor formulation in accordance with the present teachings may specifically exclude nitrate. In other embodiments, a corrosion inhibitor formulation in accordance with the present teachings may specifically exclude both silicate and nitrate. In some embodiments, a corrosion inhibitor formulation in accordance with the present teachings may contain less than about 80 ppm nitrate, in some embodiments less than about 70 ppm, in other embodiments less than about 60 ppm, in other embodiments less than about 50 ppm, in other embodiments less than about 40 ppm, in other embodiments less than about 30 ppm, in other embodiments less than about 20 ppm, and in other embodiments less than about 10 ppm nitrate.

In some embodiments, corrosion inhibitor formulations in accordance with the present teachings may optionally include molybdate ions. In some embodiments, the molybdate ions are derived from one or a plurality of salts of molybdic acid (e.g., water-soluble molybdate salts). Representative salts of molybdic acid include but are not limited to alkali metal molybdates, alkaline earth metal molybdates, molybdenum trioxide, alkali metal heteropolymolybdates, and combinations thereof. Representative molybdates suitable for use as an optional additive in a corrosion inhibitor formulation in accordance with the present teachings include but are not limited to sodium molybdate, potassium molybdate, calcium molybdate, magnesium molybdate, lithium molybdate, sodium silicoheteropolymolybdate, sodium phosphoroheteropolymolybdate, and/or the like, and combinations thereof. In addition, hydrates of alkali metal molybdates, alkaline earth metal molybdates, and/or alkali metal heteropolymolybdates (e.g., sodium molybdate di-hydrate) may also be used. In some embodiments, if molybdate ions are optionally present in a corrosion inhibitor formulation in accordance with the present teachings, the molybdate ions are not derived from lithium molybdate, calcium molybdate, strontium molybdate, magnesium molybdate, and/or zinc molybdate. In some embodiments, a corrosion inhibitor formulation in accordance with the present teachings does not include lithium molybdate, calcium molybdate, strontium molybdate, magnesium molybdate, and/or zinc molybdate. In some embodiments, the molybdate compound for use in the corrosion inhibitor formulation is sodium molybdate and/or sodium molybdate di-hydrate. In some embodiments, a corrosion inhibitor formulation in accordance with the present teachings includes sodium molybdate, potassium molybdate, or a combination thereof.

The concentration of molybdate ion may vary depending on the application. In some embodiments, one or more molybdate compounds present in a corrosion inhibitor formulation are soluble in the corrosion inhibitor formulation. In some embodiments, the molybdate compound is present in an amount from about 0 wt. % to about 10 wt. % (i.e., up to about 10 wt. %), in some embodiments about 0 wt. % to 5 wt. % (i.e., up to about 5 wt. %), in some embodiments, about 0 wt. % to 1 wt. % (i.e., up to about 1 wt. %) based on the total weight of the corrosion inhibitor formulation, and in some embodiments about 0.01 wt. % to 0.6 wt. % based on the total weight of the corrosion inhibitor formulation.

Corrosion inhibitor formulations in accordance with the present teachings may optionally further include one or a plurality of inorganic phosphates. The inorganic phosphate used in accordance with the present teachings is configured to generate phosphate ions upon dissolution in an aqueous solution. Representative inorganic phosphates for use in accordance with the present teachings include but are not limited to orthophosphates such as phosphoric acid, alkali metal orthophosphates (e.g., sodium orthophosphate, potassium orthophosphate, etc.), other water-soluble alkaline metal phosphate salts, and/or the like, and combinations thereof. In some embodiments, an inorganic phosphate for use in accordance with the present teachings is selected from the group consisting of phosphoric acid, sodium orthophosphate, potassium orthophosphate, sodium pyrophosphate, potassium pyrophosphate, sodium polyphosphate, potassium polyphosphate, sodium hexametaphosphate, potassium hexametaphosphate, and/or the like, and combinations thereof. In some embodiments, the inorganic phosphate includes phosphoric acid and/or one or more additional orthophosphates including but not limited to alkali metal orthophosphates and/or other water-soluble alkaline metal phosphate salts.

The concentration of inorganic phosphate may vary depending on the application. In some embodiments, the phosphate ion is present in a corrosion inhibitor formulation in accordance with the present teachings in an amount of up to about 5 wt. %. In some embodiments, the phosphate ion concentration in a corrosion inhibitor formulation in accordance with the present teachings ranges from about 0.002 wt. % to about 5 wt. % based on the total weight of the corrosion inhibitor formulation. In some embodiments, the phosphate ion concentration in a corrosion inhibitor formulation in accordance with the present teachings ranges from about 0.05 wt. % to about 5 wt. % based on the total weight of the corrosion inhibitor formulation. In some embodiments, the phosphate ion concentration ranges from about 0.05 wt. % to about 3 wt. % based on the total weight of the corrosion inhibitor formulation. In some embodiments, the phosphate ion concentration ranges from about 0.01 wt. % to about 1 wt. % based on the total weight of the heat transfer fluid. In some embodiments, the inorganic phosphate may be present in the corrosion inhibitor formulation an amount of between about 0.10 wt. % and about 0.60 wt. % based on the total weight of the corrosion inhibitor formulation. Within this range, the amount may be greater than or equal to about 0.11 wt. % and, in some embodiments, greater than or equal to about 0.12 wt. %. Also within this range, the amount may be less than or equal to about 0.45 wt. % and, in some embodiments, less than or equal to about 0.40 wt. %.

Corrosion inhibitor formulations in accordance with the present teachings optionally include one or more organophosphates (a.k.a. phosphate esters). In some embodiments, an organophosphate for use in accordance with the present teachings has the following structure (1):

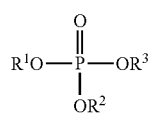

(1)

wherein $R^1$, $R^2$, and $R^3$ are each independently hydrogen, an optionally substituted heteroatom-containing alkyl, an optionally substituted heteroatom-containing alkenyl, an optionally substituted carbonyl-containing alkyl, an optionally substituted carbonyl-containing alkenyl, or an optionally substituted moiety selected from the group consisting of alkyl, alkenyl, hydroxyl, alkoxy, aryl, phosphono, phosphino, alkylamino, amino, carbonyl, and combinations thereof. For some embodiments in which an R group of the organophosphate (i.e., $R^1$, $R^2$, and/or $R^3$) contains one or more heteroatoms, the one or more heteroatoms may form an ether linkage (e.g., —C—O—C—), a sulfide linkage (—C—S—C—), an amino linkage (—C—N—C), or a combination thereof.

Representative organophosphates for use in accordance with the present teachings include but are not limited to ethylene glycol phosphate; 1,2,3-propanetriol phosphate (CAS #: 12040-65-2); a phosphate polyether ester; a $C_6$-$C_{12}$ alkyl alcohol ethoxylate phosphoric acid (CAS #: 68921-24-4); an alkali metal salt of phosphate ester of cresyl ethoxylate (CAS #: 66057-30-5); potassium cresyl phosphate (CAS #: 37281-48-4); octylphenoxypolyethoxyethyl phosphate; octylphenoxy polyethyl phosphate; olyethylene glycol mono(octylphenyl) ether phosphate; alkali metal salts of alkylphenoxypolyethoxyethyl phosphoric acid having a formula R-phenyl($CH_2CH_2O$)$_x$phosphate in which R is hydrogen or $C_1$-$C_{20}$ alkyl (in some embodiments, $C_1$-$C_{12}$) and x equals 1 to 30 (in some embodiments, 2 to 10); alkyl or aryl acid phosphates, such as isooctyl acid phosphate, 2-ethylhexyl acid phosphate, amyl acid phosphate, amyl dihydrogen phosphate, diamyl hydrogen phosphate, butyl acid phosphate, and/or the like; and combinations thereof.

Representative phosphate esters suitable for use in accordance with the present teachings are available from many suppliers including but not limited to the Dow Chemical Company (Midland, Mich.), Stepan Company (Northfield, Ill.), Solvay S.A./Rhodia Inc. (Brussels, Belgium), Ashland Inc. (Covington, Ky.), Clariant Corporation (Muttenz, Switzerland), PCC Chemax Inc. (Piedmont, S.C.), IsleChem LLC (Grand Island, N.Y.), and Lakeland Laboratories Limited (Manchester, England).

In some embodiments, the organophosphate used in accordance with the present teachings may be selected from the group consisting of phosphate polyether esters or alcohol phosphate esters including but not limited to (a) Triton™ H-66, Triton™ H-55, Triton™ QS-44, and/or Triton™ XQS-20 surfactants from the Dow Chemical Company; (b) Rhodafac® H-66 or potassium salt of phosphate ester of cresyl ethoxylate (CAS no. 66057-30-5), Rhodafac H-66-E or potassium salt of aromatic ethoxylate phosphate esters, Rhodafac HA-70 or polyoxyethylene phenyl ester phosphate acid form (CAS no. 39464-70-5), Rhodafac PA 23 or ethoxylated fatty alcohol phosphate ester (CAS no. 68585-36-4), and/or Rhodafac LO/529-E or sodium salt of ethoxylated alkylphenol phosphate (CAS no. 68954-84-7) from Rhodia; (c) Cedephos FA-600 containing $C_6$-$C_{12}$ alkyl alcohol ethoxylate phosphoric acids (CAS. no. 68921-24-4, alt CAS no. 68130-47-2) and/or MERPOL A (alcohol phosphate) from Stepan Company; (d) Chemfac NF-100 (98% polyphosphoric acids, esters with ethylene glycol, CAS no. 68553-96-8) or ethylene glycol phosphate, Chemfac NA-350 or 1,2,3-propanetriol phosphate (CAS no. 12040-65-2, as the main component in Chemfac NA-350), Chemfac PB-106K (polyoxyethylene decyl phosphate, potassium salt, or poly(oxy-1,2-ethanediyl), alpha-isodecyl-omega-hydroxy-, phosphate, potassium salt, CAS. no. 68071-17-0), Chemfac PB-184 (POE Oleyl phosphate or poly(oxy-1,2-ethanediyl), alpha-9-octadecenyl-omega-hydroxy-(Z)—, phosphate, CAS no. 39464-69-2), Chemfac PF-636 (poly(oxy-1,2-ethanediyl), alpha-hydro-omega-hydroxy, phosphate, CAS no. 9056-42-2), Chemfac PB-264 (POE ether phosphate or poly(oxy-1,2-ethanediyl), alpha-hydro-omega-hydroxy-, mono-C12-14-alkyl ethers, phosphates, CAS no. 68511-37-5), Chemfac NC-096 (POE (6) Nonyl Phenol phosphate, or poly(oxy-1,2-ethanediyl), alpha-(nonylphenyl)-omega-hydroxy, branched, phosphates, CAS no. 68412-53-3), Chemfac NB-041 (POE aliphatic phosphate ester), Chemfac NB-042 (POE aliphatic phosphate ester), Chemfac 126 (POE aliphatic phosphate ester), Chemfac NB-159(POE aliphatic phosphate ester), Chemfac NC-006E (POE aliphatic phosphate ester), Chemfac NC-0910 (POE aliphatic phosphate ester), Chemfac PB-082(POE aliphatic phosphate ester), Chemfac PB-104(POE aliphatic phosphate ester), Chemfac PB-109, Chemfac PB-133, Chemfac PB-135, Chemfac PB-136, Chemfac PB-139, Chemfac PB-253, Chemfac PC-006, Chemfac PC-099, Chemfac PC-188, Chemfac PD-600, Chemfac PD-990, and/or Chemfac PF-623 from PCC Chemax Inc.; (e) phosphated alcohols, such as PA 100, PA 800, PA 800K, and PA 801 from Lakeland Laboratories Ltd.; (f) phosphated alcohol ethoxylates, such as PAE 802, PAE 106, PAE 126, PAE 136, PAE 147, PAE 176, PAE 185 and PAE 1780 from Lakeland Laboratories Ltd.; (g) phosphated phenol ethoxylates, such as PPE 604, PPE 604K, PPE 154, PPE 156, PPE 159 and PPE 1513 from Lakeland Laboratories Ltd.; (h) and/or the like; and (i) combinations thereof.

In some embodiments, the organophosphates for use in accordance with the present teachings include alkyl and aryl acid phosphates. Representative alkyl or aryl acid phosphates that may be used in accordance with the present teachings include but are not limited to amyl acid phosphate, n-butyl acid phosphate, methyl acid phosphate, phenyl acid phosphate, 2-ethylhexyl acid phosphate, dimethyl acid phosphate, isooctyl acid phosphate, and/or the like, and combinations thereof. Mono-alkyl/aryl acid phosphates, dialky/ aryl acid phosphates, or a combination thereof may be used in accordance with the present teachings.

In some embodiments, organophosphates for use in accordance with the present teachings include ethylene glycol phosphate (e.g., Chemfac NF-100), phosphate polyether esters (e.g., Triton H-66), or a combination thereof. Phosphate polyether esters suitable for use in accordance with the present teachings include but are not limited to the ones described in U.S. Pat. Nos. 3,235,627; 3,462,520; 3,294,693; and 3,462,520.

The amount of organophosphate may vary depending on the application. By way of example, the concentration of the one or more organophosphates may range from about 0.0025 wt. % to about 10 wt. % based on the total weight of the corrosion inhibitor formulation (e.g., from about 0.005 wt. % to about 5 wt. %, from about 0.01 wt. % to about 3 wt. %, from about 0.05 wt. % to about 2 wt. %, or from about 0.05 wt. % to about 0.5 wt. %). Within this range, the amount may be greater than or equal to about 0.005 wt. %, and, in some embodiments, greater than or equal to about 0.01 wt. %. Also within this range, the amount may be less than or equal to about 1 wt. % and, in some embodiments, less than or equal to about 0.5 wt. %.

In accordance with the present teachings, corrosion inhibitor formulations may optionally include at least one metal ion (e.g., a metal ion derived from a water-soluble metal salt, an insoluble or poorly water-soluble metal compound, a metal oxide, a metal hydroxide, and/or the like, and combinations thereof). In some embodiments, the metal ion may be derived from a water-soluble alkaline earth metal salt (e.g., a calcium salt, a magnesium salt, and/or a strontium salt), an alkaline earth metal compound (e.g., a calcium compound, a magnesium compound, and/or a strontium compound), an alkaline earth metal oxide (e.g., calcium oxide, magnesium oxide, and/or strontium oxide), an alkaline earth metal hydroxide (e.g., calcium hydroxide, magnesium hydroxide, and/or strontium hydroxide), a water-soluble alkali metal salt (e.g., a lithium salt), an alkali metal compound (e.g., a lithium compound), an alkali metal oxide (e.g., lithium oxide), an alkali metal hydroxide(e.g., lithium hydroxide), a transition metal salt (e.g., a zinc salt), a transition metal compound (e.g., a zinc compound), a transition metal oxide (e.g., zinc oxide), a transition metal hydroxide (e.g., zinc hydroxide), and/or a combination thereof.

In some embodiments, a corrosion inhibitor formulation in accordance with the present teachings optionally includes one or more water-soluble alkaline earth metal salts, which will produce an alkaline earth metal ion (in some embodiments, $Ca^{2+}$, $Mg^{2+}$, and/or $Sr^{2+}$) upon dissolution in water. In some embodiments, a corrosion inhibitor formulation in accordance with the present teachings includes one or more water-soluble alkaline earth metal oxides and/or one or more water-soluble alkaline earth metal hydroxides, which will produce an alkaline earth metal ion in the corrosion inhibitor formulation (in some embodiments, $Ca^{2+}$, $Mg^{2+}$, and/or $Sr^{2+}$) upon mixing with other acidic components of the corrosion inhibitor formulation (e.g., benzoic acid and/or the two or more n-alkyl monocarboxylic acids). In some embodiments, the concentration of the alkaline earth metal ion derived from one or more water-soluble alkaline earth metal salts and/or one or more alkaline earth metal oxides and/or one or more alkaline earth metal hydroxides is in the range of about 0 mg/L to about 200 mg/L (i.e., up to about 200 mg/L) in the corrosion inhibitor formulation.

In some embodiments, corrosion inhibitor formulations in accordance with the present teachings may optionally include a water-soluble alkaline earth metal salt and/or an alkaline metal compound that provides a source of calcium ions. In some embodiments, the calcium ions are derived from one or a plurality of calcium compounds or salts (e.g., one or more water-soluble calcium salts). In some embodiments, the calcium ions are derived from one or a plurality of water-soluble calcium salts that are configured to at least partially disassociate in an aqueous solution at room temperature. In some embodiments, the one or the plurality of calcium salts are configured to produce between about 1 and about 60 mg/L calcium ions ($Ca^{2+}$) in the corrosion inhibitor formulation upon dissolution.

Calcium compounds for use in accordance with the present teachings include but are not limited to inorganic calcium compounds and calcium salts of organic acids containing one or a plurality of carboxylic acid groups. Representative inorganic calcium compounds include but are not limited to calcium hydroxide, calcium oxide, calcium molybdate, calcium vanadate, calcium tungstate, calcium perchlorate, calcium chloride, and/or the like, hydrates of any of the aforementioned salts, and combinations thereof. Representative calcium salts of organic acids include but are not limited to calcium acetate, calcium formate, calcium propionate, calcium polymaleate, calcium polyacrylate, calcium lactate, calcium gluconate, calcium glycolate, calcium glucoheptonate, calcium citrate, calcium tartrate, calcium glucarate, calcium succinate, calcium hydroxysuccinate, calcium adipate, calcium oxalate, calcium malonate, calcium sulfamate, calcium salts of aliphatic tricarboxylic acid, calcium salts of aliphatic tetra-carboxylic acid, and/or the like, hydrates of any of the aforementioned calcium salts, and combinations thereof.

In some embodiments, the calcium compound may be a calcium salt formed between calcium ions and a phosphonate or a phosphinate, such as calcium-PBTC salts (where PBTC is 2-phosphonobutane-1,2,4-tricarboxylic acid), calcium-HEDP salts (where HEDP is 1-hydroxethane-1,1-diphosphonic acid), calcium-HPA salts (where HPA is hydroxyphosphono-acetic acid or 2-hydroxy phosphono acetic acid), calcium phosphonosuccinic acid salts, calcium-PSO salts (where PSO is mono-, bis- and oligomeric phosphinosuccinic acid adduct mixtures as described in U.S. Pat. No. 6,572,789 B1), and/or the like, and combinations thereof.

The concentration of calcium ion (Ca') may vary depending on the application. In some embodiments, one or more calcium compounds present in a corrosion inhibitor formulation are soluble in the corrosion inhibitor formulation. As used herein, the term "soluble" refers to a degree of dissolution such that that no particulate matter remains visible to the naked eye. In some embodiments, the concentration of Ca' in a corrosion inhibitor formulation in accordance with the present teachings is between about 0 mg/L and about 200 mg/L (i.e., up to about 200 mg/L). In other embodiments, the concentration $Ca^{2+}$ in a corrosion inhibitor formulation in accordance with the present teachings is between about 0.1 mg/L and about 150 mg/L, between about 0.1 mg/L and about 80 mg/L, between about 0.2 mg/L and about 60 mg/L, 0.2 mg/L and about 40 mg/L, or between about 1 mg/L and about 60 mg/L. In further embodiments, the concentration of calcium ion is between about 3 mg/L and about 40 mg/L. In still further embodiments, the concentration of calcium ion is between about 4 mg/L and about 30 mg/L.

In some embodiments, corrosion inhibitor formulations in accordance with the present teachings may optionally include a water-soluble alkaline earth metal salt and/or an alkaline earth metal compound that provides a source of magnesium ions. In some embodiments, the magnesium ions are derived from one or a plurality of magnesium compounds or salts (e.g., one or more water-soluble magnesium salts). In some embodiments, the magnesium ions are derived from one or a plurality of water-soluble magnesium salts that are configured to at least partially disassociate in an aqueous solution at room temperature. In some embodiments, the one or the plurality of magnesium salts are configured to produce up to about 150 mg/L magnesium ions in the corrosion inhibitor formulation upon dissolution based on the total weight of the corrosion inhibitor formulation.

Magnesium compounds for use in accordance with the present teachings include but are not limited to inorganic magnesium compounds and magnesium salts of organic acids containing one or a plurality of carboxylic acid groups. Representative inorganic magnesium compounds include but are not limited to magnesium molybdate, magnesium hydroxide, magnesium oxide, magnesium tungstate, magnesium sulfate, magnesium perchlorate, magnesium chloride, magnesium vanadate, and/or the like, hydrates of any of the aforementioned magnesium salts, and combinations thereof. Representative magnesium salts of organic acids include but are not limited to magnesium formate, magnesium acetate, magnesium propionate, magnesium polyacrylate, magnesium polymaleate, magnesium lactate, magnesium gluconate, magnesium glycolate, magnesium glucoheptonate, magnesium citrate, magnesium tartrate, magnesium glucarate, magnesium succinate, magnesium hydroxysuccinate, magnesium adipate, magnesium oxalate, magnesium malonate, magnesium sulfamate, and/or the like, and combinations thereof.

In some embodiments, the magnesium compound may be a magnesium salt formed between magnesium ions and a phosphonate or a phosphinate, such as magnesium-PBTC salts (where PBTC is 2-phosphonobutane-1,2,4-tricarboxylic acid), magnesium-HEDP salts (where HEDP is 1-hydroxethane-1,1-diphosphonic acid), magnesium-HPA salts (where HPA is hydroxyphosphono-acetic acid or 2-hydroxy phosphono acetic acid), magnesium phosphonosuccinic acid salts, magnesium-PSO salts (where PSO is mono-, bis-, and oligomeric phosphinosuccinic acid adduct mixtures as described in U.S. Pat. No. 6,572,789 B1), and/or the like, hydrates of the aforementioned salts, or combinations thereof.

The concentration of magnesium ion may vary depending on the application. In some embodiments, one or more magnesium compounds present in a corrosion inhibitor formulation are soluble in the corrosion inhibitor formulation. In some embodiments, the concentration of magnesium ion ($Mg^{2+}$) in a corrosion inhibitor formulation in accordance with the present teachings is between about 0 mg/L and about 200 mg/L (i.e., up to about 200 mg/L). In other embodiments, the concentration of $Mg^{2+}$ in a corrosion inhibitor formulation in accordance with the present teachings is between about 0 mg/L and about 150 mg/L (i.e., up to about 150 mg/L), between about 1 mg/L and about 100 mg/L, between about 0.1 mg/L and about 80 mg/L, between about 0.2 mg/L and about 40 mg/L, or between about 1 mg/L and about 50 mg/L (e.g., 1 mg/L and 25 mg/L). In further embodiments, the concentration of magnesium ion is between about 3 mg/L and about 80 mg/L. In other embodiments, the concentration of magnesium ion is between about 2 mg/L and about 35 mg/L. In further embodiments, the concentration of magnesium ion is between about 4 mg/L and about 30 mg/L.

In some embodiments, corrosion inhibitor formulations in accordance with the present teachings may optionally include a water-soluble alkaline earth metal salt and/or an alkaline earth metal compound that provides a source of strontium ions. In some embodiments, the strontium ions are derived from one or a plurality of strontium compounds or salts (e.g., one or more water-soluble strontium salts). In some embodiments, the strontium ions are derived from one or a plurality of water-soluble strontium salts that are configured to at least partially disassociate in an aqueous solution at room temperature. In some embodiments, the one or the plurality of strontium salts are configured to produce up to about 50 mg/L strontium ions in the corrosion inhibitor formulation upon dissolution based on the total weight of the corrosion inhibitor formulation.

Strontium compounds for use in accordance with the present teachings include but are not limited to inorganic strontium compounds and strontium salts of organic acids containing one or a plurality of carboxylic acid groups. Representative inorganic strontium compounds include but are not limited to strontium hydroxide, strontium oxide, strontium chloride, strontium perchlorate, strontium nitrate, strontium iodide, strontium sulfate, strontium borate, strontium phosphate, strontium dihydrogen phosphate, strontium molybdate, strontium tungstate, strontium titanate, and/or the like, hydrates of any of the aforementioned strontium salts, and combinations thereof. A strontium compound may also be a strontium salt formed between a strontium ion and an organic acid containing one or more carboxylic acid groups, or one or more phosphonic acid groups, or one or more phosphinic acid groups, or a combination of these functional groups. Representative strontium salts of organic acids include but are not limited to strontium formate, strontium acetate, strontium propionate, strontium butyrate, strontium polyacrylate, strontium lactate, strontium polymaleate, strontium gluconate, strontium glycolate, strontium glucoheptonate, strontium citrate, strontium tartrate, strontium glucarate, strontium succinate, strontium hydroxysuccinate, strontium adipate, strontium oxalate, strontium malonate, strontium sulfamate, strontium sebacate, strontium benzoate, strontium phthalate, strontium salicylate, strontium-PBTC (where PBTC is 2-phosphonobutane-1,2,4-tricarboxylic acid) salts, strontium-HEDP (where HEDP is 1-hydroxyethane-1,1-diphosphonic acid) salts, strontium-HPA (where HPA is hydroxyphosphono-acetic acid or 2-hydroxy phosphono acetic acid) salts, strontium phosphonosuccinic acid salts, strontium-PSO (where PSO is mono, bis and oligomeric phosphinosuccinic acid adduct mixtures) salts, or hydrates of these salts, or a combination of the foregoing strontium compounds.

The concentration of strontium ion may vary depending on the application. In some embodiments, one or more strontium compounds present in a corrosion inhibitor formulation are soluble in the corrosion inhibitor formulation. In some embodiments, the concentration of strontium ion ($Sr^{2+}$) in a corrosion inhibitor formulation in accordance with the present teachings is between about 0 mg/L and about 50 mg/L (i.e., up to about 50 mg/L). In other embodiments, the concentration of $Sr^{2+}$ in a corrosion inhibitor formulation in accordance with the present teachings is between about 0.1 mg/L and about 40 mg/L, between about 0.5 mg/L and about 30 mg/L, between about 1 mg/L and about 25 mg/L, between about 2 mg/L and about 20 mg/L, or between about 4 mg/L and about 16 mg/L.

In some embodiments, corrosion inhibitor formulations in accordance with the present teachings may optionally include lithium ions. In some embodiments, the lithium ions are derived from one or a plurality of lithium compounds or salts (e.g., one or more water-soluble lithium salts). In some embodiments, the lithium ions are derived from one or a plurality of water-soluble lithium salts that are configured to at least partially disassociate in an aqueous solution at room temperature. In some embodiments, the one or the plurality of lithium salts are configured to produce lithium ion in a concentration ranging from about 0 ppm to about 6000 ppm (i.e., up to about 6000 ppm) in the corrosion inhibitor formulation upon dissolution based on the total weight of the corrosion inhibitor formulation.

Lithium compounds for use in accordance with the present teachings include but are not limited to inorganic lithium compounds and lithium salts of organic acids containing one or a plurality of carboxylic acid groups. Representative inorganic lithium compounds include but are not limited to lithium hydroxide, lithium oxide, lithium phosphate, lithium borate, lithium perchlorate, lithium sulfate, lithium molybdate, lithium vanadate, lithium tungstate, lithium carbonate, and/or the like, hydrates of any of the aforementioned lithium salts, and combinations thereof. Representative lithium salts of organic acids include but are not limited to lithium acetate, lithium benzoate, lithium polyacrylate, lithium polymaleate, lithium lactate, lithium citrate, lithium tartrate, lithium gluconate, lithium glucoheptonate, lithium glycolate, lithium glucarate, lithium succinate, lithium hydroxyl succinate, lithium adipate, lithium oxalate, lithium malonate, lithium sulfamate, lithium formate, lithium propionate—and/or the like, and combinations thereof.

In some embodiments, the lithium compound may be a lithium salt formed between lithium ions and a phosphonate or a phosphinate, such as lithium-PBTC salts (where PBTC is 2-phosphonobutane-1,2,4-tricarboxylic acid), lithium-HEDP salts (where HEDP is 1-hydroxethane-1,1-diphosphonic acid), lithium-HPA salts (where HPA is hydroxyphosphono-acetic acid or 2-hydroxy phosphono acetic acid), lithium phosphonosuccinic acid salts, lithium-PSO salts (where PSO is mono-, bis-, and oligomeric phosphinosuccinic acid adduct mixtures as described in U.S. Pat. No. 6,572,789 B1), and/or the like, hydrates of the aforementioned salts, or combinations thereof.

The concentration of lithium ion may vary depending on the application. In some embodiments, one or more lithium compounds present in a corrosion inhibitor formulation are soluble in the corrosion inhibitor formulation. In some embodiments, the concentration of lithium ion ($Li^+$) in a corrosion inhibitor formulation in accordance with the present teachings is between about 0 ppm and about 6000 ppm (e.g., between about 0 ppm and about 5000 ppm) based on the total weight of the corrosion inhibitor formulation. Within this range, the lithium ion concentration may be less than about 4000 ppm and, in some embodiments, less than or equal to about 3000 ppm. Also within this range, the lithium ion concentration may be greater than or equal to about 50 ppm and, in some embodiments, greater than or equal to about 100 ppm, and in other embodiments greater than or equal to about 200 ppm.

In some embodiments, corrosion inhibitor formulations in accordance with the present teachings may optionally include zinc ions. In some embodiments, the zinc ions are derived from one or a plurality of zinc compounds or salts (e.g., one or more water-soluble zinc salts). In some embodiments, the zinc ions are derived from one or a plurality of water-soluble zinc salts that are configured to at least partially disassociate in an aqueous solution at room temperature. In some embodiments, the one or the plurality of zinc salts are configured to produce zinc ion in a concentration ranging from about 0 ppm to about 50 ppm (i.e., up to about 50 ppm) in the corrosion inhibitor formulation upon dissolution based on the total weight of the corrosion inhibitor formulation. Zinc compounds for use in accordance with the present teachings include but are not limited to inorganic zinc compounds and zinc salts of organic acids containing one or a plurality of carboxylic acid groups. Representative inorganic zinc compounds include but are not limited to zinc hydroxide, zinc oxide, zinc nitrate, zinc sulfate, zinc chloride, zinc perchlorate, zinc chlorate, zinc bromide, zinc bromate, zinc iodide, and/or the like, hydrates of any of the aforementioned zinc salts, and combinations thereof. A zinc compound suitable for use may also be a zinc salt formed between a zinc ion and an organic acid containing one or more carboxylic acid groups, one or more phosphonic acid groups, one or more phosphinic acid groups, or a combination of these functional groups. Representative organic zinc salts of organic acids include but are not limited to zinc formate, zinc acetate, zinc propionate, zinc butyrate, zinc lactate, zinc glycolate, zinc gluconate, zinc glucoheptonate, zinc malonate, zinc succinate, zinc glucarate, zinc hydroxysuccinate, zinc citrate, zinc benzoate, zinc phthalate, zinc adipate, zinc salicylate, zinc polyacrylate, zinc polymaleate, zinc-PBTC (where PBTC is 2-phosphonobutane-1,2,4-tricarboxylic acid) salts, zinc-HEDP (where HEDP is 1-hydroxyethane-1,1-diphosphonic acid or 1-hydroxyethylidene-1,1-diphosphonic acid) salts, zinc-HPA (where HPA is hydroxyphosphono-acetic acid or 2-hydroxy phosphono acetic acid) salts, zinc phosphonosuccinic acid salts, zinc phosphinosuccinic salts, zinc-PSO salts (where PSO is mono, bis-, and oligomeric phosphinosuccinic acid adduct mixtures), and/or the like, hydrates of the aforementioned salts, or combinations thereof.

The concentration of zinc ion may vary depending on the application. In some embodiments, one or more zinc compounds present in a corrosion inhibitor formulation are soluble in the corrosion inhibitor formulation. In some embodiments, the concentration of zinc ion ($Zn^{2+}$) in a corrosion inhibitor formulation in accordance with the present teachings is between about 0 mg/L and about 50 mg/L (i.e., up to about 50 mg/L). In other embodiments, the concentration of $Zn^{2+}$ in a corrosion inhibitor formulation in accordance with the present teachings is between about 0.1 mg/L and about 40 mg/L, between about 0.5 mg/L and about 30 mg/L, between about 1 mg/L and about 25 mg/L, between about 2 mg/L and about 20 mg/L, or between about 4 mg/L and about 16 mg/L.

In some embodiments, corrosion inhibitor formulations in accordance with the present teachings may optionally include one or more nitrites. In some embodiments, a nitrite is present if at least one or more inorganic phosphates and/or organophosphates is also present in the corrosion inhibitor formulation. In some embodiments, the nitrite ions are derived from one or a plurality of nitrite salts (e.g., one or more water-soluble nitrite salts). Representative nitrites for use in accordance with the present teachings include but are not limited to alkali metal nitrites and alkaline earth metal nitrites, such as sodium nitrite, potassium nitrite, lithium nitrite, calcium nitrite, magnesium nitrite, strontium nitrite, and/or the like, hydrates of the aforementioned salts, or combinations thereof. Representative nitrites for use in accordance with the present teachings also include but are not limited to rare earth metal nitrites, such as lanthanum (III) nitrate, and other rare earth metal (e.g., Sc, Y, Ce, Nd, Sm, Eu, Gd, Dy, Er and Yb, etc.) nitrites, and/or the like, hydrates of the aforementioned salts, or combinations thereof.

The concentration of nitrite ion may vary depending on the application. In some embodiments, one or more nitrite compounds present in a corrosion inhibitor formulation are soluble in the corrosion inhibitor formulation. In some embodiments, the nitrite compound is present in an amount from about 0 wt. % to about 4 wt. % (i.e., up to about 4 wt. %), in some embodiments about 0 wt. % to 1 wt. % (i.e., up to about 1 wt. %), in some embodiments, about 0 wt. % to 0.5 wt. % (i.e., up to about 0.5 wt. %) based on the total weight of the corrosion inhibitor formulation.

In some embodiments, corrosion inhibitor formulations in accordance with the present teachings may optionally include one or more nitrates. In some embodiments, a nitrate is present if at least one or more inorganic phosphates and/or organophosphates is also present in the corrosion inhibitor formulation. In some embodiments, the nitrate ions are derived from one or a plurality of nitrate salts (e.g., one or more water-soluble nitrate salts). Representative nitrates for use in accordance with the present teachings include but are not limited to alkali metal nitrates and alkaline earth metal nitrates, such as sodium nitrate, potassium nitrate, lithium nitrate, calcium nitrate, magnesium nitrate, strontium nitrate, and/or the like, hydrates of the aforementioned salts, or combinations thereof. Representative nitrates for use in accordance with the present teachings also include but are not limited to rare earth metal nitrates, such as cerium (IV) nitrate, cerium (III) nitrate, and other rare earth metal (e.g., Sc, Y, La, Pr, Nd, Pm, Sm, Eu, Gd, Tb, Dy, Ho, Er, Tm, Lu, and Yb) nitrates, and/or the like, hydrates of the aforementioned salts, or combinations thereof.

The concentration of nitrate ion may vary depending on the application. In some embodiments, one or more nitrate compounds present in a corrosion inhibitor formulation are soluble in the corrosion inhibitor formulation. In some embodiments, the nitrate compound is present in an amount from 0 wt. % to about 4 wt. % (i.e., up to about 4 wt. %), in some embodiments about 0 wt. % to about 1 wt. % (i.e., up to about 1 wt. %), in some embodiments, about 0 wt. % to about 0.5 wt. % (i.e., up to about 0.5 wt. %) based on the total weight of the corrosion inhibitor formulation.

In some embodiments, corrosion inhibitor formulations in accordance with the present teachings may optionally include a silicate. Silicates suitable for use in accordance with the present teachings include inorganic silicates and organic silicates. Useful inorganic silicates are represented by the general formula (2):

$$(MO)_m SiO_{(4-n/2)}(OH)_l \qquad (2)$$

where M is a monovalent cation that forms a glycol or water-soluble silicate selected from the group consisting of sodium, potassium, lithium, rubidium, and tetraorganoammonium cations; "m" has a value of 1 to 4 inclusive; "l" has a value from 0 to 3 inclusive; and "n" has a value from 1 to 4 inclusive, and is equal to the sum of "m" and "l."

The concentration of silicates present in the corrosion inhibitor formulation may vary depending on the application. In some embodiments, the silicate may be present in the corrosion inhibitor formulation in an amount from about 0 ppm to about 8,000 ppm as Si (i.e., up to about 8,000 ppm), in some embodiments from about 0 ppm to about 2,000 ppm as Si (i.e., up to about 2,000 ppm), in some embodiments from about 0 ppm to about 1000 ppm (i.e., up to about 1,000 ppm) as Si, and in some embodiments less than about 700 ppm as Si in the corrosion inhibitor formulation.

Useful organic silicates include silicate esters represented by the general formula (3):

$$Si(OR)_4 \qquad (3);$$

wherein R is selected from the group consisting of $C_1$ to $C_{36}$ alkyl, aryl, alkoxyalkyl, alkoxyaryl, hydroxyalkoxy, and mixtures thereof. In some embodiments, a tetraalkylorthosilicate ester with the alkyl groups containing 1 to 20 carbon atoms (e.g., tetramethylorthosilicate, tetraethylorthosilicate, and the like) may be used. The silicate ester is present in the corrosion inhibitor formulation formulation in an amount from about 0% to about 5% by weight (i.e., up to about 5 wt. %), for example about 0.01 to about 5% by weight, based on the total weight of the heat transfer fluid.

Colloidal silica may optionally be included for use as a corrosion inhibitor in accordance with the present teachings. The colloidal silica has a nominal particle size between about 1 nm and about 200 nm. In some embodiments, the colloidal silica particle size is about 1 nm to about 100 nm. In other embodiments, the colloidal silica particle diameter is between about 1 nm and about 40 nm. Suitable colloidal silicas for use in accordance with the present teachings include but are not limited to Ludox colloidal silica from DuPont or Grace Davidson, Nyacol and/or Bindzil colloidal silica from Akzo Nobel-Eka Chemicals, Snowtex colloidal silica from Nissan Chemical, as well as colloidal silica from Nalco and other suppliers. While neither desiring to be bound by any particular theory nor intending to limit in any measure the scope of the appended claims or their equivalents, it is presently believed that by using colloidal silica in a heat transfer fluid, the nanoparticles may increase heat transfer efficiency and/or heat capacity of the heat transfer fluids. In some embodiments, the colloidal silica is present in the formulation in an amount of about 0 ppm to about 20,000 ppm (i.e., up to about 20,000 ppm) and, in some embodiments, from about 0 ppm to about 2,000 ppm (i.e., up to about 2,000 ppm) of the corrosion inhibitor formulation.

In some embodiments, corrosion inhibitor formulations in accordance with the present teachings may optionally include a silicate stabilizer. Representative silicate stabilizers for use in accordance with the present teachings include but are not limited to a silicate stabilizing organosilane compound. As used herein, the term "organosilane" refers to a silane (i.e., a monomeric silicon chemical) that contains at least one carbon-silicon bond (Si—C) structure. Silicate stabilizing organosilane compounds for use in accordance with the present teachings include but are not limited to sodium 3-(trihydroxysilyl)-propylmethylphosphonate (CAS no. 84962-98-1 or Q1-6083 silicone from Dow-Corning Corp. of Midland, Mich.); polyalkyleneoxidealoxysilane [e.g., methoxypolyethyleneoxypropyltrimethoxysilane having the formula: $CH_3O(CH_2CH_2O)_m C_3H_6Si(OCH_3)_3$, where m has an average value of 7.2, or methoxypolyethyleneoxypropyltripropoxylsilane having the formula $CH_3O(CH_2CH_2O)_7 C_3H_6Si(OC_3H_7)_3$]; Silquest® Y-5560 or Silquest® Y-5630 from Momentive Performance Materials Inc. (Waterford, N.Y.); sodium salts of 3-(trihydroxylsilyl)-propyl ethoxyl phosphonate [e.g., $(HO)_3Si—C_3H_6—P(O)(ONa)(OC_2H_5)$]; one or more of the alkali metal siliconate silylalkylphosphonates described in U.S. Pat. No. 4,370,255; one or more of the arylalkyl silicone sulfonates described in EP Patent No. 0061694B1; one or more of the organosilane silicate stabilizers described in U.S. Pat. No. 4,629,602; one or more of the silicate stabilizers described in U.S. Pat. Nos. 3,337,496 and 3,341,469; and/or the like; and combinations thereof.

The concentration of silicate stabilizer may vary depending on the application. In some embodiments, the amount of the silicate stabilizer ranges from about 0 wt. % to about 5 wt. % (i.e., up to about 5 wt. %) based on the total weight of the corrosion inhibitor formulation. In some embodiments, the amount of silicate stabilizer present in the corrosion inhibitor formulation is proportional to the amount of silicate present in the corrosion inhibitor formulation, where the silicate:silicate-stabilizer ratio ranges from about 20:1 to about 1:10 by weight. In some embodiments, the silicate:silicate stabilizer ratio ranges from about 10:1 to about 1:2 by weight.

In some embodiments, the silicate component in the heat transfer fluid may be a copolymer of silicate and organosilane. Examples include but are not limited to phosphonate-silicate, sulfonate-silicate, carboxylate-silicate, and siloxane-silicate copolymers used in silicate-containing antifreeze/coolant compositions. These copolymers may be preformed or may be formed in situ by combining a water-soluble silicate and a water-soluble phosphonate silane, sulfonate silane, or carboxylate silane in an aqueous solution at ambient temperature. While neither desiring to be bound by any particular theory nor intending to limit in any measure the scope of the appended claims or their equivalents, it is presently believed that these copolymers may provide improved metal corrosion inhibition over the use of simple alkali metal silicates since the organosilane-silicate copolymers substantially inhibit the gelation tendency of water soluble silicate at a pH of between about 7 and about 11 in the glycol-water based antifreeze/coolant solutions. Representative silicate-organosilane copolymers that may be used in accordance with the present teachings include but are not limited to those described in U.S. Pat. Nos. 3,198,820; 3,337,496; 3,341,496; 3,312,622; 3,248,329; 3,203,969; 4,093,641; 4,287,077; 4,333,843; 4,352,742; 4,354,002; 4,362,644; 4,434,065; 4,370,255; 4,629,602; 4,701,277; 4,772,408; and 4,965,344; European Patent No. 0,061,694 B1; and U.S. Patent Application Publication No. 2006/0017044A1.

Corrosion inhibitor formulations in accordance with the present teachings may optionally include one or a plurality of water-soluble (polyelectrolyte) polymers. Illustrative examples of water-soluble polymers suitable for use in a corrosion inhibitor formulation in accordance with the present teachings include water-soluble polymers such as polyelectrolyte dispersants derived from a polymerizable monomer. The polymerizable monomer contains at least one group selected from the group consisting of unsaturated carboxylic acids or salts, unsaturated amides, unsaturated acid anhydrides, unsaturated nitriles, unsaturated carbonyl halides, unsaturated carboxylate esters, unsaturated ethers, unsaturated alcohols, unsaturated sulfonic acids or salts, unsaturated phosphonic acids or salts, unsaturated phosphinic acids or salts, and/or the like, and combinations thereof.

In some embodiments, water-soluble polymers suitable for use in a corrosion inhibitor formulation in accordance with the present teachings include homopolymers, copolymers, terpolymers, and inter-polymers having (1) at least one monomeric unit containing a $C_3$ to $C_{16}$ monoethylenically unsaturated mono- or dicarboxylic acid or their alkali metal or ammonium salts; or (2) at least one monomeric unit containing a $C_3$ to $C_{16}$ monoethylenically unsaturated mono- or dicarboxylic acid derivative such as an amide, nitrile, carboxylate ester, acid halide (e.g., acid chloride), acid anhydride, and/or the like, and combinations thereof. In some embodiments, a water-soluble polymer suitable for use in accordance with the present teachings may include at least 5% mer units of (1) or (2) and, in some embodiments, at least 10% mer units of (1) or (2).

Representative monocarboxylic acids suitable for use in making water-soluble polymers that may be used in a corrosion inhibitor formulation in accordance with the present teachings include but are not limited to acrylic acid, methacrylic acid, ethyl acrylic acid, vinylacetic acid, allylacetic acid, and crotonic acid.

Representative monocarboxylic acid esters suitable for use in making water-soluble polymers that may be used in a corrosion inhibitor formulation in accordance with the present teachings include but are not limited to butyl acrylate, n-hexyl acrylate, tert-butylaminoethyl methacrylate, diethylaminoethyl acrylate, hydroxyethyl methacrylate, hydroxyethyl acrylate, hydroxypropyl acrylate, hydroxypropyl methacrylate, diethylaminoethyl methacrylate, dimethylaminoethyl methacrylate, dimethylaminoethyl acrylate, methyl acrylate, methyl methacrylate, tertiary butylacrylate, and vinyl acetate.

Representative dicarboxylic acids suitable for use in making water-soluble polymers that may be used in a corrosion inhibitor formulation in accordance with the present teachings include but are not limited to maleic acid, itaconic acid, fumaric acid, citaconic acid, mesaconic acid, and methylenemalonic acid.

Representative amides suitable for use in making water-soluble polymers that may be used in a corrosion inhibitor formulation in accordance with the present teachings include but are not limited to acrylamide (or 2-propenamide), methacrylamide, ethyl acrylamide, propyl acrylamide, N-t-butylacrylamide, tertiary butyl methacrylamide, tertiary octyl acrylamide, N,N-dimethylacrylamide (or N, N-dimethyl-2-propenamide), dimethylaminopropyl methacrylamide, cyclohexyl acrylamide, benzyl methacrylamide, vinyl acetamide, sulfomethylacrylamide, sulfoethylacrylamide, 2-hydroxy-3-sulfopropyl acrylamide, sulfophenylacrylamide, N-vinyl formamide, N-vinyl acetamide, 2-hydroxy-3-sulfopropyl acrylamide, N-vinyl pyrrolidone (a cyclic amide), 2-vinylpyridene, 4-vinylpyridenem and carboxymethylacrylamide.

Representative anhydrides suitable for use in making water-soluble polymers that may be used in a corrosion inhibitor formulation in accordance with the present teachings include but are not limited to maleic anhydride (or 2,5-furandione) and succinic anhydride.

Representative nitriles suitable for use in making water-soluble polymers that may be used in a corrosion inhibitor formulation in accordance with the present teachings include but are not limited to acrylonitrile and methacrylonitrile.

Representative acid halides suitable for use in making water-soluble polymers that may be used in a corrosion inhibitor formulation in accordance with the present teachings include but are not limited to acrylamidopropyltrimethylammonium chloride, diallyldimethylammonium chloride, and methacrylamidopropyltrimethylammonium chloride.

In some embodiments, a water-soluble polymer for use in a corrosion inhibitor formulation accordance with the present teachings contains at least one monomeric unit selected from the group consisting of allylhydroxypropylsulfonate, AMPS or 2-acrylamido-2-methylpropane sulfonic acid, polyethyleneglycol monomethacrylate, vinyl sulfonic acid, styrene sulfonic acid, acrylamidomethyl propane sulfonic acid, methallyl sulfonic acid, allyloxybenzenesulfonic acid, 1,2-dihydroxy-3-butene, allyl alcohol, allyl phosphonic acid, ethylene glycoldiacrylate, aspartic acid, hydroxamic acid, 2-ethyl-oxazoline, adipic acid, diethylenetriamine, ethylene oxide, propylene oxide, ammonia, ethylene diamine, dimethylamine, diallyl phthalate, 3-allyloxy-2-hydroxy propane sulfonic acid, polyethylene glycol monomethacrylate, sodium styrene sulfonate, an alkoxylated allyl alcohol sulfonate, and/or the like, and combinations thereof.

In some embodiments, the water-soluble polymer suitable for use in a corrosion inhibitor formulation in accordance with the present teachings contains at least 5 mole % of mer units (e.g., as polymerized units) resulting from the polymerization of one or more monomers selected from the group consisting of (a) acrylic acid, methacrylic acid, crotonic acid, vinyl acetic acid, 4-methyl-4 penenoic acid, maleic acid, maleic anhydride, 1,2,3,6-tetrahydrophthalic anhydride, 3,6-epoxy-1,2,3,6-tetrahydrophthalic anhydride, 5-norbornene-2,3-dicarboxylic anhydride, bicycle[2,2,2]-5-octene-2,3-dicarboxylic anhydride, 3-methyl-1,2,6-tetrahydrophthalic anhydride, 2-methyl-1,3,6-tetrahydrophthalic anhydride, itaconic acid, mesaconic acid, methylenemalonic acid, fumaric acid, citraconic acid, 2-acrylamido-2-methylpropanesulfonic acid, 3-allyloxy-2-hydroxy propane sulfonic acid, allyl phosphonic acid, allyloxybenzenesulfonic acid, 2-hydroxy-3-(2-propenyloxy)propanesulfonic acid, allylsulfonic acid, other acrylamidomethyl propane sulfonic acids, methallyl sulfonic acid, isopro-phenylsulfonic acid, vinylphosphonic acid, styrenesulfonic acid, vinylsulfonic acid, aspartic acid, hydroxamic acid, adipic acid, and the alkali metal or ammonium salts of any of the foregoing; (b) methyl acrylate, ethyl acrylate, butyl acrylate, n-hexyl acrylate, methyl methacrylate, ethyl methacrylate, butyl methacrylate, isobutyl methacrylate, tert-butylaminoethyl methacrylate, diethylaminoethyl acrylate, hydroxyethyl methacrylate, hydroxyethyl acrylate, hydroxypropyl acrylate, hydroxypropyl methacrylate, diethylaminoethyl methacrylate, dimethylaminoethyl methacrylate, dimethylaminoethyl acrylate, tertiary butylacrylate, polyethyleneglycol monomethacrylate, phosphoethyl methacrylate, and vinyl acetate; (c) acrylamide (or 2-propenamide), methacrylamide, ethyl acrylamide, propyl acrylamide, N-t-butylacrylamide, tertiary butyl methacrylamide, tertiary octyl acrylamide, N-methylacrylamide, N,N-dimethylacrylamide (or N, N-dimethyl-2-propenamide), dimethylaminopropyl methacrylamide, cyclohexyl acrylamide, benzyl methacrylamide, vinyl acetamide, sulfomethylacrylamide, sulfoethylacrylamide, 2-hydroxy-3-sulfopropyl acrylamide, sulfophenylacrylamide, N-vinyl formamide, N-vinyl acetamide, 2-hydroxy-3-sulfopropyl acrylamide, N-vinyl pyrrolidone (a cyclic amide), 2-vinylpyridene, 4-vinylpyridenem, and carboxymethylacrylamide; (d) maleic anhydride (or 2, 5-furandione) and succinic anhydride; acrylonitrile, and methacrylonitrile; (e) acrylamidopropyltrimethylammonium chloride, diallyldimethylammonium chloride, and methacrylamidopropyltrimethylammonium chloride; (f) 1,2-dihydroxy-3-butene, allyl alcohol, ethylene glycoldiacrylate, 2-ethyl-oxazoline, diethylenetriamine, ethylene oxide, propylene oxide, ammonia, styrene, ethylene diamine, dimethylamine, diallyl phthalate, polyethylene glycol monomethacrylate, sodium styrene sulfonate, and an alkoxylated allyl alcohol sulfonate; and (g) combinations thereof.

In some embodiments, a representative alkoxylated allyl alcohol sulfonate monomer for use in preparing a water-soluble polymer in accordance with the present teachings has the structure shown in general formula (4):

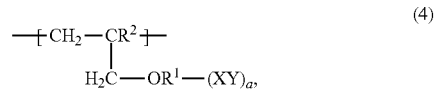

wherein $R^1$ is a hydroxyl substituted alkyl or alkylene radical having 1 to about 10 carbon atoms, or $R^1$ is a non-substituted alkyl or alkylene radical having 1 to about 10 carbon atoms, or $R^1$ is $-(CH_2-CH_2-O)_n-$, $[CH_2-CH(CH_3)-O]_n-$, or combination thereof; wherein "n" is an integer from about 1 to about 50; wherein $R^2$ is H or a lower alkyl ($C_1$-$C_3$) group; wherein X, when present, is an anionic radical selected from the group consisting of $-SO_3$, $-PO_3$, $-PO_4$, and $-COO$; wherein Y, when present, is H or any water-soluble cation or cations which together counterbalance the valance of the anionic radical; and wherein a is 0 or 1. In some embodiments, a=1.

Representative water-soluble polyelectrolyte polymers suitable for use in a corrosion inhibitor formulation in accordance with the present teachings may, in some embodiments, have a molecular weight (MW) ranging from about 200 Daltons to about 200,000 Daltons. In other embodiments, suitable water-soluble polyelectrolyte polymer dispersants have a molecular weight (MW) ranging from about 500 Daltons to about 20,000 Daltons.

Illustrative water-soluble polyelectrolyte polymers suitable for use in a corrosion inhibitor formulation in accordance with the present teachings include but are not limited to polycarboxylates. Representative polycarboxylates include but are not limited to (1) polyacrylic acids or polyacrylates, acrylate-based polymers, copolymers, terpolymers, and quad-polymers such as acrylate/acrylamide copolymers, acrylate/AMPS (acrylamido methylene sulfonic acid or 2-acrylamido-2-methyl-1-propanesulfonic acid) or acrylamidoalkane sulfonic acid copolymers, acrylate/sulfonate copolymers, acrylate/hydroxyalkyl acrylate copolymers, acrylate/alkyl acrylate copolymers, acrylate/AMPS/alkyl acrylamide terpolymers, acrylate/acrylamidoalkane sulfonic acid/styrene sulfonic acid (or water-soluble salts) terpolymers, acrylate/acrylamide/sulfoalkylacrylamide terpolymers, acrylic acid/allyloxy-2-hydroxypropylsulfonic acid(AHPSE)/polyethyleneglycol allyl ether terpolymer, acrylate/methacrylate methyl ester/2-propane-1-sulfonic acid, 2-methyl-, sodium salt/bezenesulfonic acid, 4-[(2-methyl-2-propenyl)oxy]-, sodium salt quad-polymers; (2) polymethacrylic acids or polymethacrylates, methacrylate-based polymers, copolymers, terpolymers, and quad-polymers, where one monomer of the corresponding acrylate-based polymers listed in (1) is replaced by methacrylate or methacrylic acid; (3) polymaleic acid or maleic anhydride polymers, maleic acid based polymers, their copolymers, terpolymers and quad-polymers, where one monomer of the corresponding acrylate-based polymers listed in (1) is replaced by maleic acid or maleic anhydride; (4) polyacrylamides, modified acrylamide-based polymers, and acrylamide-based copolymers, terpolymers and quad-polymers, where one monomer of the corresponding acrylate-based polymers listed in (1) is replaced by acrylamide; (5) sulfonic acid-based copolymers, terpolymers and quad-polymers or their water-soluble salts; phosphonic acid-based copolymers, terpolymers and quad-polymers or their water-soluble salts; phosphinic acid-based copolymers, terpolymers and quad-polymers or their water-soluble salts; (6) vinylpyrrolidone-based homopolymers, and copolymers; (7) alkylene oxide-based copolymers and terpolymers; and combinations comprising one or more of the foregoing.

A water-soluble polymer for use in a corrosion inhibitor formulation in accordance with the present teachings may also be either a polyether polyamino methylene phosphonate as described in U.S. Pat. No. 5,338,477 or a phosphino polyacrylate acid.

Representative examples of commercially available polymers suitable for use as water-soluble polyelectrolyte polymers in a corrosion inhibitor formulation in accordance with the present teachings include but are not limited to (a) the Good-Rite® K-700 series of polymers shown in Table 1 available from Noveon (or Lubrizol), (b) the polymers shown in Table 2 available from AkzoNobel, and (c) the polymers shown in Table 3 available from Dow (Rohm & Haas).

Polymers supplied by Noveon (or Lubrizol) that may be used as a water soluble polyelectrolyte polymer in the corrosion inhibitor formulation include those shown in Table 1 below.

TABLE 1

Polymers supplied by Noveon (or Lubrizol): Good-Rite ® K-700 series polymers.

| Good-Rite ® Polymer Technical Data Sheet | Chemical Type | Nominal Molecular Weight | pH | Total Solids | Active Solids |
|---|---|---|---|---|---|
| K-702 | PAA | 240,000 | 2.5 | 25% | 24.70% |
| K-7028 | PAA | 2,000 | 3.6 | 55% | 51.70% |
| K-7058 | PAA | 5,000 | 2.5 | 50% | 49.20% |
| K-7058N | NaPAA | 5,000 | 7 | 45% | 35.70% |
| K-7058D | NaPAA | 5,000 | 7.5* | 100%** | 70% |
| K-7600N | NaPAA | 60,000 | 8.2 | 33% | 25.70% |
| K-732 | PAA | 5,000 | 2.6 | 50% | 49.50% |
| K-739 | NaPAA | 5,000 | 7.5* | 100%** | 70.10% |
| K-752 | PAA | 2,000 | 2.6 | 63% | 62.20% |
| K-759 | NaPAA | 2,000 | 7.5* | 100%** | 71.50% |
| K-765 | NaPMAA | 30,000 | 7 | 30% | 24.30% |
| K-766 | NaPMAA | 5,000 | 7 | 40% | 30.10% |
| K-776 | AA/SA | N.P. | 4.8 | 37% | 30.60% |
| K-775 | AA/SA | N.P. | 3.5 | 50% | 48% |
| K-781 | AA/SA/SS | N.P. | 2.8 | 55% | 52.80% |
| K-797 | AA/SA/SS | N.P. | 2.7 | 50% | 48.50% |
| K-797D | Na(AA/SA/SS) | N.P. | 8.2* | 100%** | 74.30% |
| K-798 | AA/SA/SS | N.P. | 2.8 | 50% | 48% |
| K-XP212 | Proprietary | N.P. | 4 | 40% | 39.20% |

PAA = Polyacrylate,
NaPAA = Sodium Polyacrylate,
NaPMAA = Sodium Polymethacrylate
AA = Acrylic Acid,
SA = Sulfonic Acid or AMPS,
SS = Sodium Styrene Sulfonate
'Active Solids' = 'Total Solids' - 'Counter Ions' (sodium) from post polymerization neutralization with NaOH
*pH of a 1% solution
**Includes moisture content
N.P. Not published Polymers supplied by AkzoNobel that may be used as a water soluble polyelectrolyte polymer in the corrosion inhibitor formulation those shown in Table 2 below.

TABLE 2

AkzoNobel Aquatreat Industrial Water Treatment Products Typical Property.

| Product | Total Solids | pH | MW |
|---|---|---|---|
| Polyacrylic Acid | | | |
| AR-4 | 25 | 2.1 | 60000 |
| AR-6 | 25 | 2.3 | 100000 |
| AR-260 | 50 | 3.2 | 2000 |
| AR-602A | 50 | 2.8 | 4500 |
| AR-900A[1] | 50 | 2.9 | 2600 |
| AR-921A | 50 | 2.6 | 3000 |
| AR-935 | 35 | 3.5 | 2500 |
| Sodium Polyacrylate | | | |
| AR-602N[1] | 45 | 7.5 | 4500 |
| AR-636 | 45 | 7.5 | 5000 |
| AR-900[1] | 33 | 5.5 | 2600 |
| AR-940[1] | 40 | 8.3 | 2600 |
| Sodium Polymethacrylate | | | |
| AR-231[1] | 30 | 8.5 | 6500 |
| AR-232[1] | 30 | 8.5 | 9500 |
| AR-241 | 40 | 7 | 6500 |
| Copolymer | | | |
| AR-335 | 49 | 7.2 | 3400 |
| AR-540[1] | 44 | 4.3 | 10000 |
| AR-545 | 44 | 4.4 | 5000 |
| AR-546 | 37 | 4.8 | 9900 min |
| AR-978 | 42 | 5 | 4500 |
| AR-980[1] | 41 | 6.4 | 2800 |
| Sulfonated Styrene Maleic Anhydride | | | |
| VERSA-TL 3 | 95 | 7 | 20000 |
| VERSA-TL 4 | 25 | 7 | 20000 |

AR-335 is polyacrylamide; AR-545 and AR-546 are AA/AMPS copolymers; Aquatreat AR-540 is an Acrylic acid (AA)/2-propenoic acid, 2-methyl, methyl ester/benzenesulfonic acid, 4-[(2-methyl-2-propenyl)oxy]-, sodium salt/2-propene-1-sulfonic acid, 2-methyl-, sodium salt terpolymer. Versa TL-4=sulfonated styrene/maleic anhydride copolymer. Versa TL-3 is the dry form of Versa TL-4. AR-978 is acrylic acid/maleic acid copolymer. AR-980 is an acrylic acid/maleic acid/Nonionic monomer terpolymer.

Polymers supplied by Dow (Rohm & Haas) that may be used as a water soluble polyelectrolyte polymer in the corrosion inhibitor formulation include those shown in Table 3 below.

TABLE 3

Polymers available from Dow (Rohm & Haas).

| Product Name | Chemical Nature | Molecular Weight | % Solids | pH |
|---|---|---|---|---|
| Acumer ® 1000/Optidose ™ 1000 | Polyacrylic acid and its Na salts | 2,000 | 47-49 | 3.2-4.0 |
| Acumer ® 1020 | Polyacrylic acid | 2,000 | 39-41 | 2.1-2.5 |
| Acumer ® 1100 | Polyacrylic acid and its Na salts | 4,500 | 47-49 | 3.2-4.0 |

TABLE 3-continued

Polymers available from Dow (Rohm & Haas).

| Product Name | Chemical Nature | Molecular Weight | % Solids | pH |
|---|---|---|---|---|
| Acumer ® 1110 | Polyacrylic acid and its Na salts | 4,500 | 44-46 | 6.7 |
| Acumer ® 1050 | Polyacrylic acid and its Na salts | 2,000-2,300 | 47-49 | 3.2-4.0 |
| Acumer ® 1510 | Na Salt of Polycarboxylate | 60,000 | 24-26 | 2 |
| Acumer ® 1808 | Na Salt of Polycarboxylate | 30,000 | 21-22 | 3.5-5.0 |
| Acumer ® 1850 | Na Salt of Polycarboxylate | 30,000 | 29-31 | 9.0-10.8 |
| Acumer ® 2000/Optidose ™ 2000 | Modified Polycarboxylate | 4,500 | 42.5-43.5 | 3.8-4.6 |
| Acumer ® 2100 | Copolymer | 11,000 | 36.5-37.5 | 4.3-5.3 |
| Acumer ® 3100/Optidose ™ 3100 | Carboxylate/Sulfonate/Nonionic Terpolymer | 4,500 | 43-44 | 2.1-2.6 |
| Acumer ® 4161 | Phosphinopolycarboxylic Acid | 3,300-3,900 | 46-48 | 3.0-3.5 |
| Optidose ™ 4210 | Polymaleic Acid | 500-1,000 | 50 | 1.0-2.0 |
| Acumer ® 5000 | Proprietary Polymer | 5,000 | 44.5-45.5 | 2.1-2.6 |
| Tamol ® 850 | Na Salt of Polycarboxylate | 30,000 | 29-31 | 9.8-10.8 |
| Tamol ® 731A | Maleic Anhydride Na Salt Copolymer | 15,000 | 24-26 | 9.5-10.5 |
| Tamol ® 960 | Na Salt of Polycarboxylate | 5,000 | 39-41 | 8-9 |

Note:
Acumer 2000 and 2100 are carboxylic acid/sulfonic acid copolymers (i.e., AA/AMPS copolymers); Acumer 3100 and Acumer 5000 are acrylic acid/tert-butyl acrylamide/2-acrylamido-2-methyl propane sulfonic acid terpolymers. Optidose 1000, 2000 and Optidose 3100 are tagged versions of Acumer 1000, 2000, and 3100, respectively.

In some embodiments, a water-soluble polymer suitable for use in a corrosion inhibitor formulation in accordance with the present teachings is selected from the following commercially-available polymers: (1) polymers available from BASF under the SOKALAN and TAMOL brands, including but not limited to Sokalan CP 9 (maleic acid based polymer), Sokalan CP 10, CP 42, 10S, 12S (all are acrylate-based polymers), 135, Sokalan HP 22 G, HP 25, HP 59 and HP165 (polyvinylpyrrolidone), Solakan PA 15, PA 20, PA 25 Cl, PA 30 Cl, PA 40, Sokalan PM 10 I, PM 70, Tamol VS, and other similar products; (2) polymers available from Cytec under the CYANAMER brand including but not limited to P-35, P-70, P-80, A-100L and A-15 (all are acrylate- or acrylamide-based polymers or copolymers) and the like; (3) polymers available from Biolab additives under the BLECLENE and BELSPERSE brands, including but not limited to Beclene 200 (maleic acid homopolymer), 283 (maleic acid terpolymer), 400 (sulfonated phosphino polycarboxylic acid) and 499 (sulfonated phosphono polycarboxylic acid); and Belsperse 161 (phosphino polycarboxylic acid) and 164 (phosphino polycarboxylic acid), and the like and (4) water-soluble polymeric products available from Nalco (e.g., acrylic acid/2-acrylamido-2-methylpropyl sulfonic acid copolymers, polyether polyamino phosphonate as described in U.S. Pat. No. 5,338,477, and acrylic acid/acrylamide/acrylamidomethanesulfonic acid terpolymers), GE Betz (e.g., acrylic acid/polyethyleneglycol allyl ether copolymers, acrylic acid/allyloxy-2-hydroxypropylsulfonic acid (or AHPSE)/polyethyleneglycol allyl ether terpolymers, and acrylic acid/AHPSE copolymers), Chemtreat [e.g., allyoxybenzenesulfonic acid (~3.5 mole %)/methallyl sulfonic acid (~2.5 mole %)/methyl methacrylate (13-18 mole %)/acrylic acid (76-81 mole %) quad-polymers], Ciba, SNF Floerger, Rhone-Poulenc, Stockhausen, Hercules, Henkel, Allied Colloids, Hoechst Celanese, Ashland Chemical Company, Kurita Water Industries Ltd, Nippon Shokubai Co., and other suppliers.

Additional water-soluble polymers that may be used in a corrosion inhibitor formulation in accordance with the present teachings include but are not limited to those described in the following U.S. Pat. Nos. 3,085,916; 3,578,589; 3,709,815; 3,806,367; 4,499,002; 4,510,059; 4,532,048; 4,563,284; 4,566,973; 4,566,974; 4,640,793; 4,707,271; 4,762,621; 4,784,774; 4,885,097; 4,952,326; 4,952,327; 5,023,001; 5,658,465; 6,361,768B1; 4,556,493; 4,581,145; 4,457,847; 4,703,092; 4,801,388; 4,919,821; 4,929,425; 5,035,806; 5,049,310; 5,080,801; 5,128,419; 5,167, 828; 5,171,459; 5,213,691; 5,216,086; 5,260,386; 5,422,408; 5,403,493; 5,534,611; 5,726,267; 5,736,405; 5,776,875; 5,750,070; 5,788,866; 5,858,244; 5,876,623; 6,005,040; 6,017,994; 6,022,401; 6,153,106; 6,225,430B1; 6,232,419B1; 6,312,644B1; 6,344,531B1; 6,380,431B1; 6,426,383B1; 6,440,327B1; 6,461,518B1; 6,645,428B1; 7,115,254B1; 4,443,340; 4,659,480; 4,659,482; 4,913,822; 4,929,362; 4,929,695; 4,931,206; 4,944,885; 5,030,748; 5,078,891; 5,100,558; 5,102,555; 5,108,619; 5,128,427; 5,139,643; 5,147,555; 5,158,622; 5,158,685; 5,169,537; 5,180,498; 5,194,620; 5,211,845; 5,234,604; 5,248,438; 5,242,599; 5,256,302; 5,264,155; 5,271,847; 5,271,862; 5,282,905; 5,320,757; 5,332,505; 5,342,540; 5,350,536; 5,374,336; 5,378,327; 5,378,372; 5,393,456; 5,445,758; 5,512,183; 5,518,630; 5,527,468; 5,575,920; 5,601,754; 6,228,950B1; 6,444,747B1; 6,641,754B2; 4,517,098; 4,530,766; 4,711,725; 5,055,540; 5,071,895; 5,185,412; 5,223,592; 5,277,823; 5,342,787; 5,395,905; 5,401,807; 5,420,211; 5,451,644; 5,457,176; 5,516,432; 5,531,934; 5,552,514; 5,554,721; 5,556,938; 5,597,509; 5,601,723; 5,658,464; 5,755,972; 5,866,664; 5,929,098; 6,114,294; 6,197,522B1; 6,207,780B1; 6,218,491B1; 6,251,680B1; 6,335,404B1; 6,395,185; 5,023,368; 5,547,612; 5,650,473; 5,654,198; 5,698,512; 5,789,511; 5,866,012; 5,886,076; 5,925,610; 6,040,406; 6,995,120B2; 7,087,189B2; 5,346,626; 5,624,995; 5,635,575; 5,716,529; 5,948,268; 6,001,264; 6,162,391; 6,368,552B1; 6,656,365B2; 6,645,384B1; 5,000,856; 5,078,879; 5,087,376; 5,124,046; 5,153,390; 5,262,061; 5,322,636; 5,338,477; 5,378,368; 5,391,303; 5,407,583; 5,454,954; 5,534,157; 5,707,529; 6,691,715B2; 6,869,998B2; 4,372,870; 5,124,047; 4,797,224; 4,485,223; 5,254,286; 4,460,477; 5,015,390; 4,933,090; 4,868,263; 4,895,664; 4,895,916; 5,000,856; 4,900,451; 4,584,105; 4,872,995;

4,711,726; 4,851,490; 4,849,129; 4,589,985; 4,847,410; 4,657,679; 4,801,387; 4,889,637; 4,604,211; 4,710,303; 4,589,985; 4,324,664; 3,752,760; 4,740,314; 4,647,381; 4,836,933; 4,814,406; 4,326,980; 4,008,164; 5,246,332; and 5,187,238. Additional water-soluble polymers that may be used in a corrosion inhibitor formulation in accordance with the present teachings include but are not limited to those described in the following European patents: EP 0,297, 049B1; EP 0360746B1; and EP 0,879,794B1. Additional water-soluble polymers that may be used in a corrosion inhibitor formulation in accordance with the present teachings include but are not limited to those described in the following U.S. patent application publications: 2006/0191852A1; 2005/0202995A1; 2002/0195583A1; 2004/00225093A1; 2005/0009959A1; and 2005/0092211A1.

In some embodiments, the water-soluble polymer used in a corrosion inhibitor formulation in accordance with the present teachings includes an acrylate-based polymer. Representative acrylate-based polymers suitable for use in accordance with the present teachings include but are not limited to acrylate-based homopolymer, acrylate-based copolymer, acrylate-based terpolymer, acrylate-based quadpolymer, and combinations thereof. In some embodiments, the acrylate-based polymer comprises polyacrylate.

For some of the embodiments in which a corrosion inhibitor formulation in accordance with the present teachings further includes magnesium ions and the water-soluble polymer includes an acrylate-based polymer, the ratio of active acrylate-based polymer stabilizer concentration to magnesium ion concentration is between about 1 and about 25 and, in other embodiments is optionally greater than about 5 and less than about 25. For some of the embodiments in which a corrosion inhibitor formulation in accordance with the present teachings further includes calcium ions and the water-soluble polymer includes an acrylate-based polymer, the ratio of active acrylate-based polymer concentration to calcium ion concentration in the corrosion inhibitor formulation is greater than 4 and less than about 110. In some embodiments, the ratio of active acrylate-based polymer concentration to calcium ion concentration in the corrosion inhibitor formulations is greater than about 7 and less than about 80.

In some embodiments, corrosion inhibitor formulations in accordance with the present teachings may optionally further include one or a plurality of phosphonocarboxylates. Phosphonocarboxylates are phosphonated compounds having the general formula (5)

$$H[CHRCHR]_n\text{-}PO_3M_2 \quad (5)$$

wherein at least one R group in each unit is a COOM, $CH_2OH$, sulphono or phosphono group, and the other R group—which may be the same as or different than the first R group—is a hydrogen or a COOM, hydroxyl, phosphono, sulphono, sulphato, $C_{1-7}$ alkyl, $C_{1-7}$ alkenyl group or a carboxylate, phosphono, sulphono, sulphato and/or hydroxyl substituted $C_{1-7}$ alkyl or $C_{1-7}$ alkenyl group; wherein n is 1 or an integer greater than 1; and wherein each M is hydrogen or an alkali metal ion such as a sodium ion, potassium ion and the like. Furthermore, at least one COOM group will be present in one of the R groups. In some embodiments, the phosphonocarboxylates are phosphonated oligomers or mixture of phosphonated oligomers of maleic acid of the formula (6)

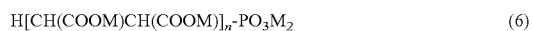

$$H[CH(COOM)CH(COOM)]_n\text{-}PO_3M_2 \quad (6)$$

wherein n is 1 or an integer greater than 1, and M is a cationic species (e.g., alkali metal cations) such that the compound is water-soluble. Representative phosphonocarboxylates include but are not limited to phosphonosuccinic acid, 1-phosphono-1,2,3,4-tetracarboxybutane, and 1-phosphono-1,2,3,4,5,6-hexacarboxyhexane. The phosphonocarboxylates may be a mixture of compounds having the formula (6) with differing values for "n". The mean value of "n" may be 1 to 2 or, in some embodiments, 1.3 to 1.5. The synthesis of the phosphonocarboxylates is known and described in U.S. Pat. No. 5,606,105. The phosphonocarboxylates are separate and different from the carboxylates described above.

In a corrosion inhibitor formulation in accordance with the present teachings, a phosphonocarboxylate may optionally be present in an amount ranging from about 10 ppm to about 500 ppm based on the total weight of the corrosion inhibitor formulation. Within this range, the phosphonocarboxylate may be present in an amount greater than or equal to about 20 ppm and, in some embodiments, greater than or equal to about 40 ppm. Also within this range, the phosphonocarboxylate may be present in an amount less than or equal to about 400 ppm and, in some embodiments, less than or equal to about 300 ppm. In some embodiments, a corrosion inhibitor formulation in accordance with the present teachings is free of any phosphonocarboxylate.

In some embodiments, corrosion inhibitor formulations in accordance with the present teachings may optionally further include one or a plurality of phosphinocarboxylates. Phosphinocarboxylates are compounds having the general formula (7)

$$H[CHR^1CHR^1]_n\text{—}P(O_2M)\text{-}[CHR^2CHR^2]_m H \quad (7)$$

wherein at least one IV group in each unit is a COOM, $CH_2OH$, sulphono or phosphono group and the other IV group—which may be the same as or different than the first IV group—is a hydrogen or a COOM, hydroxyl, phosphono, sulphono, sulphato, $C_{1-7}$ alkyl, $C_{1-7}$ alkenyl group or a carboxylate, phosphono, sulphono, sulphato and/or hydroxyl substituted $C_{1-7}$ alkyl or $C_{1-7}$ alkenyl group; wherein n is an integer equal to or greater than 1; and wherein each M is hydrogen or an alkali metal ion such as a sodium ion, potassium ion, and the like. Similarly, at least one $R^2$ group in each unit is a COOM, $CH_2OH$, sulphono or phosphono group and the other $R^2$ group—which may be the same as or different than the first $R^2$ group—is a hydrogen or a COOM, hydroxyl, phosphono, sulphono, sulphato, $C_{1-7}$ alkyl, $C_{1-7}$ alkenyl group or a carboxylate, phosphono, sulphono, sulphato and/or hydroxyl substituted $C_{1-7}$ alkyl or $C_{1-7}$ alkenyl group; and wherein m is an integer equal to or greater than 0. Furthermore, at least one COOM group will be present in one of the $R^1$ and $R^2$ groups. Representative phosphinocarboxylates include but are not limited to phosphinicosuccinic acid and water-soluble salts thereof, phosphinicobis(succinic acid) and water-soluble salts thereof, and phosphinicosuccinic acid oligomer and salts thereof as described in U.S. Pat. Nos. 6,572,789 and 5,018,577. The phosphonocarboxylates may be a mixture of compounds having the formula (6) with differing values for "n" and "m". The phosphinocarboxylates are separate and different from the carboxylates described above.

In a corrosion inhibitor formulation in accordance with the present teachings, a phosphinocarboxylate may optionally be present in an amount ranging from about 10 ppm to about 500 ppm based on the total weight of the corrosion inhibitor formulation. Within this range, the phosphinocarboxylate may be present in an amount greater than or equal to about 20 ppm and, in some embodiments, greater than or equal to 40 ppm. Also within this range, the phosphinocarboxylate may be present in an amount less than or equal to about 400 ppm and, in some embodiments, less than or equal to about 300 ppm. In some embodiments, a corrosion inhibitor formulation in accordance with the present teachings is free of any phosphinocarboxylate.

In some embodiments, corrosion inhibitor formulations in accordance with the present teachings may optionally further include one or more additional components. The combined total concentration of the optional additional components may range from about 0.0 wt. % to about 15 wt. % (i.e., up to about 15 wt. %) based on the total weight of the corrosion inhibitor formulation. In some embodiments, the combined total concentration of the optional additional components is between about 0.0001 wt. % and about 10 wt. % based on the total weight of the corrosion inhibitor formulation. In other embodiments, the combined total concentration of the optional additional components is between about 0.001 wt. % and about 5 wt. % based on the total weight of the corrosion inhibitor formulation. In further embodiments, the combined total concentration of the optional additional components is between about 0.01 wt. % and about 3 wt. % based on the total weight of the corrosion inhibitor formulation.

Representative additional components that may optionally be present in a corrosion inhibitor formulation in accordance with the present teachings include but not limited to colorants, antifoaming agents or defoamers, pH-adjusting agents, phosphonates (e.g., AMP or aminotrimethylene phosphonic acid; HEDP or 1-hydroxy ethylidene-1,1-diphosphonic acid; HPA or hydroxyphosphono-acetic acid or 2-hydroxy phosphono acetic acid; PBTC or 2-butane phosphono-1,2,4-tricarboxylic acid; PCAM or phosphono carboxylate acid mixture; and/or Bricorr 288, which is a mixture of sodium salts of organophosphonic acid H—[CH(COONa)CH(COONa)]$_n$—PO$_3$Na$_2$, where n<5 and n$_{mean}$=1.4 and other phosphonates), phosphinates (e.g., PSO or phosphinic acid oligomers, which is a mixture of mono-, bis-, and oligomeric phosphinosuccinic acid adduct, and other phosphinates), biocides, polymer dispersants, scale inhibitors, surfactants, bittering agents, additional corrosion inhibitors, water such as deionized water or softened water, ethylene glycol, propylene glycol, diethylene glycol, 1,3-propane diol, other coolant/antifreeze additives, and/or the like, and combinations thereof. In some embodiments, a corrosion inhibitor formulation in accordance with the present teachings may specifically exclude one or more of these optional additional components (e.g., be substantially "free" of one or more of the aforementioned additional components). In some embodiments, the pH of a corrosion inhibitor formulation in accordance with the present teachings at 50% concentration is between about 6.8 and about 10.0, in some embodiments between about 6.8 and about 9.0.

Additional corrosion inhibitors that optionally may be included in a corrosion inhibitor formulation in accordance with the present teachings include but are not limited to salts of cyclohexenoic carboxylate compounds derived from tall oil fatty acids (e.g., alkali metal salts, ammonium salts, and/or the like) as well as amine compounds. Representative amine compounds include but are not limited to ethanolamine, diethanolamine, triethanolamine, morpholine, benzylamine, cyclohexylamine, dicyclohexylamine, hexylamine, AMP (2-amino-2-methyl-1-propanol or isobutanolamine), DEAE (diethylethanolamine), DEHA (diethylhydroxylamine), DMAE (2-dimethylaminoethanol), DMAP (dimethylamino-2-propanol), MOPA (3-methoxypropylamine), and/or the like, and combinations thereof.

Representative colorants or dyes suitable for use in a corrosion inhibitor formulation in accordance with the present teachings include but are not limited to "Uranine Yellow," "Uranine Dye," "Alizarine Green," "Chromatint Orange 1735" or "Green AGS liquid" from Abbeys Color Inc., or Chromatech Incorporated, "Chromatint Yellow 0963 Liquid Dye," "Chromatint Yellow 2741 Liquid Dye," "Chromatint Green 1572 dye," "Chromatint Green 2384 Dye," "Chromatint Violet 1579 Dye" from Chromatech Incorporated, "Acid Red #52" or Sulforhodamine B from Tokyo Chemical Industry Co. or TCI America, "Orange II (acid Orange 7)" or "Intracid Rhodamine WT (Acid Red 388) from Sensient Technologies or other suppliers.

Any suitable antifoaming agent or defoamer, including but not limited to conventionally known such agents, may be used in corrosion inhibitor formulations in accordance with the present teachings. Representative defoamers that may be used in a corrosion inhibitor formulation in accordance with the present teachings include but are not limited to an organo-modified polydimethylsiloxane-containing polyalkylene glycol, siloxane polyalkylene oxide copolymer, polyalkylene oxide, "PM-5150" available from Prestone Products Corp., "Pluronic L-61" and "Plurafac® LF 224 from BASF Corp., "Patcote 492", "Patcote 415" and other Patcote-branded antifoam available from Hydrite Chemical Co. and other suppliers, and "Foam Ban 136B" and other Foam Ban antifoams available from Munzing Chemie GmbH or affiliated companies. The optional antifoam agents may also include polydimethylsiloxane emulsion-based antifoams, including but not limited to PC-545ONF from Performance Chemicals, LLC in Boscawen, N.H.; and CNC antifoam XD-55 NF and XD-56 from CNC International in Woonsocket in RI. In some embodiments, the optional antifoam agents may include a silicone or organo-modified polydimethylsiloxane, for example, SAG brand of silicone-based antifoams (e.g., SAG-10, Silbreak® 320) from OSI Specialties Inc., Momentive Performance Materials Inc. in Waterford, N.Y., Dow Corning and other suppliers; an ethylene oxide-propylene oxide (EO-PO) block copolymer and a propylene oxide-ethylene oxide-propylene oxide (PO-EO-PO) block copolymer (e.g., Pluronic L61, Pluronic L81, and other Pluronic and Pluronic C products); poly(ethylene oxide) or poly(propylene oxide), for example, PPG 2000 (e.g., polypropylene oxide with an average molecular weight of 2000 Daltons); polydiorganosiloxane-based products (e.g., products containing polydimethylsiloxane (PDMS), and the like); fatty acids or fatty acid esters (e.g., stearic acid, and the like); a fatty alcohol, an alkoxylated alcohol and a polyglycol; a polyether polyol acetate, a polyether ethoxylated sorbital hexaoleate, and a poly(ethylene oxide-propylene oxide)monoallyl ether acetate; a wax, a naphtha, kerosene, and an aromatic oil; and/or the like; and combinations thereof.

Representative biocides suitable for use in a corrosion inhibitor formulation in accordance with the present teachings include but are not limited to various non-oxidizing biocides, such as glutaraldehyde, isothiazolin, 5-chloro-2-methyl-4-isothiazolin-3-one, 2-methyl-4-isothiazolin-3-one, 1,2-benzisothiazolin-3-one, 2,2-dibromo-3-nitrilopropionamide, 2-bromo-2-nitropropane-1,3-diol, methylene bis(thiocyanate), terbuthylazine, tetrakis(hydroxymethyl) phosphonium sulphate, and/or the like, and combinations thereof.

Representative pH-adjusting agents suitable for use in a corrosion inhibitor formulation in accordance with the present teachings include but are not limited to alkali or alkaline earth metal hydroxides or oxides (e.g., sodium hydroxide, potassium hydroxide), inorganic phosphates (e.g., sodium phosphate, potassium phosphate, sodium pyrophosphate, and potassium pyrophosphate), and/or the like, and combinations thereof.

Representative non-ionic surfactants suitable for use in a corrosion inhibitor formulation in accordance with the present teachings include but are not limited to fatty acid esters, such as sorbitan fatty acid esters, polyalkylene glycols, polyalkylene glycol esters, copolymers of ethylene oxide (EO) and propylene oxide (PO), polyoxyalkylene derivatives of a sorbitan fatty acid ester, and/or the like, and combinations thereof. In some embodiments, the average molecular weight of the non-ionic surfactants is between about 55 and about 300,000 and, in some embodiments, between about 110 and about 10,000. Representative sorbitan fatty acid esters include but are not limited to sorbitan monolaurate (e.g., sold under the tradename Span® 20, Arlacel® 20, S-MAZ® 20M1), sorbitan monopalmitate (e.g., Span® 40 or Arlacel® 40), sorbitan monostearate (e.g., Span® 60, Arlacel® 60, or S-MAZ® 60K), sorbitan monooleate (e.g., Span® 80 or Arlacel® 80), sorbitan monosesquioleate (e.g., Span® 83 or Arlacel® 83), sorbitan trioleate (e.g., Span® 85 or Arlacel® 85), sorbitan tridtearate (e.g., S-MAZ® 65K), and sorbitan monotallate (e.g., S-MAZ® 90). Representative polyalkylene glycols include but are not limited to polyethylene glycols, polypropylene glycols, and combinations thereof. Representative polyethylene glycols include but are not limited to CARBOWAX™ polyethylene glycols and methoxypolyethylene glycols from Dow Chemical Company (e.g., CARBOWAX PEG 200, 300, 400, 600, 900, 1000, 1450, 3350, 4000 & 8000, etc.) or PLURACOL® polyethylene glycols from BASF Corp. (e.g., Pluracol® E 200, 300, 400, 600, 1000, 2000, 3350, 4000, 6000 and 8000, etc.). Representative polyalkylene glycol esters include but are not limited to mono- and di-esters of various fatty acids, such as MAPEG® polyethylene glycol esters from BASF (e.g., MAPEG® 200ML or PEG 200 Monolaurate, MAPEG® 400 DO or PEG 400 Dioleate, MAPEG® 400 MO or PEG 400 Monooleate, and MAPEG® 600 DO or PEG 600 Dioleate, etc.). Representative copolymers of ethylene oxide (EO) and propylene oxide (PO) include but are not limited to various Pluronic and Pluronic R block copolymer surfactants from BASF, DOWFAX non-ionic surfactants, UCON™ fluids and SYNALOX lubricants from DOW Chemical. Representative polyoxyalkylene derivatives of a sorbitan fatty acid ester include but are not limited to polyoxyethylene 20 sorbitan monolaurate (e.g., products sold under the tradenames TWEEN 20 or T-MAZ 20), polyoxyethylene 4 sorbitan monolaurate (e.g., TWEEN 21), polyoxyethylene 20 sorbitan monopalmitate (e.g., TWEEN 40), polyoxyethylene 20 sorbitan monostearate (e.g., TWEEN 60 or T-MAZ 60K), polyoxyethylene 20 sorbitan monooleate (e.g., TWEEN 80 or T-MAZ 80), polyoxyethylene 20 tristearate (e.g., TWEEN 65 or T-MAZ 65K), polyoxyethylene 5 sorbitan monooleate (e.g., TWEEN 81 or T-MAZ 81), polyoxyethylene 20 sorbitan trioleate (e.g., TWEEN 85 or T-MAZ 85K), and/or the like, and combinations thereof.

In some embodiments corrosion inhibitor formulations in accordance with the present teachings optionally further include one or a plurality of additional carboxylates (i.e., in addition to the benzoic acid and/or its salts and the two or more n-alkyl monocarboxylic acids and/or their salts). As used herein, the term "carboxylate" is inclusive of carboxylic acid, salts thereof, and combinations of one or more carboxylic acids and one or more carboxylic acid salts. The additional carboxylic acid salts suitable for use include alkali metal (such as lithium, sodium, and potassium, etc.) salts and alkaline earth metal (such as calcium, magnesium and strontium, etc.) salts. The additional carboxylate may include a single or multiple carboxyl groups and may be linear or branched. It is expressly contemplated that combinations of additional carboxylates may be used and such combinations are encompassed by the terms "carboxylate" and "carboxylic acid". In some embodiments, an additional carboxylate in accordance with the present teachings has from 4 to 24 carbon atoms (e.g., 4 to 22 carbon atoms). In other embodiments, an additional carboxylate in accordance with the present teachings has from 6 to 20 carbon atoms. The additional carboxylate may be aliphatic, aromatic, or a combination of both. In some embodiments, the additional carboxylic acid is a $C_6$ to $C_{20}$ mono- or di-basic aliphatic or aromatic carboxylic acid and/or an alkali metal salt thereof. In some embodiments, an additional carboxylate in accordance with the present teachings consists of carbon, hydrogen, and oxygen and is free of non-oxygen heteroatoms. Representative aliphatic carboxylates for use in accordance with the present teachings include but are not limited to 2-ethyl hexanoic acid, hexanoic acid, heptanoic acid, octanoic acid, neodecanoic acid, decanoic acid, nonanoic acid, isononanoic acid (e.g., 7-methyloctanoic acid, 6,6-dimethylheptonic acid, 3,5,5-trimethylhexanoic acid, 3,4,5-trimethylhexanoic acid, 2,5,5-trimethylhexanoic acid, 2,2,4,4-tetramethylpentanoic acid, and/or the like, and combinations thereof), isoheptanoic acid, dodecanoic acid, sebacic acid, adipic acid, pimelic acid, suberic acid, azelaic acid, dodecanedioic acid, and/or the like, and combinations thereof. Representative aromatic carboxylates include but are not limited to benzoic acid, toluic acid (methylbenzoic acid), tert-butyl benzoic acid, alkoxy benzoic acid (e.g., methoxybenzoic acid, such as o-, p-, or m-anisic acid), salicylic acid, phthalic acid, isophthalic acid, terephthalic acid, phenylacetic acid, mandelic acid, 1,2,4-benzenetricarboxylic acid (or trimellitic acid), 1,3,5-benzene tricarboxylic acid, 1,2,3-benzene tricarboxylic acid (or hemimellitic acid), and/or the like, and combinations thereof.

In some embodiments, the additional carboxylate used in a corrosion inhibitor formulation in accordance with the present teachings includes a plurality of carboxylates. In some embodiments, the additional carboxylate includes an aliphatic mono-carboxylate, an aliphatic di-carboxylate, an aromatic mono-carboxylate, an aromatic di-carboxylate, or a combination thereof. In some embodiments, the additional carboxylate includes one or a plurality of $C_6$-$C_{20}$ carboxylates, and each of the one or the plurality of $C_6$-$C_{20}$ carboxylates is individually selected from the group consisting of an aliphatic mono-carboxylate, an aliphatic di-carboxylate, an aromatic mono-carboxylate, an aromatic di-carboxylate, and a combination thereof. In some embodiments, the additional carboxylate includes at least one additional $C_6$ to $C_{20}$ mono- or di-basic aliphatic or aromatic carboxylic acid and/or an alkali metal salt thereof. In some embodiments, the additional carboxylate includes 2-ethyl hexanoic acid, adipic acid, neodecanoic acid, sebacic acid, benzoic acid, p-toluic acid, t-butyl benzoic acid, an alkoxybenzoic acid, or a combination thereof.

The concentration of additional carboxylate may vary depending on the application. In some embodiments, the carboxylate is present in an amount from about 0.1 wt. % to about 25 wt. %, in some embodiments about 1 wt. % to about 10 wt. %, based on the total weight of the corrosion inhibitor formulation. Within this range, the amount may be greater than or equal to about 1.5 wt. %, and, in some embodiments, greater than or equal to about 2 wt. %. Also within this range, the amount may be less than or equal to about 7 wt. % and, in some embodiments, less than or equal to about 5 wt. %.

In some embodiments, corrosion inhibitor formulations in accordance with the present teachings may optionally include corrosion inhibitors for copper and copper alloys. Representative copper and copper alloy corrosion inhibitors include but are not limited to compounds containing a 5- or 6-membered heterocyclic ring as the active functional group, wherein the heterocyclic ring contains at least one nitrogen atom (e.g., an azole compound of a type described above). In some embodiments, a copper and copper alloy corrosion inhibitor includes a substituted or unsubstituted compound—and/or a salt thereof (e.g., a sodium or potassium salt)—selected from the group consisting of benzotriazole, a hydrobenzotriazole (e.g., tetrahydrobenzotriazole), tolyltriazole, a hydrotolyltriazole (e.g., 4-methyl-1H-benzontriazole, 5-methyl-1H-benzotriazole, and other tetrahydrobenzotriazoles as described in U.S. Pat. No. 8,236,205 B1), methyl benzotriazole (e.g., 4-methyl benzotriazole, 5-methyl benzotriazole), alkyl benzotriazoles (e.g., benzotriazoles having a $C_2$ to $C_{20}$ alkyl group, including but not limited to butyl benzotriazole), mercaptobenzothiazole, thiazole, imidazole, benzimidazole, indazole, tetrazole, and/or the like, and combinations thereof. In some embodiments, one or more of the aforementioned copper and copper alloy corrosion inhibitors may optionally be substituted. In some embodiments, the copper and copper alloy corrosion inhibitors may be present in the composition in an amount of about 0.01 wt. % to about 5 wt. %. In some embodiments, the amount of the copper and copper alloy corrosion inhibitor ranges from about 0.01 wt. % to about 4 wt. % based on the total weight of the corrosion inhibitor formulation. Within this range, the copper and copper alloy corrosion inhibitor may be present in an amount greater than or equal to about 0.05 wt. % and, in some embodiments, greater than or equal to about 0.1 wt. %. Also within this range, the copper and copper alloy corrosion inhibitor may be present in an amount less than or equal to about 2 wt. % and, in some embodiments, less than or equal to about 1 wt. %.

Heat transfer fluids in accordance with the present teachings for use in a heat transfer system include a freezing point depressant and/or water and a corrosion inhibitor formulation of a type described above. Representative freezing point depressants suitable for use in a corrosion inhibitor formulation in accordance with the present teachings include but are not limited to alcohol and mixture of alcohols (e.g., monohydric alcohols, polyhydric alcohols, and mixtures thereof). Representative alcohols for use as freezing point depressants include but are not limited to methanol, ethanol, propanol, butanol, furfurol, furfuryl alcohol, tetrahydrofurfuryl alcohol, ethoxylated furfuryl alcohol, ethylene glycol, diethylene glycol, triethylene glycol, 1,2-propylene glycol, 1,3-propylene glycol, dipropylene glycol, tripropylene glycol, butylene glycol, glycerol, glycerol-1,2-dimethyl ether, glycerol-1,3-dimethyl ether, monoethylether of glycerol, sorbitol, 1,2,6-hexanetriol, trimethylopropane, alkoxy alkanols (e.g., methoxyethanol), and the like, and combinations thereof.

In some embodiments, the freezing point depressant comprises an alcohol which, in some embodiments, is selected from the group consisting of ethylene glycol, 1,2-propylene glycol, 1,3-propanediol, glycerol, and a combination thereof. In some embodiments, a corrosion inhibitor formulation in accordance with the present teachings contains a glycol freezing point depressant. The concentration of freezing point depressant may vary depending on the application. By way of example, in some embodiments, the concentration of the freezing point depressant may range from about 0 wt. % to about 60 wt. % based on the total weight of the corrosion inhibitor formulation (e.g., from about 0 wt. % to about 50 wt. %, from about 5 wt. % to about 40 wt. %, or from about 11 wt. % to about 25 wt. %). In other embodiments, the concentration of the freezing point depressant may range from about 1 wt. % to about 99 wt. %, in some embodiments from about 10 wt. % to about 99.9 wt. %, based on the total weight of the corrosion inhibitor formulation (e.g., from about 30 wt. % to about 99.5 wt. % or from about 40 wt. % to about 99 wt. %). In some embodiments, the concentration of the freezing point depressant ranges from about 15 wt. % to about 99% wt. % based on the total weight of the corrosion inhibitor formulation. In other embodiments, the concentration of the freezing point depressant ranges from about 20 wt. % to about 98% wt. % based on the total weight of the corrosion inhibitor formulation. In further embodiments, the concentration of the freezing point depressant ranges from about 20 wt. % to about 96% wt. % based on the total weight of the corrosion inhibitor formulation.

Corrosion inhibitor formulations in accordance with the present teachings may include water in addition to, or as an alternative to, a freezing point depressant. Heat transfer fluids containing a corrosion inhibitor formulations typically contain water. In some embodiments, a corrosion inhibitor formulation in accordance with the present teachings that contains a freezing point depressant may be diluted with water to a 30 vol. % to 60 vol. % solution.

The type of water used in accordance with the present teachings is not restricted. However, in some embodiments, the water used in a corrosion inhibitor formulation and/or a heat transfer fluid in accordance with the present teachings includes deionized water, demineralized water, softened water, or a combination thereof. In some embodiments, a hardness of the water due to $CaCO_3$ is less than about 20 ppm. In other embodiments, an electrical conductivity of the water is less than about 300 μS/cm. In further embodiments, a hardness of the water due to $CaCO_3$ is less than about 20 ppm and an electrical conductivity of the water is less than about 300 μS/cm. The amount of water may vary depending on the application. By way of example, the concentration of the water may range from about 0.1 wt. % to about 90 wt. % based on the total weight of the corrosion inhibitor formulation (e.g., from about 0.5 wt. % to about 70 wt. % or from about 1 wt. % to about 60 wt. %).

In some embodiments, corrosion inhibitor formulations in accordance with the present teachings may be used in cooling systems and may provide corrosion inhibition properties. In some embodiments, a heat transfer fluid in accordance with the present teachings contains (a) a freezing point depressant (e.g., ethylene glycol, propylene glycol, 1-3-propanediol, glycerol, and/or the like, and combinations thereof) in an amount ranging from about 1 wt. % to about 99 wt. % based on a total weight of the heat transfer fluid; (b) water (e.g., deionized or softened water) in an amount ranging from about 1 wt. % to about 99 wt. % based on a total weight of the heat transfer fluid (in some embodiments, from about 0.1 wt. % to about 90 wt. %, in other embodiments from about 0.5 wt. % to about 70 wt. %, and in further embodiments from about 1 wt. % to about 60 wt. %); (c) a corrosion inhibitor formulation of a type described above; and (d) an optional coolant additive, which may include but is not limited to colorants, antifoams, other corrosion inhibitors (e.g., nitrate and/or nitrite), dispersants, antiscalants, surfactants, wetting agents, biocides, and the like, and combinations thereof.

In some embodiments, a corrosion inhibitor formulation in accordance with the present teachings may be used in combination with other corrosion inhibitor formulations, including but not limited to the compositions described in U.S. Pat. Nos. 8,617,415; 8,617,416; 9,145,613; 9,453,153; and 9,994,755.

In some embodiments, a corrosion inhibitor formulation in accordance with the present teachings is a single-phase, homogeneous solution at room temperature. In some embodiments, a corrosion inhibitor formulation in accordance with the present teachings is storage stable at a temperature between about −10° C. and +100° C. In some embodiments, a corrosion inhibitor formulation and/or a heat transfer fluid containing the corrosion inhibitor formulation will meet the properties and performance requirements of ASTM D3306.

In some embodiments, a corrosion inhibitor formulation in accordance with the present teachings may be diluted (e.g., with water and/or a freezing point depressant) to form a heat transfer fluid. For example, in some embodiments, the corrosion inhibitor formulation may be diluted by about 10 vol. % to about 75 vol. % to form a heat transfer fluid. In some embodiments, the water used for dilution is deionized water as described in Section 4.5 of ASTM D3306-10.

In some embodiments, a corrosion inhibitor formulation in accordance with the present teachings may be provided as a commercially available product. In other embodiments, a heat transfer fluid in which the corrosion inhibitor formulation has been pre-diluted to around 50 vol. % with water and/or a freezing point depressant may be provided as a commercially available product. In preparing a heat transfer fluid by dilution, the optimal level of water added to the heat transfer concentrate at use conditions may be determined by the desired freeze-up, boil-over, and corrosion protection requirements.

Corrosion inhibitor formulation that has not been diluted by adding water is typically not used in an engine cooling system as a heat transfer fluid due to its relatively low heat transfer coefficient (or specific heat), high viscosity, and high freeze point. Thus, corrosion inhibitor formulations may be diluted (e.g., to 30 vol. % to 60 vol. % solutions) by adding water before being used in engine cooling systems as heat transfer fluids. Vehicle manufacturers typically use 50 vol. % heat transfer concentrate diluted by water as factory fill fluid in vehicle cooling systems. Heat transfer fluid products that are pre-diluted by water to contain about 30 vol. % to about 60 vol. % corrosion inhibitor formulation, in some embodiments 35 vol. % to 65 vol. %, are ready-to-use coolants because no additional water is needed when they are added into a vehicle cooling system.

In a heat transfer fluid, the freezing point depressant may be present in an amount of about 1 wt. % to less than about 90 wt. %, based on the total weight of the heat transfer fluid. Within this range, the amount of the freezing point depressant may be greater than or equal to about 25 wt. %, greater than or equal to about 30 wt. %, greater than or equal to about 40 wt. %, greater than or equal to about 50 wt. %, greater than or equal to about 60 wt. %, greater than or equal to about 70 wt. %, greater than or equal to about 75 wt. %, greater than or equal to about 80 wt. %, greater than or equal to about 85 wt. %, greater than or equal to about 86 wt. %, greater than or equal to about 87 wt. %, greater than or equal to about 88 wt. %, or greater than or equal to about 89 wt. %, but less than about 90 wt. % based on the total weight of the heat transfer fluid. Also, within this range, the amount of the freezing point depressant may be less than or equal to about 30 wt. %, less than or equal to about 40 wt. %, less than or equal to about 50 wt. %, less than or equal to about 55 wt. %, less than or equal to about 60 wt. %, less than or equal to about 70 wt. %, less than or equal to about 75 wt. %, less than or equal to about 80 wt. %, less than or equal to about 85 wt. %, less than or equal to about 86 wt. %, less than or equal to about 87 wt. %, less than or equal to about 88 wt. %, or less than or equal to about 89 wt. %, but more than about 1 wt. % based on the total weight of the heat transfer fluid.

In a heat transfer fluid, the total amount of azole compound may range from about 0.005 wt. % to about 2 wt. % based on the total weight of the heat transfer fluid. Within this range, the azole compound may be present in an amount greater than or equal to about 0.007 wt. %, or, in some embodiments, greater than or equal to about 0.01 wt. %. Also within this range, the azole compound may be present in an amount less than or equal to about 1.5 wt. %, or, in some embodiments, less than or equal to about 1 wt. %.

For embodiments in which the heat transfer fluid includes molybdate, the total amount of molybdate may be greater than about 0.0001 ppm based on the total weight of the heat transfer fluid. Within this range, the amount of molybdate may be less than about 20,000 ppm. Also within this range, the amount of molybdate may be less than or equal to about 2000 ppm.

For embodiments in which the heat transfer fluid includes water-soluble inorganic phosphate, the total amount of water-soluble inorganic phosphate may be greater than about 0.5 ppm as P based on the total weight of the heat transfer fluid. Within this range, the amount of water-soluble inorganic phosphate may be less than about 2000 ppm as P. Also within this range, the amount of water-soluble inorganic phosphate may be less than or equal to about 800 ppm as P.

For embodiments in which the heat transfer fluid includes an organophosphate, the total amount the organophosphate may be present in an amount of about 0.001 wt. % to about 5 wt. %, based on the total weight of the heat transfer fluid. Within this range, the amount may be greater than or equal to about 0.005 wt. %, or, in some embodiments, greater than or equal to about 0.01 wt. %. Also within this range, the amount may be less than or equal to about 3 wt. %, or, in some embodiments, less than or equal to about 1 wt. %.

For embodiments in which the heat transfer fluid includes one or more alkaline earth metal ions, the total amount of alkaline earth metal ion may range from about 0.0001 wt. % to about 0.02 wt. % based on the total weight of the heat transfer fluid. Within this range, the amount may be greater than or equal to about 0.001 wt. %, or, in some embodiments, greater than or equal to about 0.002 wt. %. Also within this range, the amount may be less than or equal to about 0.01 wt. %, or, in some embodiments, less than or equal to about 0.006 wt. %.

For embodiments in which the heat transfer fluid includes calcium ion, the total amount of calcium ion may be greater than about 0.5 ppm based on the total weight of the heat transfer fluid. Within this range, the amount of calcium ion may be less than about 50 ppm. Also within this range, the amount of calcium ion may be less than or equal to about 20 ppm.

For embodiments in which the heat transfer fluid includes magnesium ion, the total amount of magnesium ion may be greater than about 0.5 ppm based on the total weight of the heat transfer fluid. Within this range, the amount of magnesium ion may be less than about 60 ppm. Also within this range, the amount of magnesium ion may be less than or equal to about 25 ppm.

For embodiments in which the heat transfer fluid includes strontium ion, the total amount of strontium ion may be greater than about 0.1 ppm based on the total weight of the heat transfer fluid. Within this range, the amount of strontium ion may be less than about 40 ppm. Also within this range, the amount of strontium ion may be less than or equal to about 20 ppm.

For embodiments in which the heat transfer fluid includes lithium ion, the total amount of lithium ion may be greater than about 0.0001 ppm based on the total weight of the heat transfer fluid. Within this range, the amount of lithium ion may be less than about 6000 ppm. Also within this range, the amount of lithium ion may be less than or equal to about 2500 ppm.

For embodiments in which the heat transfer fluid includes zinc ion, the total amount of zinc ion may be greater than about 0.0001 ppm based on the total weight of the heat transfer fluid. Within this range, the amount of zinc ion may be less than about 30 ppm. Also within this range, the amount of zinc ion may be less than or equal to about 15 ppm.

For embodiments in which the heat transfer fluid includes nitrite, the total amount of nitrite may be greater than about 0.0001 ppm based on the total weight of the heat transfer fluid. Within this range, the amount of nitrite may be less than about 20,000 ppm. Also within this range, the amount of nitrite may be less than or equal to about 5000 ppm.

For embodiments in which the heat transfer fluid includes nitrate, the total amount of nitrate may be greater than about 0.0001 ppm based on the total weight of the heat transfer fluid. Within this range, the amount of nitrate may be less than about 20,000 ppm. Also within this range, the amount of nitrate may be less than or equal to about 5000 ppm.

For embodiments in which the heat transfer fluid includes silicate, the total amount of silicate may be greater than about 0.0001 ppm based on the total weight of the heat transfer fluid. Within this range, the amount of silicate may be less than about 1000 ppm as Si. Also within this range, the amount of silicate may be less than or equal to about 600 ppm as Si.

For embodiments in which the heat transfer fluid includes silicate stabilizer, the silicate stabilizer may be present in an amount greater than about 0.0001 ppm based on the total weight of the heat transfer fluid. Within this range, the amount of silicate stabilizer may be less than about 3000 ppm. Also within this range, the amount of silicate stabilizer may be less than or equal to about 800 ppm.

For embodiments in which the heat transfer fluid includes acrylate-based polymer, the total amount of acrylate-based polymer may be greater than about 0.0001 ppm based on the total weight of the heat transfer fluid. Within this range, the amount of acrylate-based polymer may be less than about 5000 ppm. Also within this range, the amount of acrylate-based polymer may be less than or equal to about 1500 ppm.

For embodiments in which the heat transfer fluid includes one or more additional carboxylates, the total amount of the additional carboxylate may be present in an amount of about 0.5 wt. % to about 8 wt. %, based on the total weight of the heat transfer fluid. Within this range, the amount may be greater than or equal to about 0.6 wt. %, or, in some embodiments, greater than or equal to about 0.7 wt. %. Also within this range, the amount may be less than or equal to about 7 wt. %, or, in some embodiments, less than or equal to about 6 wt. %.

For embodiments in which the heat transfer fluid includes copper and copper alloy corrosion inhibitor, the total amount of copper and copper alloy corrosion inhibitor may be greater than about 0.0001 ppm based on the total weight of the heat transfer fluid. Within this range, the amount of copper and copper alloy corrosion inhibitor may be less than about 10,000 ppm. Also within this range, the amount of copper and copper alloy corrosion inhibitor may be less than or equal to about 2500 ppm.

The pH of the heat transfer fluid may be between about 6.8 and about 10.0 at room temperature. Within this range, the pH may be greater than or equal to about 7.5 or, in some embodiments, greater than or equal to about 7.8. Also within this range, the pH may be less than or equal to about 9.0 or, in some embodiments, less than or equal to about 8.8.

A method of preventing corrosion in accordance with the present teachings includes contacting a heat transfer fluid of a type described herein with a heat transfer system. The heat transfer system may include one or a plurality of components manufactured by CAB. In some embodiments, the heat transfer system may include aluminum and/or CGI.

Heat transfer fluids in accordance with the present teachings are further demonstrated by the following non-limiting examples. The following examples illustrate features in accordance with the present teachings, and are provided solely by way of illustration. They are not intended to limit the scope of the appended claims or their equivalents.

EXAMPLES

Bayhibit AM is 2-phosphonobutane-1,2,4-tricarboxylic acid (or PBTC). Na-TT is tolyltriazole, sodium salt. Tolyltriazole is a mixture of about 60% 5-methylbenzotriazole and 40% 4-methylbenzotriazole. Bricorr288 is a mixture of phosphonosuccinic acid, its dimer, and oligomers. As described in U.S. Pat. No. 6,572,789, the active ingredients of such inhibitors are a mixture of organophosphonic acids, $H-[CH(COONa)CH(COONa)]_n-PO_3Na_2$, where n<5 and n(mean)=1.4 (hereinafter referred to as "PCAM").

2-EHA is 2-ethyl hexanoic acid. Sebacic (K salt) is the potassium salt of sebacic acid. Tenex WS-552 0 (CAS Reg. No.=154730-82-2) is a purified tall oil fatty acid anhydride (density=9.6 lb/gal; acid number=75.0 to 90.0; 86% solid), which is based on the patented technology of Tenax 2010. Tenax WS 5520 maintains excellent water solubility when neutralized with the appropriate amine and imparts tenacious film persistency. Tenax 2010 (CAS reg. No.=68139-89-9) is a maleated tall oil fatty acid having a structure (8)

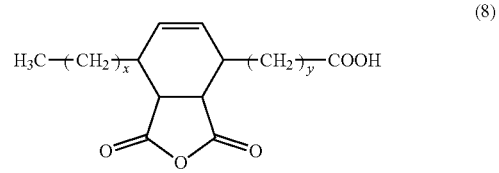 [SMILES: CCC1C=CC(CC(=O)O)C2C(=O)OC(=O)C12]

(8)

wherein x plus y equals 12, which has been purified by distillation to a monomer content less than 10% (density=8.41b/gal; minimum acid no.=250; maximum acid no.=280). Tenax 2010 and its amine derivatives are chemically stable at high temperatures and pressures. When neutralized with the appropriate amine, Tenax 2010 exhibits superior film persistency over standard dimer/trimer systems. Tenax 2010 demonstrates excellent cos-performance advantages in down hole applications as an intermediate chemical for corrosion inhibitor formulations.

Representative compositions of test coolant formulations and the corresponding analytical results are shown in Tables 4, 5, 6, and 7.

TABLE 4

Comparative Example Test Coolant Formulations.

| Chemicals | ELC-1 Comp. Ex. 1 wt. % | ELC-2 Comp. Ex. 2 wt. % | ELC-3 Comp. Ex. 3 wt. % | ELC-4 Comp. Ex. 4 wt. % | ELC-5 Comp. Ex. 5 wt. % | ELC-6 Comp. Ex. 6 wt. % | ELC-7 Comp. Ex. 7 wt. % | ELC-8 Comp. Ex. 8 wt. % |
|---|---|---|---|---|---|---|---|---|
| Ethylene Glycol | 92.9864 | 93.3558 | 92.9868 | 93.3789 | 94.4490 | 92.2373 | 92.8328 | 93.1639 |
| NaTTZ, 50% | 0.4185 | 0.4200 | 0.4184 | 0.4202 | 0.4171 | 0.4137 | 0.4178 | 0.4199 |
| NaOH, 50% | 2.1721 | 1.8003 | 2.1724 | 1.8003 | | 3.0166 | 2.3748 | 1.9813 |
| 2-Ethyl hexanoic acid | 4.0247 | | | | | | | |
| Neo Decanoic acid | | 4.0238 | | | | | | |
| Octanoic acid | | | 4.0240 | | | | | |
| Decanoic acid | | | | 4.0002 | | | | |
| Sodium Benzoate | | | | | 4.6837 | | | |
| Benzoic acid | | | | | 0.0531 | | | |
| Sebacic Acid | | | | | | 3.9384 | | |
| Heptanoic acid | | | | | | | 3.9768 | |
| Nonanoic acid | | | | | | | | 4.0350 |
| Na2MoO4, 41.1% | 0.3984 | 0.4001 | 0.3985 | 0.4004 | 0.3971 | 0.3941 | 0.3978 | 0.3998 |
| Sum | 100.0000 | 100.0000 | 100.0000 | 100.0000 | 100.0000 | 100.0000 | 100.0000 | 100.0000 |
| pH @ 50 vol. % | 8.62 | 8.61 | 8.61 | 8.60 | 8.63 | 8.56 | 8.56 | 8.64 |

TABLE 5

Comparative Example and Example Test Coolant Formulations.

| | ELC mix-1 Comp. Ex. 9 vol. % | ELC mix 2 Comp. Ex. 10 vol. % | ELC mix-3 Ex. 1 vol. % | ELC mix-4 Ex. 2 vol. % | ELC mix-5 Ex. 3 vol. % | ELC mix-6 Ex. 4 vol. % | ELC mix-7 Ex. 5 vol. % |
|---|---|---|---|---|---|---|---|
| Carboxylic acids in Formulation and ratio | C8 + C10, 1:1 mix | C7 + C8, 1:1 mix | C8 + C10 + Benz., 1:1:1 mix | C7 + C8 + Benz., 1:1:1 mix | C7 + C9 + Benz., 1:1:1 mix | C7 + C10 + Benz., 1:1:1 mix | C9 + C10 + Benz., 1:1:1 mix |
| ELC-1 | | | | | | | |
| ELC-2 | | | | | | | |
| ELC-3 | 50 | 50 | ⅓ of 100% | ⅓ of 100% | | | |
| ELC-4 | 50 | | ⅓ of 100% | | | ⅓ of 100% | ⅓ of 100% |
| ELC-5 | | | ⅓ of 100% | ⅓ of 100% | ⅓ of 100% | ⅓ of 100% | ⅓ of 100% |
| ELC-6 | | | | | | | |
| ELC-7 | | 50 | | ⅓ of 100% | ⅓ of 100% | ⅓ of 100% | |
| ELC-8 | | | | | ⅓ of 100% | | ⅓ of 100% |
| Sum | 100 | 100 | 100 | 100 | 100 | 100 | 100 |

TABLE 6

Example and Comparative Example Test Coolant Formulations Used in Vehicle Fleet Test.

| Coolant ID Ingredients | Ex. 6 wt. % | Ex. 7 wt. % | Ex. 8 wt. % | Ex. 9 wt. % | Comp. Ex. 13 wt. % |
|---|---|---|---|---|---|
| Ethylene Glycol | 94.0787 | 94.0793 | 94.0917 | 93.2903 | 92.6089 |
| Sodium Tolytriazole, 50% | 0.4999 | 0.4998 | 0.5000 | 0.4985 | 0.4999 |
| Sodium Hydroxide, 50% | 1.1249 | 1.0996 | 1.1253 | 1.2296 | 1.6698 |
| Aquatreat AR-940, Sodiume polyacrylate (MW = 2600) aqueous solution, 40% solid, pH = 8.3 | 0.0700 | 0.0700 | 0.0700 | 0.0698 | 0.0700 |
| Treated H$_2$O | 0.1326 | 0.1326 | 0.1327 | 0.1322 | 0.1326 |
| Calcium acetate monohydrate | 0.0029 | 0.0029 | 0.0029 | 0.0029 | 0.0029 |
| Magnesium acetate tetrahydate | 0.0220 | 0.0220 | 0.0220 | 0.0219 | 0.0220 |
| Sodium benzoate | 1.4998 | 1.4993 | 1.5000 | 1.8942 | 1.9997 |

TABLE 6-continued

Example and Comparative Example Test Coolant Formulations Used in Vehicle Fleet Test.

| Coolant ID<br>Ingredients | Ex. 6<br>wt. % | Ex. 7<br>wt. % | Ex. 8<br>wt. % | Ex. 9<br>wt. % | Comp. Ex. 13<br>wt. % |
|---|---|---|---|---|---|
| Heptanoic acid | 0.7999 | | | 0.8002 | 0.7975 |
| Nonanoic acid | 0.7999 | | | 0.8001 | 0.9969 |
| P&G Chemicals C810K Octanoic/Decanoic acid mix | | 1.6344 | | | |
| Sebacic acid | | | | | 1.7997 |
| Phosphoric acid, 75% | 0.2550 | 0.2549 | 0.2551 | 0.2542 | 0.2687 |
| Sodium molybdate, 41.1% | 0.6999 | 0.6997 | 0.7001 | 0.5982 | 0.6999 |
| Chromatint Yellow 0963 dye | 0.0145 | | | | |
| Chromatint Red 0551 dye | | 0.0056 | | | |
| Chromatint Red 3382 | | | | | 0.0115 |
| Chromatint Red 1690 | | | | | 0.0045 |
| Chromatinit Yellow 2741 dye | | | | 0.0145 | |
| PM-5150 antifoam | | | | 0.1994 | 0.2000 |
| Denatonium benzoate, 40% | | | | | 0.0100 |
| Sum | 100.00 | 100.00 | 100.00 | 100.00 | 100.00 |
| pH @ 50 vol. % | 8.5 | 8.54 | 8.44 | 8.5 | 8.58 |
| Theoretical $Mg^{2+}$ cocnentration, mg/kg | 24.94 | 24.93 | 24.95 | 24.86 | 24.94 |
| Theoretical $Ca^{2+}$ concentration, mg/kg | 6.60 | 6.60 | 6.60 | 6.58 | 6.60 |
| ppm active Polyacrylate/ppm $Mg^{2+}$ | 11.23 | 11.23 | 11.23 | 11.23 | 11.23 |

Note:
P&G Chemicals C810K sample contains 54.2 wt. % octanoic acid, 41.3 wt. % decanoic acid, 4.3 wt. % hexanoic acid, and 0.1 wt. % C12 or higher carboxylic acid per GC analysis. According to the product specification provided by Procter & Gamble Chemicals (Sacramento, CA 95826, USA), C810K contains 52.95 wt. % min to 60.04 wt. % max octanoic acid, 33.95 wt. % min to 42.04 wt. % max decanoic acid, up to 6.04 wt. % max. hexanoic acid, up to 2.04 wt. % C12 and higher carboxylic acid per GC analysis.

TABLE 7

Comparative Example No. 11, 12, 14 and 15 Test Coolant Analytical Results.

| Item | Comp. Ex. 11 -<br>Commercial<br>Coolant 1<br>Typical Analytical Results | Comp. Ex. 12 -<br>Commercial<br>Coolant 2<br>Typical Analytical Results | Comp. Ex. 14 -<br>Commercial Coolant 3,<br>50/50 Predilute<br>Typical Analytical Results | Comp. Ex. 15 -<br>Commercial Coolant<br>4, 50/50 Predilute<br>Typical Analytical Results |
|---|---|---|---|---|
| % water | 2.61 | 4.28 | Not determined | Not determined |
| pH @ 50 vol. % | 8.8 | 9.2 | 8.4 (as is) | 8.4 |
| ASTM Reserve alkalinity, ml | 5.82 | 4.08 | 6.26 | 4.52 |
| Specific Gravity @ 20/20° C. | 1.1318 | 1.1145 | 1.0748 | 1.0804 |
| Freeze Point D6660, ° F., @ 50 vol. % | −34.4 | Not measured | Not measured | Not measured |
| Glycol quality by GC | Ethylene glycol present | Ethylene Glycol present | ~51.9 vol % Ethylene Glycol | ~56.6 vol % Ethylene glycol |
| DEG, wt. % | None detected | NA | ND | <0.05 wt. % |
| Benzoic acid, wt. % | 2.07 | None detected | None detected | 1.59 |
| Sebacic acid, wt. % | 2.37 | 0.48 | 0.57 | Not detected |
| 2-Ethyl hexanoic acid, wt. % | None detected | 2.79 | Not Detected | Not detected |
| Tert-Butyl benzoic acid, wt. % | None detected | None detected | 1.06 | 1.01 |
| p-Toluic acid, wt. % | None detected | None detected | ND | 0.53 |
| Tolytriazole, µg/ml | 3754 | 1220 | 926 | 1592 |
| Benzotriazole, µg/ml | None detected | None detected | 2180 | None detected |
| Mercaptobenzothiazole, µg/ml | None detected | None detected | None detected | None detected |
| Nitrite, µg/ml | None detected | None detected | None detected | None detected |
| Nitrate, µg/ml | 1410 | None detected | 550 | 157 |
| Chloride, µg/ml | 19 | <5 | <10 | Not analyzed |
| Sulfate, µg/ml | None detected | 14 | <10 | Not analyzed |
| Fluoride, µg/ml | <10 | None detected | None detected | Not analyzed |
| Glycolate, µg/ml | <10 | <10 | Not analyzed | Not analyzed |
| Formate, µg/ml | 27 | <10 | Not analyzed | Not analyzed |
| Acetate, µg/ml | <10 | <10 | Not analyzed | Not analyzed |
| Mo, mg/L | 428 | <2 | 582 | 221 |
| K, mg/L | 859 | 113 | 6770 | 4140 |
| Na, mg/L | 12930 | 6468 | 705 | 4100 |
| P, mg/L | <2 | 25 | 100 | 2 |
| Si, mg/L | <2 | 7 | 28 | 5 |
| Ca, mg/L | <2 | 4 | <2 | 2 |
| Mg, mg/L | <2 | 2 | <2 | 5 |

TABLE 7-continued

Comparative Example No. 11, 12, 14 and 15 Test Coolant Analytical Results.

|  | Comp. Ex. 11 - Commercial Coolant 1 | Comp. Ex. 12 - Commercial Coolant 2 | Comp. Ex. 14 - Commercial Coolant 3, 50/50 Predilute | Comp. Ex. 15 - Commercial Coolant 4, 50/50 Predilute |
|---|---|---|---|---|
| Al, mg/L | <2 | <2 | <2 | <2 |
| Fe, mg/L | <2 | <2 | <2 | <2 |
| Cu, mg/L | <2 | <2 | <2 | <2 |
| B, mg/L | <2 | <2 | <2 | <2 |

Note:
Commercial Coolant 1 is Fleetguard ES Compleat ™ OAT Lifetime HD Fully Formulated Antifreeze/Coolant for all heavy-/light duty diesel, natural gas and gasoline engines. Commercial Coolant 2 is an after market long life coolant claimed to be compatible for use in all automobiles and light-duty trucks. Commercial Coolant 3 is an organic acid corrosion inhibitor technology (OAT) coolant for heavy engines. Commercial Coolant 4 is a nitrite free organic acid technology (OAT) coolants for all heavy duty engine cooling systems.

Test results—modified GM9066P test results on sand cast aluminum AA319 with an electrode surface temperature of 138° C. are shown in Table 8.

Test results—Modified GM9066P on compacted graphite iron at an electrode surface temperature of 152° C. are shown in Table 9.

TABLE 8

Summary of Modified GM9066P Test Results - 50 vol. % Fresh Coolant with a corrosive salt mixture to yield 100 ppm fluoride/chloride/sulfate/bicarbonate in the test solution, AA319, 3.0 L Ford Engine Block, sand cast aluminum, heat rejecting surface corrosion, electrode surface Temperature = 138 ± 0.5° C.

| Coolant ID | Carboxylic Acid | Total corroded depth in 24 h, μm | Time average corrosion rate for 24 h, μm/y | Corrosion rate @ 24 h, μm/y |
|---|---|---|---|---|
| Comp. Ex. 1, ELC-1 | 2-ethyl hexanoic acid | 0.539 | 196.9 | 176.82 |
| Comp. Ex. 2, ELC-2 | Neo Decanoic acid | 0.274 | 99.94 | 55.65 |
| Comp. Ex. 3, ELC-3 | Octanoic acid | 0.204 | 74.39 | 49.72 |
| Comp. Ex. 4, ELC-4 | Decanoic acid | 0.135 | 49.13 | 39.92 |
| Comp. Ex. 5, ELC-5 | Benzoic acid | 0.958 | 349.82 | 167.25 |
| Comp. Ex. 6, ELC-6 | Sebacic acid | 0.802 | 292.64 | 151.56 |
| Comp. Ex. 7, ELC-7 | Heptanoic acid | 0.308 | 112.48 | 64.86 |
| Comp. Ex. 8, ELC-8 | Nonanoic acid | 0.163 | 59.47 | 44.53 |
| ELCmix-1, Comp. Ex. 9 | C8 + C10, 1:1 mix | 0.152 | 55.37 | 45.71 |
| ELCmix-2, Comp. Ex. 10 | C7 + C8, 1:1 mix | 0.246 | 89.89 | 56.79 |
| ELCmix-3, Ex. 1 | C8 + C10 + Benz, 1:1:1 mix | 0.110 | 40.19 | 30.80 |
| ELCmix-4, Ex. 2 | C7 + C8 + Benz, 1:1:1 mix | 0.326 | 119.06 | 55.78 |
| ELCmix-5, Ex. 3 | C7 + C9 + Benz, 1:1:1 mix | 0.181 | 65.89 | 39.54 |
| ELCmix-6, Ex. 4 | C7 + C10 + Benz, 1:1:1 mix | 0.123 | 44.71 | 28.70 |
| ELCmix-7, Ex. 5 | C9 + C10 + Benz, 1:1:1 mix | 0.148 | 54.18 | 41.05 |
| Comp. Ex. 12 | 2-ethyl hexanoic acid + sebacic acid | 0.614 | 224.17 | 207.26 |

TABLE 9

Summary of Modified GM9066P Test Results - 50 vol. % Fresh Coolant with a corrosive salt mixture to yield 100 ppm fluoride/chloride/sulfate/bicarbonate in the test solution, Compacted Graphite Iron, 6.7 L Ford Engine Block, heat rejecting surface corrosion, electrode surface Temperature = 152 ± 0.5° C.

| Coolant ID | Carboxylic Acid | Total corroded depth in 24 h, μm | Time average corrosion rate for 24 h, μm/y | Corrosion rate @ 24 h, μm/y |
|---|---|---|---|---|
| Comp. Ex. 1, ELC-1 | 2-ethyl hexanoic acid | 0.0327 | 11.94 | 4.77 |
| Comp. Ex. 2, ELC-2 | Neo Decanoic acid | 0.0151 | 5.51 | 3.45 |
| Comp. Ex. 3, ELC-3 | Octanoic acid | 0.0254 | 9.28 | 3.48 |
| Comp. Ex. 4, ELC-4 | Decanoic acid | 0.1820 | 66.43 | 20.00 |
| Comp. Ex. 5, ELC-5 | Benzoic acid | 0.0349 | 12.74 | 6.00 |
| Comp. Ex. 6, ELC-6 | Sebacic acid | 0.0567 | 20.70 | 11.22 |
| Comp. Ex. 7, ELC-7 | Heptanoic acid | 0.0315 | 11.48 | 5.86 |
| Comp. Ex. 8, ELC-8 | Nonanoic acid | 0.0937 | 34.21 | 15.51 |
| Comp. Ex. 9, ELC mix-1 | C8 + C10, 1:1 mix | 0.0544 | 19.85 | 7.33 |
| Comp. Ex. 10, ELC mix-2 | C7 + C8, 1:1 mix | 0.0352 | 12.86 | 5.45 |
| Ex. 1, ELC mix-3 | C8 + C10 + Benz, 1:1:1 mix | 0.0293 | 10.69 | 6.59 |
| Ex. 2, ELC mix-4 | C7 + C8 + Benz, 1:1:1 mix | 0.0408 | 14.88 | 7.55 |
| Ex. 3, ELC mix-5 | C7 + C9 + Benz, 1:1:1 mix | 0.0287 | 10.49 | 5.64 |
| Ex. 4, ELC mix-6 | C7 + C10 + Benz, 1:1:1 mix | 0.0323 | 11.78 | 4.33 |
| Ex. 5, ELCmix-7 | C9 + C10 + Benz, 1:1:1 mix | 0.0797 | 29.11 | 15.07 |
| Comp. Ex. 12 | 2-ethyl hexanoic acid + sebacic acid | 0.0570 | 20.80 | 9.32 |

As is evident from Tables 8 and 9, Example Nos. 1, 3, and 4 yield unexpectedly low corrosion rates on cast aluminum and compacted graphite iron at the high temperatures. The combination of three carboxylic acids in accordance with the present teachings yielded the lowest corrosion rates on sand cast aluminum under the selected test conditions, while Examples Nos. 3 and 4 also yield lower corrosion rates than the ones corresponding to Comparative Examples Nos. 4, 5, and 8. These results show that using the combination of the carboxylic acids in accordance with the present teachings yields an unexpected synergistic effect in simultaneously providing corrosion protection of both cast aluminum and compacted graphite iron in engine cooling systems.

The synergistic combinations of the corrosion inhibitors are formulated into test coolants, as shown in Table 6. Fleet testing of the example coolants (Example 6 and Example 7 test coolants) and two comparative example test coolants (Comparative Example 11 and Comparative Example 13 test coolants) were conducted in three police vehicle fleets using 2017 Ford Explorers, 2016 Ford Explorers, and 2015 Ford Taurus (all equipped with a 3.7 L V6 Cyclone Engine with aluminum block and aluminum cylinder head) using 50 vol. % coolant. Some of the fleet test results are shown in Table 10. Comparative Example No. 11 is a commercial heavy duty lifetime engine coolant claimed to provide life-of-the-engine, 1,000,000-mile coolant for all diesel, gasoline and natural gas engines.

As is evident from the data, the Example coolants (Example 6 and Example 7 test coolant) in accordance with the present teachings provide substantially better corrosion protection to the cooling systems of the tested vehicles than the Comparative Example No. 11 commercial lifetime coolant and the Comparative Example No. 13 test coolant. The concentration of the ethylene glycol degradation acids, sum of the concentrations of glycolic acid, formic acid, and acetic acid are much lower in the test vehicles using the Example test coolants than the ones using the Comparative Example test coolants Nos. 11 and 13. In addition, the decrease of test coolant pH (at ~50 vol. %) was much slower than the ones observed in the test vehicles using the Comparative Example test coolants Nos. 11 and 13. While neither desiring to be bound by any particular theory nor intending to limit in any measure the scope of the appended claims or their equivalents, it is presently believed that that the pH of the test coolant plays an important role in maintaining the corrosion protection performance of the engine coolant. In some embodiments, the optimal pH for carboxylic acid-based corrosion inhibitors is generally between 7.5 and 9. When the pH is decreased to below 7, a significant amount of the carboxylic acid will exist in acid form, resulting in a reduction in corrosion protection performance of the inhibitor formulation.

TABLE 10

Police Vehicle Fleet Test Coolant Sample Analysis - Comparative Coolant vs. Example Coolant.

| | Test Mileage, miles | | | |
|---|---|---|---|---|
| | 500 | 10000 | 20000 | 30000 |
| Comparative Ex. 11 test coolant 2017 Ford Explorer PSO#1 | | | | |
| Test Coolant pH, as is | 8.67 | 7.8 | 7.1 | 6.8 |
| Total Glycol degradation acids concentration, mg/L | 61 | 706 | 1232 | 1858 |
| 2017 Ford Explorer PSO#2 | | | | |
| Test Coolant pH, as is | 8.69 | 7.9 | 7.2 | 7.0 |
| Total Glycol degradation acids concentration, mg/L | 66 | 640 | 1051 | 1451 |
| 2017 Ford Explorer PSO#3 | | | | |
| Test Coolant pH, as is | 8.74 | 7.5 | 6.9 | 6.8 |
| Total Glycol degradation acids concentration, mg/L | 52 | 829 | 1540 | 1940 |
| Ex. 6 Test Coolant 2017 Ford Explorer PSO#4 | | | | |
| Test Coolant pH, as is | 8.1 | 8 | 7.9 | |
| Total Glycol degradation acids concentration, mg/L | 106 | 335 | 462 | |
| 2017 Ford Explorer PSO#5 | | | | |
| Test Coolant pH, as is | 8.2 | 7.9 | 7.7 | 7.6 |
| Total Glycol degradation acids concentration, mg/L | 66 | 368 | 634 | 766 |
| 2017 Ford Explorer PSO#6 | | | | |
| Test Coolant pH, as is | 8 | 7.8 | 7.8 | 7.7 |
| Total Glycol degradation acids concentration, mg/L | 56 | 442 | 751 | 736 |
| Comparative Ex. 11 test coolant 2016 Ford Explorer WCP#1 | | | | |
| Test Coolant pH, as is | 8.6 | 7.8 | 7.5 | 7.3 |
| Total Glycol degradation acids concentration, mg/L | 101 | 614 | 893 | 981 |
| Comparative Ex. 13 Test Coolant 2016 Ford Explorer WCP#2 | | | | |
| Test Coolant pH, as is | 8.2 | 7.2 | | |
| Total Glycol degradation acids concentration, mg/L | 87 | 932 | | |

TABLE 10-continued

Police Vehicle Fleet Test Coolant Sample Analysis - Comparative Coolant vs. Example Coolant.

|  | Test Mileage, miles | | | |
|---|---|---|---|---|
|  | 500 | 10000 | 20000 | 30000 |
| Comparative Ex. 11 test coolant 2015 Ford Taurus WCP#1 | | | | |
| Test Coolant pH, as is | 8.6 | 8.1 | 7.3 | 6.8 |
| Total Glycol degradation acids concentration, mg/L | 97 | 482 | 970 | 2052 |
| 2015 Ford Taurus WCP#2 | | | | |
| Test Coolant pH, as is | 8.68 | 8.4 | 7.4 | 6.9 |
| Total Glycol degradation acids concentration, mg/L | 77 | 345 | 1065 | 1758 |
| Ex. 7 Test Coolant 2015 Ford Taurus WCP#3 | | | | |
| Test Coolant pH, as is | | 8.3 | | 7.9 |
| Total Glycol degradation acids concentration, mg/L | | 273 | | 750 |

The C7, C9 and benzoate inhibitor combination disclosed in Example 6 (in which the weight percent ratio of benzoic acid to the sum of heptanoic acid and nonanoic acid in the test coolant or the heat transfer fluid is around 1.27:1.6), and the C8, C10 and benzoate inhibitor combination disclosed in Example 7 (in which the weight percent ratio of benzoic acid to the sum of octanoic acid and decanoic acid in the test coolant or the heat transfer fluid is around 1:27:1.56), are presently preferred inhibitor combinations for use in formulating heat transfer fluids or engine coolants to provide unexpected synergistic and optimal corrosion protection of both aluminum and compacted graphite iron in engine cooling systems.

Table 11 below shows modified ASTM D2809 aluminum pump test results for corrosion protection performance against cavitation corrosion and erosion corrosion.

TABLE 11

Modified ASTM D2809 Aluminum Pump Test Results for Corrosion Protection Performance against Cavitation Corrosion and Erosion Corrosion.

| Test Coolant ID | Pump Rating Per ASTM D2809 Rating System | | |
|---|---|---|---|
|  | Pump | Impeller | Front Cover |
| Comp. Ex. 11, Test 1 | 8 | 5 | 8 |
| Comp. Ex. 11, Test 2 | 8 | 5 | 8 |
| Comp. Ex. 11, Test 3 | 8 | 5 | 8 |
| Comp. Ex. 12, Test 1 | 4 | 4 | 7 |
| Comp. Ex. 12, Test 2 | 2 | 1 | 3 |
| Comp. Ex. 12, Test 3 | 2 | 1 | 4 |
| Comp. Ex. 12, Test 4 | 4 | 4 | 8 |
| Comp. Ex. 12, Test 5 | 4 | 4 | 7 |
| Comp. Ex. 14 | 7 | 4 | 7 |
| Comp. Ex. 15 | 5 | 6 | 8 |
| Ex. 8 | 10 | 10 | 10 |
| Ex. 9 | 10 | 10 | 10 |

Note:
Per ASTM D2809, a rating of 10 indicates that there is no corrosion or erosion present; no metal loss. No change from original casting configuration. Staining permitted. The lower of the part rating value, the more severe the corrosion damage is observed on the part. A rating of 1 indicates that pump case is leaking due to corrosion or erosion. The modified D2809 tests were conducted per ASTM D2809 procedure but in a modified stainless steel unit where the piping of the test unit was changed from copper to stainless steel.

The benzoate inhibitor combinations disclosed in Examples 8 and 9, together with the benzoate inhibitor compositions disclosed in Examples 6 and 7, are presently preferred inhibitor combinations for use in formulating heat transfer fluids or engine coolants to provide unexpected synergistic and optimal corrosion protection of both aluminum and compacted graphite iron in cooling systems including but not limited to engine cooling systems.

The entire contents of each and every patent and non-patent publication cited herein are hereby incorporated by reference, except that in the event of any inconsistent disclosure or definition from the present specification, the disclosure or definition herein shall be deemed to prevail.

It is to be understood that use of the indefinite articles "a" and "an" in reference to an element (e.g., "a first n-alkyl monocarboxylic acid or a salt thereof," "a second n-alkyl monocarboxylic acid or a salt thereof," "an azole compound," etc.) does not exclude the presence, in some embodiments, of a plurality of such elements.

The foregoing detailed description has been provided by way of explanation and illustration, and are not intended to limit the scope of the appended claims. Many variations in the presently preferred embodiments illustrated herein will be apparent to one of ordinary skill in the art, and remain within the scope of the appended claims and their equivalents.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding claim—whether independent or dependent—and that such new combinations are to be understood as forming a part of the present specification.

The invention claimed is:

1. A heat transfer fluid comprising:
  greater than or equal to about 89 wt. % of a freezing point depressant that is selected from the group consisting of methanol, ethanol, propanol, butanol, furfurol, furfuryl alcohol, tetrahydrofurfuryl alcohol, ethoxylated furfuryl alcohol, ethylene glycol, diethylene glycol, triethylene glycol, 1,2-propylene glycol, 1,3-propylene glycol, dipropylene glycol, butylene glycol, glycerol, glycerol-1,2-dimethyl ether, glycerol-1,3-dimethyl ether, monoethylether of glycerol, sorbitol, 1,2,6-hexanetriol, trimethylopropane, methoxyethanol, and a combination thereof;

a corrosion inhibitor formulation comprising:
an optionally substituted benzoic acid or a salt thereof, wherein the salt of the optionally substituted benzoic acid comprises sodium benzoate, potassium benzoate, or a combination thereof;
a first n-alkyl monocarboxylic acid selected from heptanoic acid, octanoic acid, a salt thereof, and mixtures thereof;
a second n-alkyl monocarboxylic acid selected from nonanoic acid, decanoic acid, a salt thereof, and mixtures thereof; and
an azole compound selected from the group consisting of benzotriazole, tolyltriazole, mercaptobenzothiazole, tetrahydro tolyltriazole, and a combination thereof;
wherein the heat transfer fluid has a pH between about 6.8 and about 10.0;
wherein a ratio of weight percent of the first n-alkyl monocarboxylic acid or the salt thereof to weight percent of the second n-alkyl monocarboxylic acid or the salt thereof ranges from about 1:0.75 to about 1:2.00;
wherein a ratio of weight percent of the optionally substituted benzoic acid or the salt thereof to combined weight percent of the first n-alkyl monocarboxylic acid or the salt thereof and the second n-alkyl monocarboxylic acid or the salt thereof ranges from about 1:0.30 to about 1:2.25; and
wherein the heat transfer fluid is free of silicates, borates, amines, branched carboxylates, dibasic—aliphatic carboxylates, dibasic-aromatic carboxylates, and acrylate based polymers.

2. The heat transfer fluid of claim 1, wherein the salt of the first n-alkyl monocarboxylic acid and the salt of the second n-alkyl monocarboxylic acid each comprises an alkali metal.

3. The heat transfer fluid of claim 1, wherein one of the first n-alkyl monocarboxylic acid comprises heptanoic acid and the second n-alkyl monocarboxylic acid comprises nonanoic acid.

4. The heat transfer fluid of claim 1, wherein the first n-alkyl monocarboxylic acid comprises octanoic acid and the second n-alkyl monocarboxylic acid comprises decanoic acid.

5. The heat transfer fluid of claim 1, wherein the ratio of the weight percent of the first n-alkyl monocarboxylic acid or the salt thereof to the weight percent of the second n-alkyl monocarboxylic acid or the salt thereof ranges from about 1:1.00 to about 1:2.00.

6. The heat transfer fluid of claim 1, wherein the ratio of the weight percent of the first n-alkyl monocarboxylic acid or the salt thereof to the weight percent of the second n-alkyl monocarboxylic acid or the salt thereof ranges from about 1:1.00 to about 1:1.50.

7. The heat transfer fluid of claim 1, wherein the ratio of the weight percent of the first n-alkyl monocarboxylic acid or the salt thereof to the weight percent of the second n-alkyl monocarboxylic acid or the salt thereof is about 1:1.

8. The heat transfer fluid of claim 1, wherein the ratio of the weight percent of the benzoic acid or the salt thereof to the combined weight percent of the first n-alkyl monocarboxylic acid or the salt thereof and the second n-alkyl monocarboxylic acid or the salt thereof ranges from about 1:0.50 to about 1:2.25.

9. The heat transfer fluid of claim 1, wherein the ratio of the weight percent of the benzoic acid or the salt thereof to the combined weight percent of the first n-alkyl monocarboxylic acid or the salt thereof and the second n-alkyl monocarboxylic acid or the salt thereof ranges from about 1:0.75 to about 1:2.00.

10. The heat transfer fluid of claim 1, wherein the ratio of the weight percent of the benzoic acid or the salt thereof to the combined weight percent of the first n-alkyl monocarboxylic acid or the salt thereof and the second n-alkyl monocarboxylic acid or the salt thereof is about 1:1.

11. The heat transfer fluid of claim 1, further comprising a water-soluble molybdate salt.

12. The heat transfer fluid of claim 1, further comprising sodium molybdate, potassium molybdate, or a combination thereof.

13. The heat transfer fluid of claim 1, further comprising an additional component selected from the group consisting of an inorganic phosphate, an organophosphate, a water-soluble alkaline earth metal salt, a water-soluble alkali metal salt, a water-soluble zinc salt, a nitrite, a nitrate, a phosphonate, a phosphinate, and a combination thereof.

14. The heat transfer fluid of claim 1, further comprising an alkaline earth metal oxide, an alkaline earth metal hydroxide, or a combination thereof.

15. The heat transfer fluid of claim 14, wherein the alkaline earth metal comprises calcium, magnesium, strontium, or a combination thereof.

16. The heat transfer fluid of claim 1, further comprising lithium oxide, lithium hydroxide, or a combination thereof.

17. The heat transfer fluid of claim 13 further comprising an additional component selected from the group consisting of a colorant, a biocide, an antifoaming agent, a surfactant, an additional corrosion inhibitor, a dispersant, or a combination thereof.

18. The heat transfer fluid of claim 13 further comprising at least one additional n-alkyl monocarboxylic acid or a salt thereof.

19. The heat transfer fluid of claim 18 wherein the ratio of the weight percent of the benzoic acid or the salt thereof to a combined weight percent of the first n-alkyl monocarboxylic acid or the salt thereof, the second n-alkyl monocarboxylic acid or the salt thereof, and the at least one additional carboxylic acid or the salt thereof ranges from about 1:0.50 to about 1:2.25.

20. The heat transfer fluid of claim 1, further comprising an inorganic phosphate, an organophosphate, or a combination thereof.

21. The heat transfer fluid of claim 1, further comprising an ethylene glycol phosphate ester, 1,2,3-propanetriol phosphate, a phosphate polyether ester, a $C_6$-$C_{12}$ alkyl alcohol ethoxylate phosphoric acid, an alkali metal salt of phosphate ester of cresyl ethoxylate, potassium cresyl phosphate, octylphenoxypolyethoxyethyl phosphate, octylphenoxy polyethyl phosphate, olyethylene glycol mono(octylphenyl) ether phosphate, an alkali metal salt of alkylphenoxypolyethoxyethyl phosphoric acid of R-phenyl($CH_2CH_2O$)xphosphate, wherein R is hydrogen or a $C_1$-$C_{20}$ alkyl and x is an integer from 1 to 30, or a combination thereof.

22. The heat transfer fluid of claim 1, further comprising at least one additional n-alkyl monocarboxylic acid or a salt thereof.

23. The heat transfer fluid of claim 22, wherein the salt of the at least one additional n-alkyl monocarboxylic acid comprises an alkali metal, and wherein the at least one additional n-alkyl monocarboxylic acid comprises a $C_6$-$C_{20}$ mono-aliphatic or aromatic carboxylic acid.

24. The heat transfer fluid of claim 1, further comprising a water-soluble alkaline earth metal salt that will produce at least one of $Ca^{2+}$, $Mg^{2+}$, and $Sr^{2+}$ upon dissolving in water.

25. The heat transfer fluid of claim 1, further comprising a water-soluble alkaline earth metal salt that will produce magnesium ions.

26. The heat transfer fluid of claim 1 wherein the optionally substituted benzoic acid comprises p-toluic acid, t-butyl benzoic acid, an alkoxybenzoic acid, 1,3,5-benzene tricarboxylic acid, 1,2,4-benzene tricaboxylic acid, 1,2,3-benzene tricarboxylic acid, or a combination thereof.

27. A heat transfer fluid comprising:
greater than or equal to about 89 wt. % of a freezing point depressant that is selected from the group consisting of methanol, ethanol, propanol, butanol, furfurol, furfuryl alcohol, tetrahydrofurfuryl alcohol, ethoxylated furfuryl alcohol, ethylene glycol, diethylene glycol, triethylene glycol, 1,2-propylene glycol, 1,3-propylene glycol, dipropylene glycol, butylene glycol, glycerol, glycerol-1,2-dimethyl ether, glycerol-1,3-dimethyl ether, monoethylether of glycerol, sorbitol, 1,2,6-hexanetriol, trimethylopropane, methoxyethanol, and a combination thereof;
a corrosion inhibitor formulation comprising:
benzoic acid or an alkali metal salt thereof, wherein the salt of the optionally substituted benzoic acid comprises sodium benzoate, potassium benzoate, or a combination thereof;
a first n-alkyl monocarboxylic acid selected from heptanoic acid, octanoic acid, an alkali metal salt thereof, and mixtures thereof;
a second n-alkyl monocarboxylic acid selected from nonanoic acid, decanoic acid, or an alkali metal salt thereof, and mixtures thereof;
an azole compound selected from the group consisting of benzotriazole, tolyltriazole, mercaptobenzothiazole, tetrahydro tolyltriazole, and a combination thereof; and
a molybdate salt comprising sodium molybdate, potassium molybdate, or a combination thereof;
wherein the heat transfer fluid has a pH between about 6.8 and about 10.0;
wherein a ratio of weight percent of the first n-alkyl monocarboxylic acid or the salt thereof to weight percent of the second n-alkyl monocarboxylic acid or the salt thereof ranges from about 1:1.00 to about 1:1.75; and
wherein a ratio of weight percent of the benzoic acid or the salt thereof to combined weight percent of the first n-alkyl monocarboxylic acid or the salt thereof and the second n-alkyl monocarboxylic acid or the salt thereof ranges from about 1:0.50 to about 1:2.00
wherein the heat transfer fluid is free of silicates, borates, amines, branched carboxylates, dibasic-aliphatic carboxylates, dibasic-aromatic carboxylates, and acrylate based polymers.

28. The heat transfer fluid of claim 27, further comprising an additional component selected from the group consisting of an inorganic phosphate, an organophosphate, a water-soluble alkaline earth metal salt, a water-soluble alkali metal salt, a water-soluble zinc salt, a nitrite, a nitrate, an acrylate-based polymer, a phosphonate, a phosphinate, and a combination thereof.

29. A method of preventing corrosion in a heat transfer system, the method comprising contacting at least a portion of the heat transfer system with the heat transfer fluid of claim 1.

30. The method of claim 29, wherein the heat transfer system comprises a component made by controlled atmosphere brazing, a component comprising compacted graphite iron (CGI), a component comprising aluminum, or a combination thereof.

31. The fluid of claim 20, further comprising an alkaline earth metal oxide, an alkaline earth metal hydroxide, or a combination thereof.

32. The heat transfer fluid of claim 31, wherein the alkaline earth metal comprises calcium, magnesium, strontium, or a combination thereof.

33. The heat transfer fluid of claim 20, further comprising lithium oxide, lithium hydroxide, or a combination thereof.

* * * * *